US011631063B2

(12) United States Patent
Dowding

(10) Patent No.: US 11,631,063 B2
(45) Date of Patent: Apr. 18, 2023

(54) BLOCKCHAIN SOLUTIONS FOR FINANCIAL SERVICES AND OTHER TRANSACTIONS-BASED INDUSTRIES

(71) Applicant: L4S CORP., Dover, DE (US)

(72) Inventor: Paul F. Dowding, Ridgefield, CT (US)

(73) Assignee: L4S Corp., Dover, DE (US)

( * ) Notice: Subject to any disclaimer, the term of this patent is extended or adjusted under 35 U.S.C. 154(b) by 383 days.

(21) Appl. No.: 17/112,640

(22) Filed: Dec. 4, 2020

(65) Prior Publication Data

US 2021/0090037 A1 Mar. 25, 2021

Related U.S. Application Data

(63) Continuation of application No. 15/551,065, filed as application No. PCT/US2016/063227 on Nov. 22, 2016, now abandoned.

(Continued)

(51) Int. Cl.
*G06Q 20/10* (2012.01)
*G06Q 20/06* (2012.01)
(Continued)

(52) U.S. Cl.
CPC ............ *G06Q 20/06* (2013.01); *G06Q 20/10* (2013.01); *G06Q 20/223* (2013.01);
(Continued)

(58) Field of Classification Search
CPC .. G06Q 20/02; G06Q 20/3829; G06Q 20/401; H04L 9/321; H04L 9/3093; G06F 21/57
See application file for complete search history.

(56) References Cited

U.S. PATENT DOCUMENTS 5,892,900 A 4/1999 Ginter
10,068,228 B1 9/2018 Winklevoss
(Continued)

OTHER PUBLICATIONS

Mandelbrot, B. et al., "The (mis)Behavior of Markets . . . A Fractal view of Financial Turbulence," Abstract and Table of Contents, 2004, Basic Books, New York, New York.
(Continued)

*Primary Examiner* — Steven S Kim
*Assistant Examiner* — Sima Asgari
(74) *Attorney, Agent, or Firm* — Ostrager Chong Flaherty & Broitman P.C.

(57) ABSTRACT

A system and a method for creating a holistic, flexible, scalable, confidential, low-latency, high-volume, immutable distributed ledger for the financial services and other industries. The system allows a scalable blockchain solution with respect to accessible memory requirements of distributed ledgers or distributed databases with confidentiality in the shared records as well as accommodating low-latency, high-capacity transaction capabilities. The method includes a fundamental, generic, logical representation of financial services life-cycles transactions in terms of variable sets of four simple, sequential components. The optimal process generates a self-validating, variable n-dimensional, multi-hash-linked, interdependent distributed ledger that allows the individual network participants to recreate the ledger without having to refer to or confirm with other network participants.

24 Claims, 50 Drawing Sheets

Related U.S. Application Data

(60) Provisional application No. 62/379,771, filed on Aug. 26, 2016, provisional application No. 62/259,108, filed on Nov. 24, 2015.

(51) Int. Cl.
```
G06Q 20/22      (2012.01)
H04L 9/06       (2006.01)
H04L 9/32       (2006.01)
H04L 9/40       (2022.01)
H04L 9/00       (2022.01)
H04L 67/104     (2022.01)
```
(52) U.S. Cl.
CPC .......... *H04L 9/0637* (2013.01); *H04L 9/3242* (2013.01); *H04L 63/123* (2013.01); *H04L 9/50* (2022.05); *H04L 67/104* (2013.01); *H04L 2209/56* (2013.01)

(56) References Cited

U.S. PATENT DOCUMENTS

| | | | | |
|---|---|---|---|---|
| 2005/0257045 | A1* | 11/2005 | Bushman | H04L 63/12 713/156 |
| 2012/0023127 | A1 | 1/2012 | Kirshenbaum | |
| 2015/0046337 | A1 | 2/2015 | Hu et al. | |
| 2015/0206106 | A1 | 7/2015 | Yago | |
| 2015/0269570 | A1 | 9/2015 | Phan et al. | |
| 2015/0332283 | A1 | 11/2015 | Witchey | |
| 2016/0292672 | A1* | 10/2016 | Fay | G06Q 20/3829 |

OTHER PUBLICATIONS

Craciunescu, O. et al., "Three-Dimensional Microvascular Networks Fractal Structure: Potential For Tissue Characterization?" Journal Article, American Society of Mechanical Engineers, Bioengineering Division (Publication) BED, 44:9-13, 1999.
PCT International Search Report, PCT/US16/63227, dated Feb. 2, 2017.
PCT Written Opinion of the International Searching Authority, PCT/US16/63227, dated Feb. 2, 2017.
Annenberg Learner, "Mathematics Iluminated: 1.6 Encryption," https://www.learner.org/courses/mathilluminated/units/1/textbook/06.php, printed Sep. 5, 2017.
Annenberg Learner, "Mathematics Iluminated: 1.7 RSA Encryption," https://www.learner.org/courses/mathilluminated/units/1/textbook/07.php, printed Sep. 5, 2017.
Antonopoulos, A., "Mastering Bitcoin," http://chimera.labs.oreilly.com/books/1234000001802/index.html, printed Sep. 5, 2017.
Azotic, "ELI5: Bitcoin Mining," published 2013, https://www.reddit.com/r/Bitcoin/comments/18q2jx/eli5_bitcoin_mining_xpost_in_eli5/.
Bitcoinwiki, "Transaction fees," https://en.Bitcoinit/wiki/Transaction_fees, printed Sep. 6, 2017.
Bitcoin, "How Does Bitcoin Work?," http://bitcoin.org/en/how-it-works, printed Sep. 5, 2017.
Brown, R. et al., "Corda: An Introduction," Aug. 2016, R3.
Buterin, V., "Etherium: Platform Review; Oppotunities and Challenges for Private and Consortium Blockchains," Jun. 2016.
Coindesk, "How Bitcoin Mining Works," Dec. 22, 2014, http://www.coindesk.com/information/how-Bitcoin-mining-works/.
Coinpursuit, "Proof-of-Work and Proof-of-Stake Mining," 2014, https://www.coinpursuit.com/pages/proof-of-work-proof-of-stake-Bitcoin-mining/.
Crane, F., "Proof of Work, Proof of Stake and the Consensus Debate," Dec. 20, 2014, http://cointelegraph.com/news/113157/proof-of-work-proof-of-stake-and-the-consensus-debate.
Davarpanah, K., et al. "NeuCoin: The First Secure, Cost-efficient and Decentralized Cryptocurrency," Version 1.1, Jun. 15, 2015, http://www.neucoin.org/en/whitepaper/download.
Di Lorio, Anthony, "Ethereum Messaging for the Masses (including fathers)—via Infographic," Etherium Blog, posted Jun. 21, 2015, https://blog.ethereum.org/2015/06/21/ethereum-messaging-masses-including-fathers-via-infographic/.
Digital Asset White Paper, "The Digital Asset Platform; Non-Technical White Paper," Dec. 2016, Digital Asset Holdings, LLC.
Digital Asset White Paper, "The Global Synchronization Log," Nov. 2016, Digital Asset Holdings, LLC.
The Economist, "Blockchains: The Great Chain of Being Sure About Things," Oct. 31, 2015, http://www.economist.com/node/21677228/print.
The Economist, "The Promise of the Blockchain: The Trust Machine," Oct. 31, 2015, http://www.economist.com/node/21677198/print.
Etherium Wiki, "White Paper: A Next-Generation Smart Contract and Decentralized Application Platform," printed Mar. 5, 2017, https://github.com/ethereum/wiki/wiki/White-Paper.
Hearn, M., "Corda: A Distributed Ledger," Version 0.5, Nov. 29, 2016, Corda.
Kelly, J., "Microsoft Launches Cloud-Based Blockchain Platform with Brooklyn Start-Up," Reuters, Nov. 10, 2015.
King, S. et al., "PPCoin: Peer-to-Peer Crypto-Currency with Proof-of-Stake", Aug. 19, 2012, http://peercoin.net/assets/paper/peercoin-paper.pdf.
Mandelbrot, B., "Fractals and Scaling in Finance: Discontinuity, Concentration, Risk," Selecta vol. E, 1997 Edition, pp. 1-10, Springer.
Nakamoto, S. "Bitcoin: A Peer-to-Peer Electronic Cash System" https://Bitcoin.org/Bitcoin.pdf (publication date not availalble).
Patel, A et al., "Search on a Fractal Lattice using a Quantum Random Walk," Jul. 30, 2012, https://arxiv.org/odf/1203.3950.pdf.
Rivest, R.L. et al., "A Method for Obtaining Digital Signatures and Public-Key Cryptosystems," Apr. 1977, Laboratory for Computer Science, Massachusetts Institute of Technology, Cambridge, MA, https://people.csail.mit.edu/rivest/Rsapaper.pdf.
Schwartz, D., et al., "The Ripple Protocol Consensus Algorithm," Ripple Labs Inc., 2014, https://ripple.com/files/ripple_consensus_whitepaper.pdf.
Tyson, Jeff, "How Encryption Works," http://computer.howstuffworks.com/encryption.htm, printed Sep. 5, 2017.
Wikipedia, "Cryptocurrency," https://en.wikipedia.org/wiki/Cryptocurrency, printed Sep. 5, 2017.
Wikipedia, "Merkle tree," https://en.wikipedia.org/wiki/Merkle_tree, printed Sep. 5, 2017.
Xorbin, "SHA-256 hash calculator," http://www.xorbin.com/tools/sha256-hash-calculator, printed Sep. 5, 2017.
Zhang, Z. et al., "Spanning Trees in a Fractal Scale-Free Lattice," Physical Review E 83, 016116, Jan. 31, 2011, American Physical Society.
Wikipedia, "Diffie-Hellman Key Exchange," https://en.wikipedia.org/wiki/Diffie%E2%80%93Hellman_key_exchange, printed Sep. 6, 2017.
Wikipedia, "Proof-of-work system," https://en.wikipedia.org/wiki/Proof-of-work_system, printed Sep. 6, 2017.
Wikipedia, "Public-key cryptography," https://en.wikipedia.org/wiki/Public-key_cryptography, printed Sep. 6, 2017.
Wikipedia, "RSA (cryptosystem)," https://en.wikipedia.org/wiki/RSA_(cryptosystem), printed Sep. 6, 2017.
Wikipedia, "SHA-2," https://en.wikipedia.org/wiki/SHA-2, printed Sep. 6, 2017.

\* cited by examiner

TRANSFER

BEFORE

| OL ID | VALUE |
|---|---|
| OL ID 1 | Amt$_{St}$ |

$TP_{DEL}$

AFTER

| OL ID | VALUE |
|---|---|
| OL ID 1 | Nil |
| OL ID 3 | Net |
| OL ID 2 | Amt$_T$ |

$TP_{REC}$

FIG.13

PLEDGE

| | BEFORE | | | PLEDGE | AFTER | |
|---|---|---|---|---|---|---|
| | OL ID | VALUE | | | OL ID | VALUE |
| $TP_{PLF}$ | OL ID 1 | $Amt_{St}$ | | | OL ID 1 | Nil |
| | | | | | OL ID_PLF | $Amt_{PL}$ |
| | | | | | OL ID 3 | Net |
| $TP_{PLT}$ | | | | | OL ID_PLT | $(Amt_{PL})$ |
| | | | | | OL ID 2 | $Amt_{PL}$ |

PLEDGE RETURN

| | BEFORE | | | AFTER | |
|---|---|---|---|---|---|
| | OL ID | VALUE | | OL ID | VALUE |
| | OL ID_PLF | $Amt_{PL}$ | | OL ID $2_2$ | $Amt_{PL}$ |
| | | | | OL ID_PLF | Nil |
| | OL ID_PLT | $(Amt_{PL})$ | | OL ID_PLT | Nil |
| | OL ID $1_2$ | $Amt_{St2}$ | | OL ID $1_2$ | Nil |
| | | | | OL ID $3_2$ | $Net_2$ |

LOAN

| BEFORE | | AFTER | |
|---|---|---|---|
| OL ID | VALUE | OL ID | VALUE |
| OL ID 1 | $Amt_{St}$ | OL ID 1 | Nil |
| | | OL ID_L | $Amt_L$ |
| | | OL ID 3 | Net |

$TP_B$

| | | | |
|---|---|---|---|
| | | OL ID_B | $(Amt_L)$ |
| | | OL ID 2 | $Amt_L$ |

LOAN RETURN $TP_L$

| BEFORE | | AFTER | |
|---|---|---|---|
| OL ID | VALUE | OL ID | VALUE |
| OL ID_L | $Amt_L$ | OL ID $2_2$ | $Amt_L$ |
| | | OL ID_L | Nil |

$TP_B$

| | | | |
|---|---|---|---|
| OL ID_B | $(Amt_L)$ | OL ID_B | Nil |
| OL ID $1_2$ | $Amt_{St2}$ | OL ID $1_2$ | Nil |
| | | OL ID $3_2$ | $Net_2$ |

FIG.17B

AIRLOCK TRANSFER OUT

BEFORE
| OL ID | VALUE |
|---|---|
| OL ID 1 | Amt$_{St}$ |

TP$_{DEL}$

AFTER
| OL ID | VALUE |
|---|---|
| OL ID 1 | Nil |
| OL ID 3 | Net |
| OL ID 2 | Amt$_T$ |

AIRLOCK EXTERNAL SETTLEMENT

BEFORE
| OL ID | VALUE |
|---|---|
| OL ID 2 | Amt$_T$ |

AFTER
| OL ID | VALUE |
|---|---|
| OL ID 2 | Nil |
| OL ID E | Amt$_T$ |

AL$_{REC}$

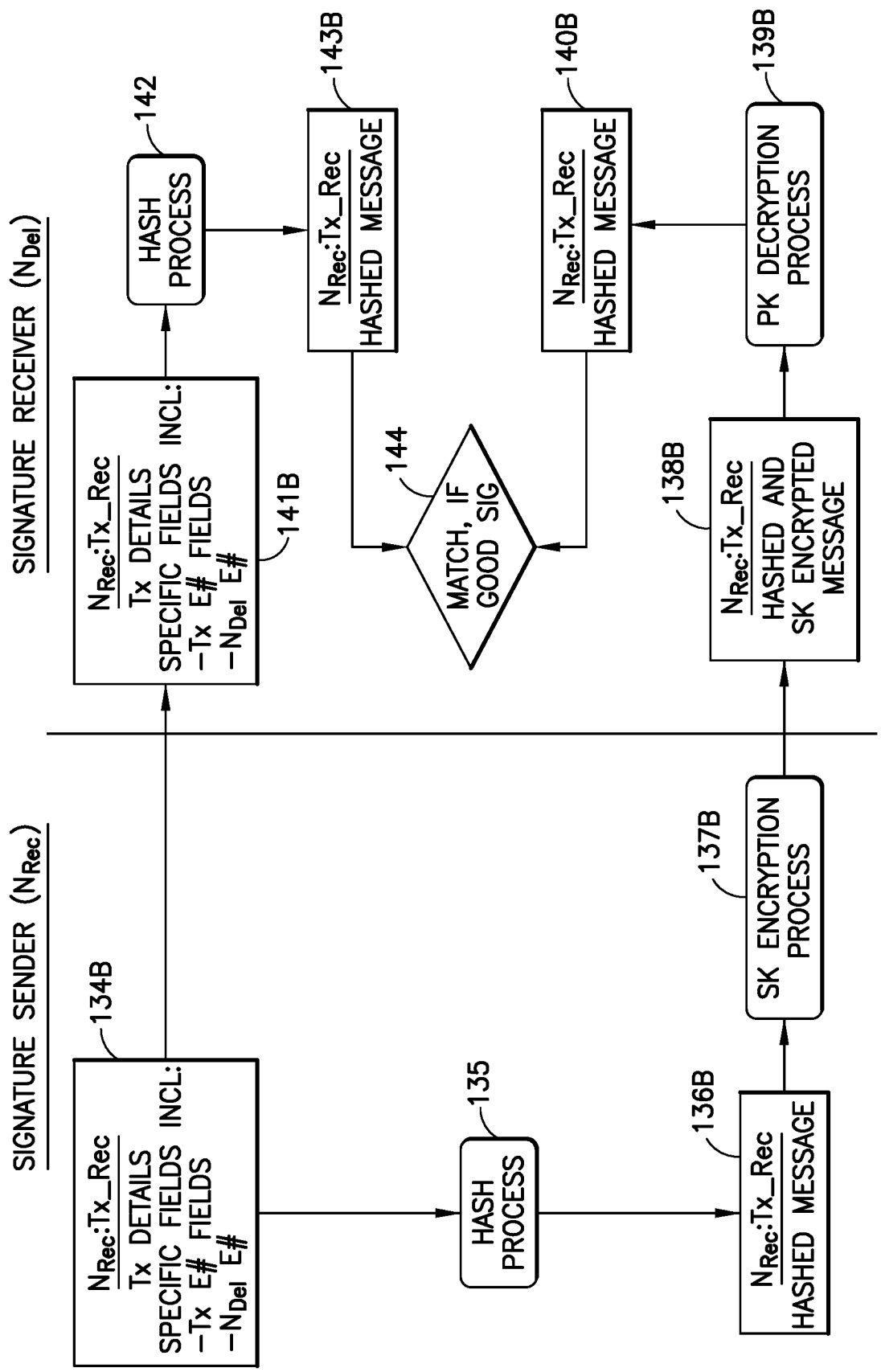

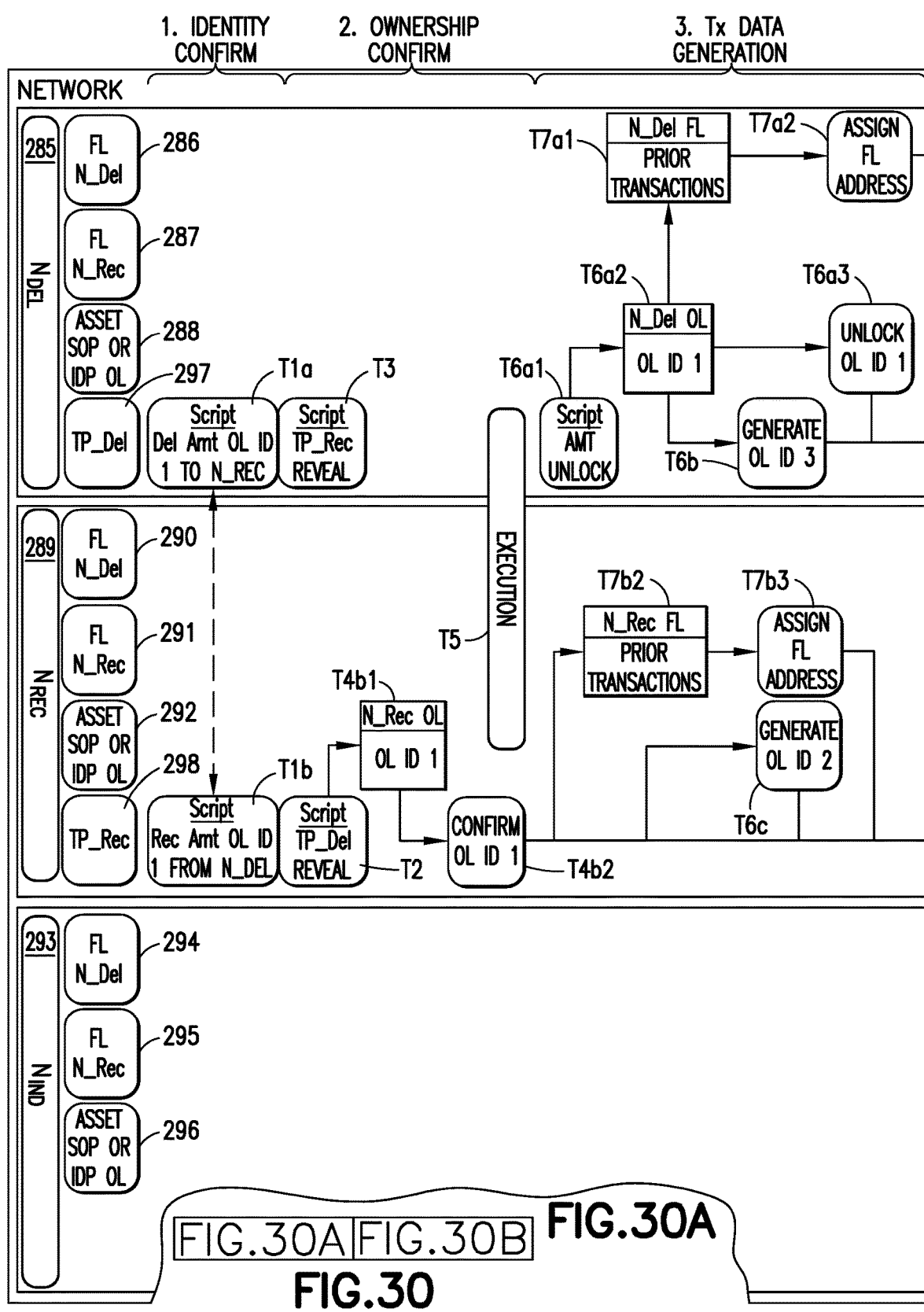

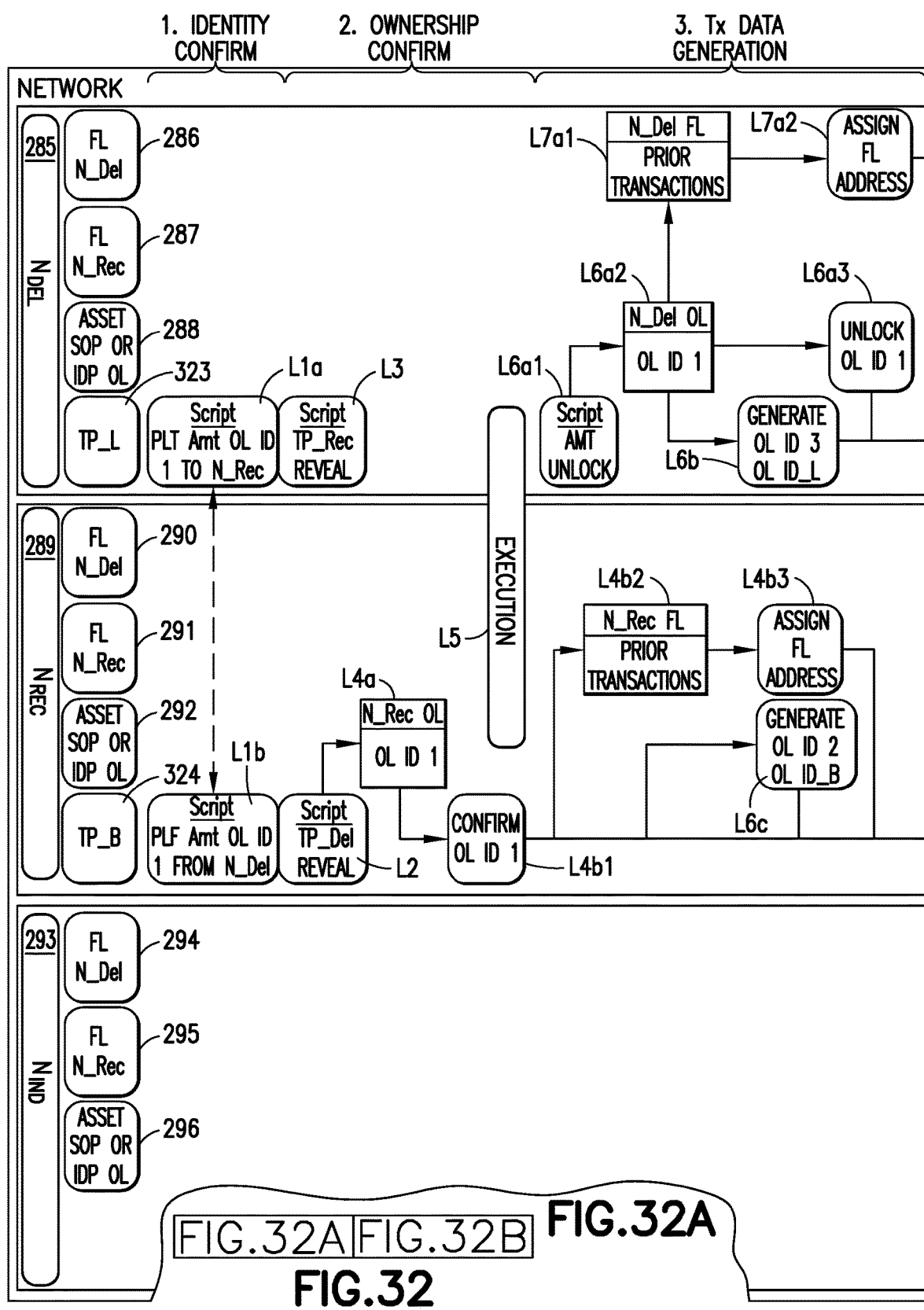

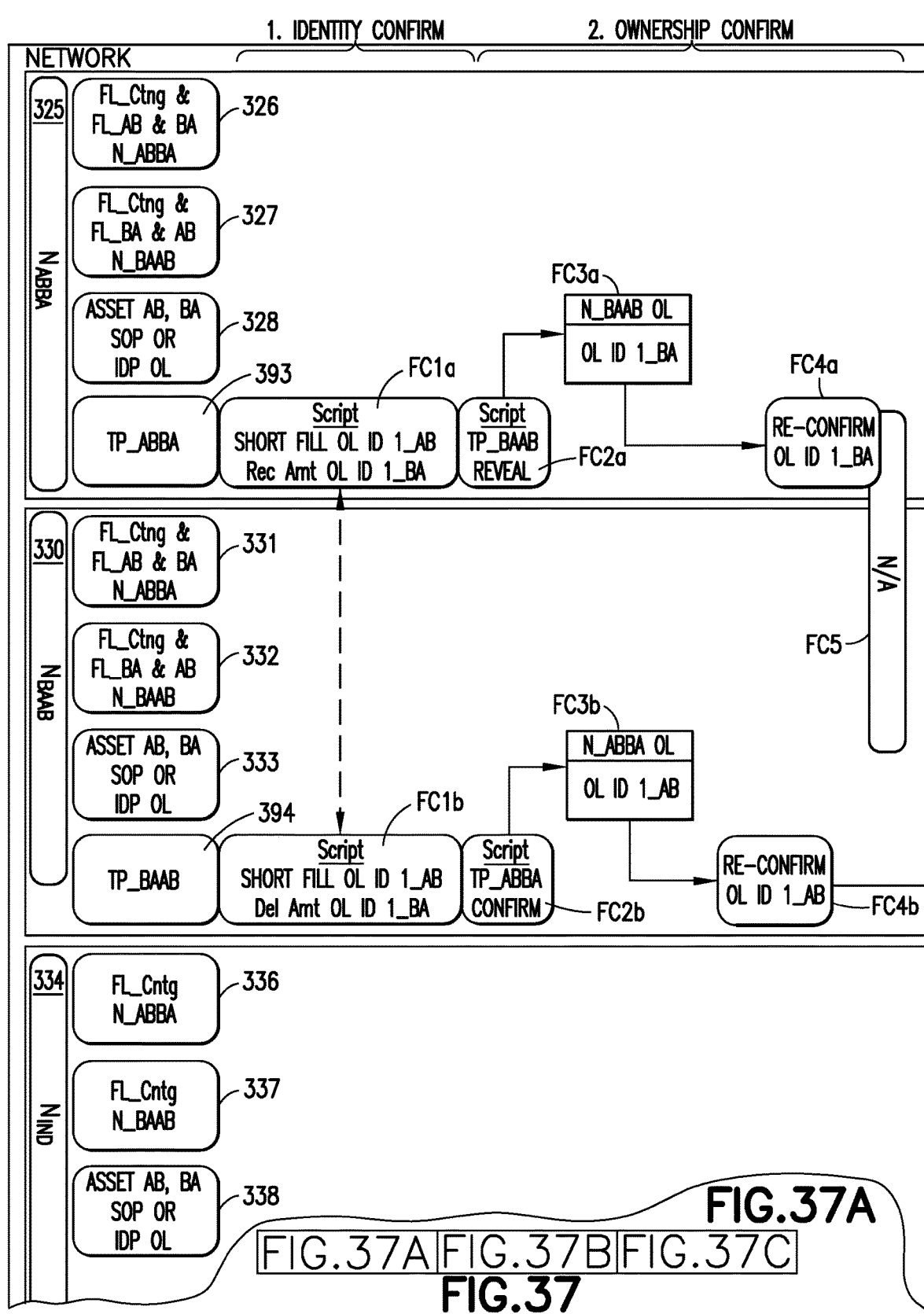

BLOCKCHAIN SOLUTIONS FOR FINANCIAL SERVICES AND OTHER TRANSACTIONS-BASED INDUSTRIES

RELATED PATENT APPLICATIONS

This application is a continuation of U.S. patent application Ser. No. 15/551,065 filed Aug. 15, 2017, which is a U.S. national stage application of International Application No. PCT/US2016/063227, which claims priority to U.S. Provisional Application No. 62/379,771 filed on Aug. 26, 2016 and U.S. Provisional Application No. 62/259,108 filed on Nov. 24, 2015.

BACKGROUND

This disclosure generally relates to distributed ledger computer systems. More particularly, the technology herein relates to computer systems and processes that interface using blockchain technology.

Bitcoin is a crypto currency which is transacted on a secure decentralized ledger that is distributed throughout its open network. The ledger is known as the blockchain and it allows participants in the network to transact bitcoin without the need for a trusted third party, such as a bank. Separately, it also prevents double spending, stealing and the forging of value. The financial services industry, beyond looking at the potential of crypto currencies, has recently turned its attention to using the blockchain ledger separate from bitcoin or other crypto currencies and applying it to other processes and products.

The blockchain is a data structure that stores a list of transactions, forming a distributed electronic ledger that records transactions between source identifiers and destination identifiers. The transactions are bundled into blocks and every block (except for the first block) refers back to or is linked to a prior block in the chain. Computer nodes maintain the blockchain and cryptographically validate each new block and the transactions contained therein. The integrity (e.g., confidence that a previously recorded transaction has not been modified) of the entire blockchain is maintained because each block refers to or includes a cryptographic hash value of the prior block. Accordingly, once a block refers to a prior block, it becomes difficult to modify or tamper with the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become practically immutable.

The attraction of the blockchain process is significant. It offers a low-cost distributed-transaction record solution. The near-real time speed of the transactions, the ease of transacting between parties and the nature of the technology also offer the potential of wholly new business models and practices.

However, the solutions within the financial services industry utilizing blockchain have tended to be parochially developed on a product or functional basis. Some are only focused on payments. Others are looking at specific product areas such as syndicated loans, credit default swaps, interest rate swaps and repo. Although complex in their derivation, structures and pricing, the consistent properties of all these transactions are that they are: over the counter (OTC) transactions, unregistered securities, low volume per transacting party and in total, and predominantly involve only payments. Therefore, these products represent the simplest use cases for utilizing distributed ledger technology on the bases of scalability, flexibility and viability. Further ideas have focused on the 'ledger' of distributed ledger and therefore have been dominated by clearing or record keeping solutions.

Bitcoin and the blockchain open-source code, scripts, protocols and distributed ledger were defined by a whitepaper released in December, 2008. Since then the open-source decentralized crypto currency network has expanded to greater than 14 MM bitcoin and is transacted globally 24 hours per day, seven days per week. The code, scripts and protocols are enhanced and accepted on an open-source code basis. So new code will only be adopted by various nodes if it has a demonstrated value. To maintain integrity and predictable execution times, the script language used is a primitive and simple language with no logical loops and simple read, write, delete functionality with conditional flow control.

Very simply, bitcoin represents a value that is transferred within this blockchain network. The ledger is updated and distributed to all members of the network so before transacting with another party, the available value of bitcoin of the payer (deliverer) can be verified. The secure transaction process and update to the ledger allows the payee (receiver) to have that value of bitcoin added to his/her total value of bitcoin to be spent in the future.

This security of the transaction and recording mechanism allows for the transfer of value without the need of a trusted third party such as a bank. Records of available value recorded against an account identification can also be locked by an "encumbrance" controlled by the owner. The value can only be released by that owner.

The security is provided by two mathematically driven techniques combined in a novel way: public key encryption and secure hashing. The use of these techniques underscores the fundamental properties of the bitcoin network and blockchain functionality.

Public key (or asymmetric) encryption is a secure means of encrypting transactions which makes it (based on the computing time necessary) impossible to decrypt without the correct keys. Through a complex mathematical relationship (utilizing elliptical curves) a "private" encryption key can be chosen and a "public" key derived. Note: The private key cannot be derived from the public key. The relationship between the keys is such that whichever one is used to encrypt a message, the other is needed to decrypt the message.

This means a person in possession of a set of keys can publish the public key to allow counterparties to send him/her a message that only he/she can decrypt with the private key. In reverse, the owner of the keys can send a message, which is equivalent to a signature or proof of identity, by encrypting it with the private key. Anyone can decrypt that message with the sender's public key and know it must be valid as it can only come from a person who knows the private key.

By this means, people can send secure messages to and from each other with their respective public keys and the only requisite for confidentiality is that the individuals do not disclose their individual, separate and unique private keys. This is in fact the technique used to encrypt and send email across the internet securely.

Secure hashing is a complicated mathematical process of turning any piece of binary data into a finite-digit hexadecimal (i.e. base 16) number. For the current, published Secure Hashing Algorithm standard (SHA 256), the finite number of digits is 64. With 64 digits having anyone of 16 (i.e., $2^4$) values (0-9 and a-f), there are $2^{256}$ (i.e., $2^{(4\times64)}$) possible hashes. Note: The hashing process cannot be reversed to generate the original data. For more security, a hash can be made of a hash multiple times or hashed with further data.

What the final hash represents is a secure way of verifying original data. If you have the original data in binary form, you can recreate the same hash from the same technique. If you obtain a different hash, then the original data is incorrect or has been tampered with.

This is the technique used for verifying passwords over the internet. A website stores a hash of a user's password. Upon typing the password, it is hashed and compared to the stored hash for validation. With this process, the password is not stored anywhere for corrupt individuals to obtain it; the hash is a useless piece information except for confirming a correctly hashed password. The only way a user can be defrauded is by disclosing his/her password or having it stolen.

In order to securely record and transfer bitcoin without double spending, stealing or forging of value, a process combining public encryption and secure hashing is used. With bitcoin, there is not the concept of a balance like a bank account. The distributed ledger has a record of the entire users' unspent transaction outputs (abbreviated as UXTO) from prior transactions. Each user (or technically the node on which they transact) has a copy of the distributed ledger so before accepting a transfer of bitcoin, the recipient can confirm the payer's UXTO. The confirmation of the payer (being who they say they are) is both through the public encryption of the transaction matching the payer's public key and the payer, optionally, being able to unlock the unspent value with an encrypted encumbrance. The cryptographically confirmed transaction creates a hash of the transaction data (including the reference to the ledger blocks which proved the UXTO) and is submitted to the transaction pool. At this point, the transaction is deemed contractually entered into but it is not able to be referenced until it is recorded on the blockchain ledger.

The process of recording transactions to the block is referred to in the bitcoin network as "mining". In order to create a new block a group of transactions, up to 1 MB of memory have to be grouped and their collective data securely hashed referencing the prior blockchain block's hash. This then creates a new hash for the new block to be referenced by the next future block. In this way a chain of blocks is formed which sequentially reference each other according to the encrypted transaction content. As an added complication to the process, the final hash of the new block has to be less than a defined target value. This is referred to as the 'difficulty' of the required hash. Consequently, the block hash has to be created (i.e., hashed) with a variable known as a "nonce". Because the hashing process is one way and the correct nonce cannot be reverse calculated from a reverse hashing process, the miners have to guess the nonce that will give them a final block hash that is less than the defined difficulty. The guessing process for each block takes on average 10 minutes. The open-source code within the bitcoin network tracks the resolution time over a set number of cycles and can vary the difficulty to ensure new blocks are created every ten minutes on average. With the increase in computing power being applied to the mining process, the setting of the level of difficulty for the hash has had to evolve.

The process of creating the next block is effectively a competition between the miners to find the correct hash that is below the level of difficulty. As the miners do not necessarily pick the same transactions to encapsulate in a block, they are not all solving the same problem. In order to create a fraudulent transaction (double spending, stealing or forged value) a miner would have to change a real transaction or create a false one while maintaining the integrity of all the linked hashes, which is virtually impossible. The nature of the completion and uncertain selection of chose transactions means any one miner does not have control of which transactions make it to the block. A bad transaction would be identified and rejected by other nodes and not accepted by the network. The only way to overcome the network would be to have greater than 51% of the network's computing power—a costly and extremely difficult undertaking. Even if the miner could create fraudulent transactions, it would be on an immutable distributed record for the whole network to see and eventually find.

This type of block processing is called "proof of work" as the miners have to work to create the block. There are other methods of creating blocks in other crypto currencies. "Proof of consensus" requires at least 51% or a defined, greater majority of the network to accept a new node before it is validated. "Proof of stake" skews the creation of blocks to miners with greater value in the network, which means in order to overcome the network, the miner would need greater than 51% of the network's value.

Having created a new block, the node will start communicating it to other nodes, which will only accept it if the hashing matches the referenced blocks, the transaction details and the level of difficulty. However, if the new block meets the criteria, the nodes will accept the new block and communicate it to other nodes. So there is a period of dissemination of the new block to the network. Transactions not included in the new block rise in priority to be included in the next block to be created.

In summary, the blockchain is a peer-to-peer network-based, distributed, self-referencing, single-chain, single-record ledger for the purpose of recording transfers of value and unspent value. The ledger stores records from the very first transaction until the latest record. This means the distributed ledger, of which every node has a copy, is a continuous and expanding record of all transactions. The code, scripts and protocols used in the network are developed in an open-source coding environment. The transactions and unspent value of all participants are recorded against their account identification numbers. Apart from the anonymity of the account number, all records are accessible to all participants. The control and integrity is maintained by: (1) all users being able to reference prior blocks to prove their own or their counterparties unspent balances; (2) only the user with the unspent value being able to prove ownership through a digital signature that value to be spent; (3) the two parties agreeing to a transaction through public encryption and submitting a transaction to a pool to be processed referencing the prior blocks validating the unspent value; (4) a mechanism, such that the transactions are added in blocks to the single-chain, distributed ledger by referencing the prior block's hash and creating a new block with a new hash for the next block, which references the transactions in the block; (5) the integrity of each block's creation is maintained through various methods that include: competition, consensus or value held; (6) ultimately a majority of the other nodes have to accept any new block for it to be widely available; and (7) the new block forms part of the expanding immutable record to be referenced for future transactions.

For all crypto currencies, from an accounting perspective, the transactions on the blockchain are simple, single transfers of value of a balance-sheet-equity-based (i.e., fullypaid-for) asset. The crypto currency cannot leave its network. It can only be transacted within its network amongst participating users.

From an understanding of blockchain process used with bitcoin and the simple nature of the recorded transactions, the following are a list of challenges which have to be overcome or solved in order to utilize blockchain or distributed ledger processes within the financial services industry.

(A) Open-Source Code with No Loops: The language used for blockchain applications have been predominantly developed within an open-source process. While controlled in its own self-policing way, this methodology may not be acceptable for the regulated entities or compliant with the laws and rules within the financial services industry. The challenge is the paradox of creating a decentralized code and ledger which cannot be developed through open source. Also the blockchain code language is relatively primitive in the sense that only simple sequential functions of reading, writing, stacking and conditional flow can be performed. Although it has conditional flow, it does not have any loops. The simplicity of the code prevents processing roadblocks and infinite loops while reducing possible risks to the ledger's integrity. Any blockchain solutions for the complexity within the financial services have to do so with the primitive, simple code.

(B) Continuous Record: For crypto currencies there are hundreds of transactions per minute on one blockchain and there are concerns about the size and ever-growing memory requirements for the continuous ledger that the nodes must maintain. Within the financial services across multiple securities, contracts and currencies, there are thousands of transactions per second so it is infeasible to consider all nodes maintaining a continuous record of all transactions, any part of which may be referenced to validate a future transaction.

(C) Anonymity and Confidentiality: With a distributed ledger, all nodes have a copy of all transactions and unspent value for all users. The only anonymity is derived from account identifiers being a non-descriptive number. However, once a user knows another user's identifier, he/she could recreate the complete activity and unspent value from the ledger records. Bitcoin has different methods of pooling transactions or transferring histories to provide some confidentiality but these techniques would be unacceptable to financial service regulators. The network needs to be able to create a confidential ledger that can still be referenced and confirmed by users transacting with each other.

(D) Block Creation Methodology and Transaction Volumes: There are multiple methodologies for creating blocks within a blockchain network, the purpose of which is to maintain the integrity of the ledger and prevent fraud. Within the financial services, the methodology has to be able to cope with the transaction types, structures and requirements while also meeting the volume and capacity requirements of the industry and the speed requirements of algorithmic, high-frequency trading. The interests of all participants have to be aligned or incentivized in such a way that the whole ledger is maintained equally with no bias.

(E) Contingent Transactions: Current crypto currencies represent single transfers of value. Most transactions in the financial services involve contingent transactions such as deliver versus payment (DVP) or receive versus payment (RVP). This would require the network to be able to settle both simultaneously or such that one transaction cannot be reversed after the settlement of the other.

(F) Lending, Collateralized and Default Transactions: Current crypto currencies utilize simple transfers of value. The user owns the currency or gives up that ownership through a transfer. Within the financial services industry, many of the currencies or securities are loaned and borrowed. Separately, other cash and securities may be pledged as collateral for various transactions. The blockchain processes have to be able to transact, reflect and manage the life-cycle of these types of transactions. Lastly, in the event of a default, any loan or collateralized transactions will have to be resolved through credit-event-driven contracts and bankruptcy administration.

(G) Future-dated, Payable or Short Transactions: Current blockchain processes are based on concepts of delayed processing of transactions but these are about setting a future time for a fully-paid-for transfer of value. Within the financial services many transactions and contracts create individual or a series of future-dated transactions which will create obligations on assets that the users entering into the transactions might not yet own or may be contingent on future events (e.g., exchange-traded options where the option buyer has the right of exercise or allowing the contract to expire, unexercised at maturity). In the process of market making or principal trading, a broker can sell an asset that has not been bought yet. With respect to variable driven (e.g., future-dated derivative payments) or yet unknown transactions (e.g., executed price for allocated trades), the amount to be transferred will be unspecified. This capability has to be available to process and record these types of transactions. Overall, the above transactions effectively require a transfer of value in the blockchain that cannot be pre-referenced or pre-defined within the historical ledger, yet can ultimately be settled and recorded in a controlled process.

(H) Current Market Interfaces: Whatever blockchain solution is created for whichever security or position of value, that value will be transacted in the blockchain network and in the current marketplace. The blockchain solution has to allow for its users to transact with the current world and be able to transfer value in and out of the network. With current blockchain solutions, the crypto currencies exist and can only be transacted within their single blockchain networks.

(I) Interoperability: Crypto currencies exist on distributed, single-record blockchains. Any solution for the financial services will have to have a multi-chain solution that allows the flexibility to add more and offer interoperability between chains or networks.

(J) Regulatory, Risk and Accounting-Based Reporting: Beyond the trading and record keeping of the financial services, each participant and role has a plethora of obligations on how to record, monitor and report status to a series of defined status. The blockchain solution will optimally cover these responsibilities. For all the processes not covered by the blockchain, interfaces and enterprise platforms will still be required.

There is a need for blockchain solutions that address one or more of the foregoing challenges to enable a distributed ledger for the financial services and other industries.

SUMMARY

This disclosure is directed to a system and a method for creating a holistic, flexible, scalable, confidential, low-latency, high-volume, immutable distributed ledger for the financial services and other industries, which is functionally product, service and business agnostic. The system allows a scalable blockchain solution with respect to accessible memory requirements of distributed ledgers or distributed databases with confidentiality in the shared records as well as accommodating low-latency, high-capacity transaction capabilities. The method includes a fundamental, generic, logical representation of financial services life-cycles transactions in terms of variable sets of four simple, sequential components. This approach allows greater process control with less variability and the use of simpler, Turing-incomplete code within the network. The proposed approach disclosed in detail below achieves its high-capacity and low-latency performance through optimal process design and optimal utilization of network and computing hardware. The optimal process obviates the need for independent transaction validation techniques such as mining or network consensus by generating a self-validating, variable n-dimensional, multi-hash-linked, interdependent distributed ledger that allows the individual network participants to recreate the ledger without having to refer to or confirm with other network participants. The optimizing of network and computing hardware occurs by the originating participant technology focusing on creating, posting and broadcasting transactions only and recipient participant technology focusing on receiving, validating and posting transactions only. The methods simplify and genericize the use cases and life-cycles in the financial services or other industries, which facilitates flexibility in dealing with any financial use case or life-cycle within a Turing-incomplete coding method. Also, the system and method allows processing of non-ledger referenced value to facilitate market making, short sales, payable or future-dated transactions (whether specified, unspecified or variable-driven), principal and agency execution, and pledge and loan transactions to allow financed and collateralized transactions. There is also a mechanism for the controlled transfer of asset value in and out of the network to allow settlements with current market practitioners or other distributed ledger networks. The participant and network data structure also lends itself to consistent means for enriched data alignment for other downstream reporting requirements of the ledger data without overloading the ledger itself.

The approach proposed herein comprises the following components: (a) a utility-driven method of creating process and product building blocks referred to herein as the "genome"; (b) a flexible, self-verifying, variable, n-dimensional ledger that is product and process-agnostic distributed ledger network utility; and (c) a method to allow the management of distributed ledger or database memory through archiving and the controlled staging of transactions to cover all types of transactions. The genome is a generic way of defining all financial services, transactions, products and life-cycles through combinations of pre-defined, parameter-driven sequential components. This allows the complexity of the financial services industry to be broken down into simple components for ease of definition for workflow, product design as well as technology requirements and coding. The simple nature of the sequential components or building blocks allows the distributed ledger network code to be Turing-incomplete and therefore does not include infinite loops. The distributed ledger network utility (DLNU) works on newly defined applications and techniques for blockchain technology and processes. Within the network's defined expanding structure, it has the potential to transact, process and record all financial services transactions and functions across the entire trading, investment and investor life-cycles. The logical rollout evolution of capabilities creates the flexibility to subsume or retain links to legacy processes and technology. The method is by participant with a product-agnostic network. Many current competing initiatives are rolled out by product with a participant agnostic solution.

More specifically, the functionality of the genome and DLNU (to be described in more detail later) enables a distributed ledger for the financial services and other industries which addresses the previously described challenges A through J, which blockchain solutions can be summarized as follows.

(A) Trusted Network and Genome-Derived Transactions and Scripts: A trusted (private and permissioned) network initially with approved code enhancements is utilized. Transactions are defined for coding and scripts using the genome.

(B) Bifurcated Transaction Blockchain and Ownership Log: The proposed blockchain solution provides a bifurcated daily transaction ledger (that can be archived) and a continuous ownership log (that is validated daily) to create finite memory requirements. It uses contra-transactions which are broadcast independently by both transacting parties to control ownership log updates. (as used herein, a "contra-transaction" refers to a transaction involving two active parties, each party having a respective perspective of that transaction.) Each node will create and broadcast its transaction log ledger while receiving and recreating the other node's transaction log ledgers. The matched and validated contra-transactions will be the basis of ownership log updates. Each node will maintain and keep its own copy of the ownership log.

(C) Unique Dual Transaction and Ownership Identifiers: For each transfer recorded on the ownership log, there will need to be a "Delivery" and "Receipt" record to be recognized. For confidentiality, each log item will have a coded and encrypted identifier which can be verified and decrypted with provided variables to prove identity of ownership. For security, each log record will also have a locking encumbrance that can only be unlocked by the owner to allow the recorded asset value to be included in a script.

(D) Proof of Completeness and Consistency Using Fractal Lattices: Each node will create and broadcast a single contra-transaction per block with each block given a unique fractal lattice address and prior transaction hash-link cross referencing the fractal lattice address and hash-link of the other transacting party's node's contra-transaction. The variable, n-dimensional, fractal data structure and linkages provide a means for independent nodes to recreate and validate the ledger without the need to confer with other nodes or confirm the data with the originator. The independent fractal lattice transaction ledgers can be recreated at any node and the matched pairs of contra-transactions provide the justified updates to the ownership log. The fractal lattices and the ownership log are the self-validating, non-duplicative, complete distributed ledger. The computing power and network hardware are now only focused on generating, posting and broadcasting created, controlled transactions or receiving, validating and posting received transactions. Apart from reducing transaction memory size and computational load, this is the optimal design for capacity and throughput.

(E) Dependent Blockchains: In accordance with some embodiments, independent "contingent" contra-transaction fractal lattice blockchain records are maintained by the transacting parties' nodes for contingent transactions, which, when matched, allows both transacting parties' nodes to create two sets of dual transactions (i.e. Delivery-Receipt and Receipt-Delivery) to the relevant fractal lattice-structured transaction logs and ownership logs for the contingent assets. This controlled linkage of both legs to a codified blockchain record prevents a one-sided reversal.

(F) Lending and Pledging Logs: In accordance with some embodiments, lending and pledging logs allow assets to be recorded via transactions to reflect loans and obligations that transfer ownership or record keeping custody without increasing total assets. Defaults can reverse transaction pairs without impacting other obligations or ultimate ownership.

(G) Unreferenced Asset Value Transaction Blockchains: In accordance with some embodiments, unreferenced asset value transactions are created on a contingent blockchain record that only generates contingent transactions upon validation of referenced assets. For unexecuted allocated trades or future-dated, currently unknown parameter-driven transactions, the amount to be transferred will be unspecified.

(H) "Airlock" Blockchain: In accordance with some embodiments, a unique blockchain transaction log (i.e., a ledger named "Airlock") will exist for the controlled recording of transfers of value into and out of the network.

(I) Agnostic Architecture and Defined-Order Rollout Method: The network architecture combined with the genome transaction definition allows for new products and functionality blockchains to be added as they are utilized. The defined-order rollout allows flexible functionality span to be defined per user with application programming interfaces (APIs) to legacy processes. The "Airlock" blockchain transaction log allows transactions between the network and current markets or other networks.

(J) Expanded Transaction Parameters: The transaction logic for each blockchain can be expanded via origination script or post-record enhancement script to include regulatory, risk and accounting-based parameters that can then be read/write functions instead of report generation or APIs to legacy systems. The creation of each node's transaction log and ownership log allows for ease of linking, enhancing or expansion of data for analysis or reporting that does not have to be broadcast to the network.

One aspect of the subject matter disclosed in detail below is a method for operating a distributed ledger system comprising a network of multiple nodes, comprising: (a) generating a first set of transaction data for a transaction in a first node in the network, wherein the transaction data of the first set comprises data identifying the first and second nodes, data identifying an asset, data representing an amount of value and other data; (b) generating a second set of transaction data for the transaction in a second node in the network, wherein the transaction data of the second set comprises data identifying the first and second nodes, data identifying the asset and data representing the amount of value and other data; (c) generating a first encrypted hash of a message comprising the first set of transaction data in the first node; (d) generating a second encrypted hash of a message comprising the second set of transaction data in the second node; (e) sharing the first encrypted hash with the second node; (f) sharing the second encrypted hash with the first node; (g) generating delivery contra-transaction data for the transaction in the first node, which delivery contra-transaction data comprises the first set of transaction data and the second encrypted hash and does not identify the second node; (h) generating receipt contra-transaction data for the transaction in the second node, which receipt contra-transaction data comprises the second set of transaction data and the first encrypted hash and does not identify the first node; (i) broadcasting the delivery contra-transaction data to the network; (j) broadcasting the receipt contra-transaction data to the network; (k) receiving the broadcast delivery and receipt contra-transaction data at a third node in the network; (l) matching the broadcast delivery and receipt contra-transaction data in the third node; (m) validating the delivery contra-transaction data in the third node by decrypting the second encrypted hash to generate a first hashed message, hashing the second set of transaction data to generate a second hashed message, and matching the first and second hashed messages; (n) validating the receipt contra-transaction data in the third node by decrypting the first encrypted hash to generate a third hashed message, hashing the first set of transaction data to generate a fourth hashed message, and matching the third and fourth hashed messages; and (o) posting the delivery and receipt contra-transaction data to logs in the third node. The transaction is one of the following types: a transfer, a pledge, a loan, a contingent transfer, a short transfer, a short transfer fill, a short contingent transfer and a short contingent transfer fill.

In accordance with one embodiment, each delivery transaction log has a first fractal lattice structure comprising fractal lattice addresses and each receipt transaction log has a second fractal lattice structure comprising fractal lattice addresses, and the method further comprises: identifying a first next sequential fractal lattice address in the first fractal lattice structure; hash linking the first next sequential fractal lattice address to a fractal lattice address in a prior layer of the first fractal lattice structure; associating the delivery contra-transaction data with the first next sequential fractal lattice address; identifying a second next sequential fractal lattice address in the second fractal lattice structure; hash linking the second next sequential fractal lattice address to a fractal lattice address in a prior layer of the second fractal lattice structure; and associating the receipt contra-transaction data with the second next sequential fractal lattice address. In one specific example, step (c) comprises hashing a message comprising the first next sequential fractal lattice address, a first node identifier, a second node identifier, an asset identifier and an amount of value and then encrypting the hashed message using a private encryption key of the first node, and step (d) comprises hashing a message comprising the second next sequential fractal lattice address, the first node identifier, the second node identifier, the asset identifier and the amount of value and then encrypting the hashed message using a private encryption key of the second node.

The above-described method may further comprise maintaining a unique blockchain transaction log for the controlled recording of transfers of value into and out of the network.

In accordance with one embodiment, the first and second nodes communicate via scripts, and the method further comprises script building and running processes which are programmed in machine-readable code of four, parameter-driven sequential process components which are generically combined in various combinations to represent any financial services transaction or life-cycle without the need for infinite loops. The four components are: (a) a single transfer of one asset; (b) an asset classification change; (c) a time-driven change in value; and (d) a contingent, dual asset, bi-directional transfer. The respective parameters for each sequential component are: (a) number, unit and value; (b) timings: single event, periodic events and multiple non-periodic events; (c) generated events: data, date, state, choice and gain/loss; and (d) primary, secondary and tertiary assets.

Another aspect of the subject matter disclosed in detail below is a distributed ledger system comprising a network comprising first, second and third nodes configured to perform operations (a) through (o) set forth above.

A further aspect of the subject matter disclosed in detail below is a method for a multi-hash link, variable, n-dimensional self-validation of consistency and completeness on a distributed ledger or database for a network of multiple nodes for single or multiple parties utilizing machine-readable code to record value, records or information and the transfer thereof between the multiple parties participating in the network on an immutable record, whereby updates to the ledger by multiple parties utilizing multiple nodes update the ledger and broadcast the changes via transaction data and the multiple nodes validate the integrity, completeness and consistency of the ledger with the transaction data alone without the need to confer with any other nodes or parties, whether they instigated the transaction or not. The transaction data of any one node is sequenced utilizing a fractal lattice pattern created by its own defined equation allowing multiple algorithmically calculable, non-recurring, sequential, variable, n-dimensional branch locations to uniquely assign a data address for referencing unique transaction data in a distributed ledger or database for a network of multiple nodes for single or multiple parties utilizing machine-readable code such that the data's address is communicated and used by any other node in the network to recreate the data and unique address without the need to confer with the originating node or other nodes in the network. The fractal pattern chosen to create data addresses to be assigned is variable by a formula of a fractal pattern and is varied from data period to data period as long as the chosen pattern is communicated to the multiple nodes and parties in the network to allow them to recreate the structure without the need to confer with the originating nodes or parties or other nodes or parties in the network. In addition, a data set applied to the unique address is given a classification of "end" to mark the end of a fractal branch or "last" to mark a last transaction posted in a period so that the completeness of the data structure and addresses are communicated and used by any other node in the network to recreate and confirm the completeness of the data structure and unique address without the need to confer with the originating nodes or parties or other nodes or parties in the network. This method further comprises hash-linking a data address to a hash of any prior utilized address in a structured or unstructured way which is referenced in the data address data such that when it is communicated to the network of multiple nodes for multiple parties, any node recreates and validates the hash link to verify the consistency of the originating nodes data structure without the need to confer with the originating node or parties or other nodes or parties within the network.

In accordance with one embodiment of the method described in the preceding paragraph, every transaction in the network between two or more parties transacting utilizes coded script and securely shares data to agreed script parameters and shares transaction security and linking data at one or more nodes to create contra-transactions that reflect their distinct obligations for transfers or contingent transfers such that the contra-transactions are linked, validated and matched to justify the update of ownership data without the need to confer with the originating nodes or parties or other nodes or parties in the network. Across the network, two originating nodes generate distinct and unique private key encrypted hashes, whereby the hashes are created from a set of transaction data fields and transacting node identity is shared and recorded by the originating nodes on a reciprocal transaction as a means to link the contra-transactions and validate the identity of the originating nodes and prevent interference unless the two private keys of the originating nodes are known. Mathematical transformations of the transacting parties public encryption key in conjunction with transaction data and a random nonce create a unique, confidential identifier for every position on the distributed ledger or database ownership log when it is created to be posted to the ownership log maintained by every participating node on the network, thereby revealing the identity of the transacting parties whenever the transaction data and nonce are provided to a node which is independent of the nodes of the transacting parties. A further mathematical transformation of a unique identifier with transaction data and a random nonce may be used to create an encumbrance for the value, records or information recorded on the distributed ledger or database ownership log such that the value can only be unlocked by the transacting party that knows the transaction data and random nonce combined with the mathematical transformation.

In accordance with the embodiments disclosed in detail below, two transacting parties via respective originating nodes process respective contra-transactions for a single asset transfer and then broadcast to the distributed ledger or database network of multiple parties or nodes, whereby the contra-transactions can be matched and validated by the multiple nodes in the network to update their distributed ledgers or databases in the network to confirm the related update to the ownership log is staged to occur immediately or at a time or event-driven time in the future whether the position transferred is a pledge or a loan, is ledger referenced or unreferenced, is specified or unspecified, and is future-dated or variable dependent. In the alternative, two transacting parties via respective originating nodes process respective pairs of contra-transactions for contingent, bi-directional dual asset transfers which are broadcast to the distributed ledger or database network of multiple parties or nodes, whereby the pairs of contra-transactions are matched and validated by the multiple nodes in the network to update their distributed ledgers or databases of contingent transfers in the network to confirm the related creation and processing of the two pairs of contra-transactions is staged to occur immediately or at a time or event-driven time in the future whether the positions for either of the dual assets transferred are a pledge or a loan, are ledger referenced or unreferenced, are specified or unspecified, and future-dated or variable dependent position.

Other aspects of a distributed ledger for financial services transactions that utilizes blockchain technology are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 13 is a diagram identifying transfer entries in an ownership log in accordance with one embodiment.

FIG. 15 is a diagram identifying pledge and pledge return entries in an ownership log in accordance with one embodiment.

FIG. 16 is a diagram identifying loan and loan return entries in an ownership log in accordance with one embodiment.

FIG. 17A is a diagram identifying ownership log entries for Airlock transfer in.

FIG. 17B is a diagram identifying ownership log entries for Airlock transfer out.

FIG. 19B is a diagram showing the process for digitally signing and verifying a receipt transfer contra-transaction.

FIG. 30 is a legend showing how respective portions of a schematic hereinafter described as FIG. 30A and FIG. 30B are intended to be viewed to form one complete view of the schematic.

FIG. 30A and FIG. 30B are respective portions of a schematic illustrating an asset transfer workflow in a network comprising one node that creates the delivery contra-transaction, another node that creates the receipt contra-transaction and an independent node that records the transaction and balances in accordance with one embodiment.

FIG. 32 is a legend showing how respective portions of a schematic hereinafter described as FIG. 32A and FIG. 32B are intended to be viewed to form one complete view of the schematic.

FIG. 32A and FIG. 32B are respective portions of a schematic illustrating a loan process workflow in a network comprising one node that creates the delivery contra-transaction, another node that creates the receipt contra-transaction and an independent node that records the transaction and balances in accordance with one embodiment.

FIG. 34 is a legend showing how respective portions of a schematic hereinafter described as FIG. 34A and FIG. 34B are intended to be viewed to form one complete view of the schematic.

FIG. 36 is a legend showing how respective portions of a schematic hereinafter described as FIG. 36A, FIG. 36B, and FIG. 36C are intended to be viewed to form one complete view of the schematic.

FIG. 37 is a legend showing how respective portions of a schematic hereinafter described as FIG. 37A, FIG. 37B, and FIG. 37C are intended to be viewed to form one complete view of the schematic.

FIG. 37A, FIG. 37B, and FIG. 37C are respective portions of a schematic illustrating a short contingent transfer fill workflow in a network comprising one node that creates the delivery contra-transaction, another node that creates the receipt contra-transaction and an independent node that records the transaction and balances in accordance with one embodiment.

Reference will hereinafter be made to the drawings in which similar elements in different drawings bear the same reference numerals.

DETAILED DESCRIPTION

Figure 1:
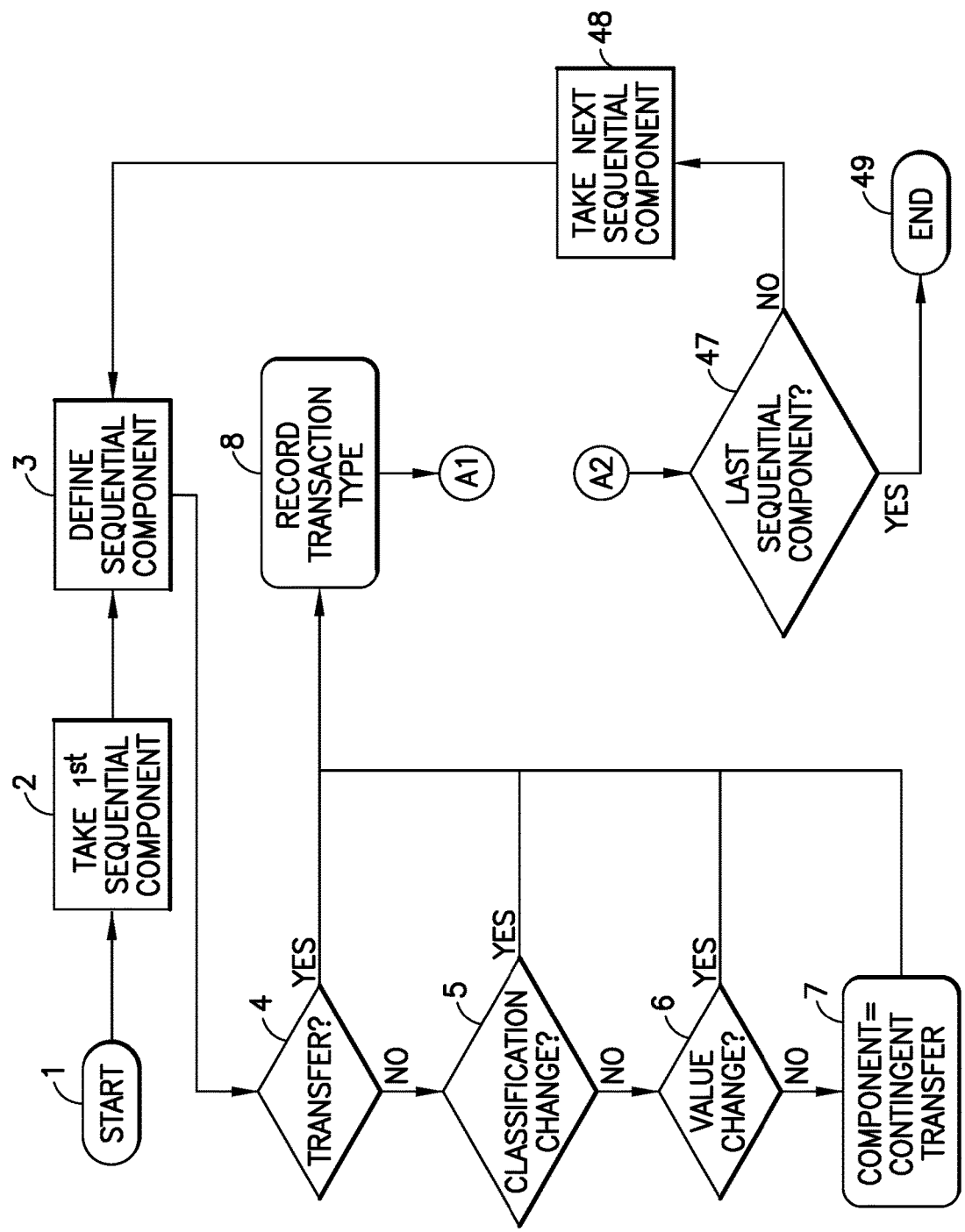
FIGS. 1 through 6 are flowcharts identifying steps of a genome script building process in accordance with one embodiment.

Illustrative embodiments of a distributed ledger for financial services transactions that utilizes blockchain technology are described in some detail below. However, not all features of an actual implementation are described in this specification. A person skilled in the art will appreciate that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The process, business logic and controls of the blockchain solutions will now be described in general. The core component of the proposed blockchain technology, with respect to the business requirements, is that the transacting parties (TPs) will be agreeing and broadcasting via network nodes a sequential series of transactions as defined within the aforementioned "genome". The genome consists of four sequential transactional components, specified by four categories of parameters. The four sequential transactional components are: (1) an asset transfer A between two parties; (2) an asset classification change C; (3) a gain or loss G (i.e., time-driven increase/decrease in value (e.g., asset versus currency)), and (4) a contingent transfer T (i.e., a reciprocal transfer of two assets between two parties). The parameters, for which various combinations will exist for each sequential component are: (I) contractual elements: number, amounts and value; (II) timing: single event, periodic events and multiple events; (III) generated events: data, state, choice and gain/loss; and (IV) asset classification: primary, secondary and/or tertiary assets.

Any transaction within a financial services life-cycle consists of two contra-transactions. A transaction could be either a transfer or a contingent transfer. A transfer is the fundamental transaction. The contra-transactions for a transfer are delivery versus receipt. A "contingent (bilateral, dual asset) transfer" (e.g., RVP/DVP or foreign exchange), while needing to be represented and controlled as a complete, self-contained transaction itself, is effectively two simultaneous contra-transactions. The contra-transactions for a contingent transfer are delivery versus receipt and receipt versus delivery. A "loan" is a transfer or a contingent transfer with a classification of the asset lent. A "pledge is a transfer or a contingent transfer with a classification of the asset pledged.

For the above transactions, there will also be "short" versions, i.e., the transactions without a ledger referenced value to transfer. For transactional components (3) and (4), there will be loan and pledge "return" transactions. Loans and pledges made versus cash or collateral will be processed as contingent transfers with the loan or pledged classification in the received amount.

The agreement and mechanism for the execution of the transactions will be achieved through Turing-incomplete shared-source code and network-approved scripts. The implementation of this technology and code functionality can be refined over time. Taking this variability into account, the following assumptions may be made:

(a) The execution of a transaction will occur outside the network. The commercial implementation of the blockchain technology envisages that the two parties will keep a private copy of digitally signed executions cross referenced to the confidential public record (which is the blockchain solution outlined in this disclosure), but the private copy process of the executed transactions is beyond the scope and consideration of this functionality. A future state of this network, registered as an exchange, alternative trading system or electronic communication network, could provide execution capabilities directly as a component of its scripted and coded functionality. As a registered depository, the network could potentially issue and perfect its own digital securities and currencies.

(b) While the implementation of a distributed ledger does not require a central intermediary, the initial commercial implementation of this technology will require a central utility for the purposes of holding omnibus securities positions with a depository, sub-custodian or transfer agent and cash with a bank or central bank. Note: Until a distributed network can perfect and service all types of securities and cash assets within its own network (e.g., bitcoin, Ether), this utility will be a requirement of all distributed ledger network solutions. For the purposes of transacting within the network, all functionality of the utility can be ignored and any transactions of value into and out of the network need only be reflected by their record on the ledger in the solution referred to herein as the "Airlock".

(c) The process, business logic and controls utilizing a new distributed ledger logic will replicate middle and back-office processing and controls, such as confirm/affirm, clearance and settlement.

(d) For the above, the logic disclosed herein shows a dependency on the receiving TP ($TP_{Rec}$) confirming the delivering TP ($TP_{Del}$). With the nature of trading, this can be done electronically or at the point of execution.

(e) While the high-level logic of the code and script-driven interaction between TPs is an outline, for the purpose of this functionality, it only has to be considered from a sense of generating the standardized genome sequential components as it may ultimately take on many different forms.

(f) The scripts will allow the TPs to agree and generate a sequential set of the defined contra-transactions between each other and broadcast them to the network.

(g) While the system and method disclosed herein incorporate a solution for a commercial implementation of broker fills (i.e., multiple market executions to "fill" a client order) and fund manager allocations (i.e., multiple "allocated" settlements against different accounts) for block trades, this disclosure predominantly focuses on single transfers and contingent transfers.

(h) Post "execution", the code and scripts will allow each of the TPs and their nodes to generate and share the common and distinct data in each transaction to each other. The fractal lattice-driven, n-dimensional means to organize and link the distributed ledger data via unique data addresses and hash-linking is the re-creatable record for the other nodes.

(i) Each transacting party and its node can match the transaction data and create and broadcast its contra-transaction to the network.

(j) Based on matched and validated copies of both contra-transactions, all nodes will be able to update their copies of the distributed ledger and confirm accuracy, integrity, consistency and completeness.

(k) The records for the distributed ledger in the commercial implementation of the solution will be segregated by node per asset or groups of assets (e.g., index's, industry sectors, etc.). For the purposes of this disclosure, the assumption will be that the records will just be segregated by node per single asset.

(l) While the secure recording and transfer of value is the first critical component of a market or of facilitating commercial transactions, there are many downstream processes or obligations (regulatory-driven or otherwise) that are necessary as well. The flexible, consistent and distributed data structure adopted herein allows for further data enhancement and reporting to be easily implemented by adding fields to the current records or linking off-chain data by the unique transaction and balance identifiers.

(m) For reflecting assets, the network will use agreed industry standard identifiers. However, to reflect cash and currency transactions, they will also be reflected as assets that all nodes in the network transact.

(n) The self-defining and self-validating nature of the distributed ledger removes the need for consensus or puzzle solving and so focuses the computing power of each node on processing and validating transactions. The only other communication within the network will be to identify, resolve or broadcast status of incomplete or erroneous transactions. While it is envisaged, that there may be sample confirmations of end of period (EOP) hashes, they are not required but may be used as an additional control.

(o) In accordance with one commercial implementation, the design disclosed herein can be implemented in a private, permissioned network. There will have to be an assumption of evolving standards and practices agreed amongst the participating nodes, which can be used as an additional means to limit bad behavior such as those used in stock or futures exchanges.

(p) At the end of a transacting period, before shutting down transmission of transactions, a node will mark its last transaction as its "last" or an empty (null) transaction as "end", so any other node will then know its copy of that node's fractal lattice-structured transaction log is complete.

(q) After broadcasting and receiving all transactions to/from the network, each node will hash its copies of the ownership logs and fractal lattice-structured transaction logs to the hash of the prior period's respective ownership logs and fractal lattice-structured transaction logs.

(r) The start-of-period (SOP) ownership log will start with the hash from the prior period's end-of-period (EOP) ownership log.

(s) Each fractal lattice-structured transaction log for a new period will start with a hash of the prior period's fractal lattice-structured transaction logs. The first transaction of the period, posted to FL Address: 1, will be hash linked to that hash.

The process, business logic and controls of the blockchain solutions in accordance with one embodiment will now be described in detail using the terminology listed in Tables 1 through 3.

TABLE 1

Terminology for General, Parties and Nodes

| Terminology | Definition |
|---|---|
| Transfer | A simple transfer of one asset between two parties (e.g., payment or free delivery) |
| DVP/RVP | Deliver versus payment/receive versus payment |
| DVR/RVD | Deliver versus receive/receive versus deliver |
| Contingent Transfer | A simultaneous exchange of two assets between two parties (e.g. DVP/RVP or FX) |
| TP | Transacting party |
| Asset | An asset used in a transfer |
| Amt | The amount of an asset in a transaction or ownership log position record, recorded in the units in which the asset is transacted |
| $Asset_{AB}$ or Asset_AB | One of two different assets in a contingent transfer |
| $AssetB_{BA}$ or Asset_BA | One of two different assets in a contingent transfer |
| $TP_{DEL}$ or TP_Del | Delivering transacting party |
| $TP_{REC}$ or TP_Rec | Receiving transacting party |
| $TP_{ABBA}$ or TP_ABBA | Contingent transfer transacting party delivering $Asset_{AB}$ and receiving $Asset_{BA}$ |
| $TP_{BAAB}$ or TP_BAAB | Contingent transfer transacting party delivering $Asset_{BA}$ and receiving $Asset_{AB}$ |
| $N_{DEL}$ or N_Del | A node that creates the delivery contra-transaction in a transfer |
| $N_{REC}$ or N_Rec | A node that creates the receive contra-transaction in a transfer |
| $N_{ABBA}$ or N_ABBA | The node that creates the contingent transfer for $TP_{ABBA}$ |
| $N_{BAAB}$ or N_BAAB | The node that creates the contingent transfer for $TP_{BAAB}$ |
| $N_{IND}$ or N_Ind | A node that is uninvolved in a particular transaction but records transactions and balances for future use and reference |
| Sk | Secret or private encryption key |
| Pk | Public encryption key |
| Encrypted # or E# | Standard, defined encrypted hash for defined fields, which are different for N_Del Tx_Del and N_Rec Tx_Rec[1] (see Table 2) |
| Encumbrance | This is a nonce or other mechanism to lock the value on the ownership log (OL). |

TABLE 1-continued

Terminology for General, Parties and Nodes

| Terminology | Definition |
|---|---|
| Nonce | This is a 64-digit hexadecimal number generated by a hash or random number generator for use in the encumbrances or masking (i.e., making confidential) a TP's identity. |
| SOP | Start of Period. This is the beginning point where the OLs are hashed to the prior period's EOP OL and there are no transactions created. |
| EOP | End of Period. This is the point where transacting stops, the fractal lattice-structured transaction logs are archived and OLs are hashed to create the SOP OL. Effectively this is the date flip mechanism. |
| IDP | Intra-Day Period. All time between SOP and EOP. |

[1]Note:

The encrypted # can be sent without the "message" as per normal encryption protocol as it can be compiled from the select combined data fields after matching $Tx_{DEL}$ and $Tx_{REC}$ but only after both have been matched.

TABLE 2

Terminology for Transaction Logs

| Terminology | Definition |
|---|---|
| FL | Fractal lattice-structured transaction log utilizing a mathematical and sequential database data linkage and reference methodology |
| FL ID | Unique identifier for a node's FL |
| $FL_{Address}$ or FL__Address | A unique, mathematically and sequentially defined position within the structure of the FL |
| $FL_{Cntg}$ or FL__Cntg | The fractal lattice used by each node to record contingent transfers |
| Fn | The fractal number of the FL used |
| $\#_{LINK}$ or #__Link | Hash link of prior layer $FL_{Address}$ to lower linked $FL_{Address}$ |
| Tx | Transaction (a transfer or a contingent transfer) |
| $Tx_{DEL}$ or Tx__Del | Delivery contra-transaction for a transfer |
| $Tx_{REC}$ or Tx__Rec | Reception contra-transaction for a transfer |
| $Tx_{DEL}$ # or Tx__Del # | A hash of the delivery contra-transaction details |
| $Tx_{REC}$ # or Tx__Rec # | A hash of the reception contra-transaction details |
| $Tx_{ABBA}$ or Tx__ABBA | Contra-transaction for contingent transfer transacting party delivering $Asset_{AB}$ and receiving $Asset_{BA}$ |
| $Tx_{Del-AB}$ or Tx__Del-AB | Individual contingent transfer for delivering $Asset_{AB}$ |
| $Tx_{Rec-BA}$ or Tx__Rec-AB | Individual contingent transfer for receiving $Asset_{AB}$ |
| $Tx_{BAAB}$ or Tx__BAAB | Contra-transaction for contingent transfer transacting party delivering $Asset_{BA}$ and receiving $Asset_{AB}$ |
| $Tx_{Del-BA}$ or Tx__Del-BA | Individual contingent transfer for delivering $Assete_{BA}$ |
| $Tx_{Rec-AB}$ or Tx__Rec-BA | Individual contingent transfer for receiving $Assete_{BA}$ |

TABLE 3

Terminology for Ownership Logs

| Terminology | Definition |
|---|---|
| OL | Ownership log - each node's database of holdings within an asset |
| OL ID | Unique ownership log identifier, assigned by the $TP_{REC}$, to each "long" position recorded on the OL |
| OL ID 1 | Unique identifier assigned against each position or lot of an asset's value that a TP owns and will use as $TP_{DEL}$. A TP may have multiple unique OL identifiers per asset. |
| OL ID $2_{Short}$ or OL ID 2__Short | When a short transaction is entered into, the $TP_{REC}$ will create a OL ID 2 for the position to be filled, which will be recorded on the $FL_{Short}$ or $FL_{Cntg}$. |
| OL ID 2 | Unique identifier assigned by the $TP_{REC}$ for the amount to be transferred and added as a new record to the OL |

TABLE 3-continued

Terminology for Ownership Logs

| Terminology | Definition |
| --- | --- |
| OL ID 3 | Unique identifier assigned by the $TP_{DEL}$ for the net amount retained after the transfer and added as a new record to the OL |
| OL ID $n_{AB}$ or OL ID n__AB | Any OL identifier for $Asset_{AB}$ used in a contingent transfer |
| OL ID $n_{BA}$ or OL ID n__BA | Any OL identifier for $Asset_{BA}$ used in a contingent transfer |
| OL $ID_L$ or OL ID__L | OL identifier for a loaned position |
| OL $ID_B$ or OL ID__B | OL identifier for a borrowed position |
| OL $ID_{PLF}$ or OL ID__PLF | OL identifier for a pledged (collateral) position from a TP |
| OL $ID_{PLT}$ or OL ID__PLT | OL identifier for a pledged (collateral) position to a TP |
| OL $ID_P$ or OL ID__P | OL identifier for a short or future-dated "payable" transfer |
| OL $ID_R$ or OL ID__R | OL identifier for a short or future-dated "receivable" transfer |

Within a permissioned network, there will be shared source code. Part of the controls for the code will be to keep it as simple as possible and ideally Turing-incomplete. The genome described in detail below is a mechanism to define any financial services life-cycle in terms of generic sequential components.

As previously disclosed, the genome represents a set of four parameter-driven building blocks (i.e., an asset transfer, an asset classification change, a gain or loss, and a contingent transfer) which, when combined in different series of sequential orders, can create any transaction life-cycle in the financial services. This means that any code of scripts can be written for the generic building blocks and all transactions will be variations on the themes of block-built transaction logic. Genome-derived transactions can then easily be formed into the standardized contractual scripts which any set of counterparties can enter into. The genome-derived transactions allow for the known and consistent recording of transactions on the decentralized ledger. Having all transaction activity within the network driven by a standard set of building blocks prevents any fraudulent activity by any unique or exception-based transactions. The standards also allow two counterparties to agree upon the transaction script to be executed within the network beyond the parameters of the particular trade. Each transacting party's node will also independently generate complementary contra-transactions (i.e., a delivery for every reception), which creates a control means for validating each transaction pair; raising the level difficulty of malfeasance by involving two parties and making error spotting and correction easier.

For example: a payment is a single-timing, asset transfer (A). The normal trade of any security for cash would be a contingent transfer (T). Financed transactions can involve both single and contingent asset transfers, which will be driven by gains and losses (e.g., margin calls) as well as collateral designation and pledging (e.g., a change of a secondary security's state). Further transactions could be driven by "generated" credit events (e.g., change of borrower and lender states). All these possibilities can be constructed from various combinations of the four sequential transactional components. A representative set of sample life-cycles are listed in Table 4.

TABLE 4

Representative Set of Sample Life-Cycles

| | Transaction | Representative Summary Transactional Components | |
| --- | --- | --- | --- |
| 1 | Payment | Single transfer of asset (cash) between two parties | A |
| 2 | Free Delivery | Single transfer of asset (securities) between two parties | A |
| 3 | FX & FX Forward | Reciprocal transfer of two assets (currencies) between two parties | T |
| 4 | FX Roll (Swap) | Parties engage in swap: Reciprocal transfer of two assets (currencies) between two parties, which can be rolled at the choice of the two parties | T |
| | | Reverse, future-dated, reciprocal transfer of two assets (currencies) between two parties | T |
| | | Value gain/loss between two assets (currencies) | G |
| | | Single transfer (FX forward gain/loss) of asset (cash) between two parties | A |
| 5 | Loan (Cash) - Balloon Payment | Loan Issued: Single transfer of asset (cash) between two parties. | A |
| | | Future-dated -- interest rate-driven -- reverse multiple single transfers of asset (cash) | A |
| | | Future-dated reverse single transfer of asset (cash) | A |

TABLE 4-continued

Representative Set of Sample Life-Cycles

| | Transaction | Representative Summary Transactional Components | |
|---|---|---|---|
| 6 | Loan (Cash) - P&I Payment | Loan Issued: Single transfer of asset (cash) between two parties. | A |
| | | Future-dated -- interest rate-driven -- reverse multiple single transfers of asset (cash) | A |
| 7 | Receive versus Payment/Delivery versus Payment | Reciprocal transfer of two assets (securities and cash) between two parties. | T |
| 8 | Repo | Reciprocal transfer of two assets (securities and cash) between two parties, which can be rolled at the choice of the two parties. | T |
| | | Classify cash/securities as collateral | C |
| | | Future-dated reverse transfer of two assets between two parties | T |
| | | If debtor bankrupt or credit event trigger | C |
| | | Credit-driven, collateral liquation with other third party | T |
| | | If repo settled: Credit-driven principal + excess settlement; repo classified as settled | A |
| 9 | Margin Loan (Long) - Borrower | Single transfer of asset (cash) between two parties as payable | A |
| | | Buy: Reciprocal transfer of two assets (securities and cash) between two parties. | T |
| | | Payable fill as loan | A |
| | | Pledge of securities as collateral | A |
| | | Classification of securities as collateral | C |
| | | Mark-to-market valuation of collateral versus securities | G |
| | | Mark-to-market collateral transfer | A |
| | | Single transfer of asset (cash + interest) from client to broker | A |

Various processes employed in one embodiment of a distributed ledger system for executing financial transactions will now be described in detail.

Genome Script Building Process

FIGS. 1 through 6 are flowcharts identifying steps of a genome script building process in accordance with one embodiment. A Turing-incomplete code consists of simple read, write and stacking functionality with only conditional flow and no loops. Once a life-cycle has been defined in terms of its genome components, the functional steps can be assembled by the following logical flow (Start is indicated as step 1 in FIG. 1):

Taking the first transactional component (step 2), the type can be defined (step 3) by its specification, which determines how it is handled. Then a determination is made whether (or not) the transactional component will be either a transfer (step 4), a classification change (step 5), a value change (step 6) or a contingent transfer (step 7). Once the transaction type has been determined, the transaction type will be recorded (step 8). The genome script building process then proceeds to the parameter assignment algorithm depicted in FIG. 2 (see connection point A1 in FIGS. 1 and 2).

Figure 2:
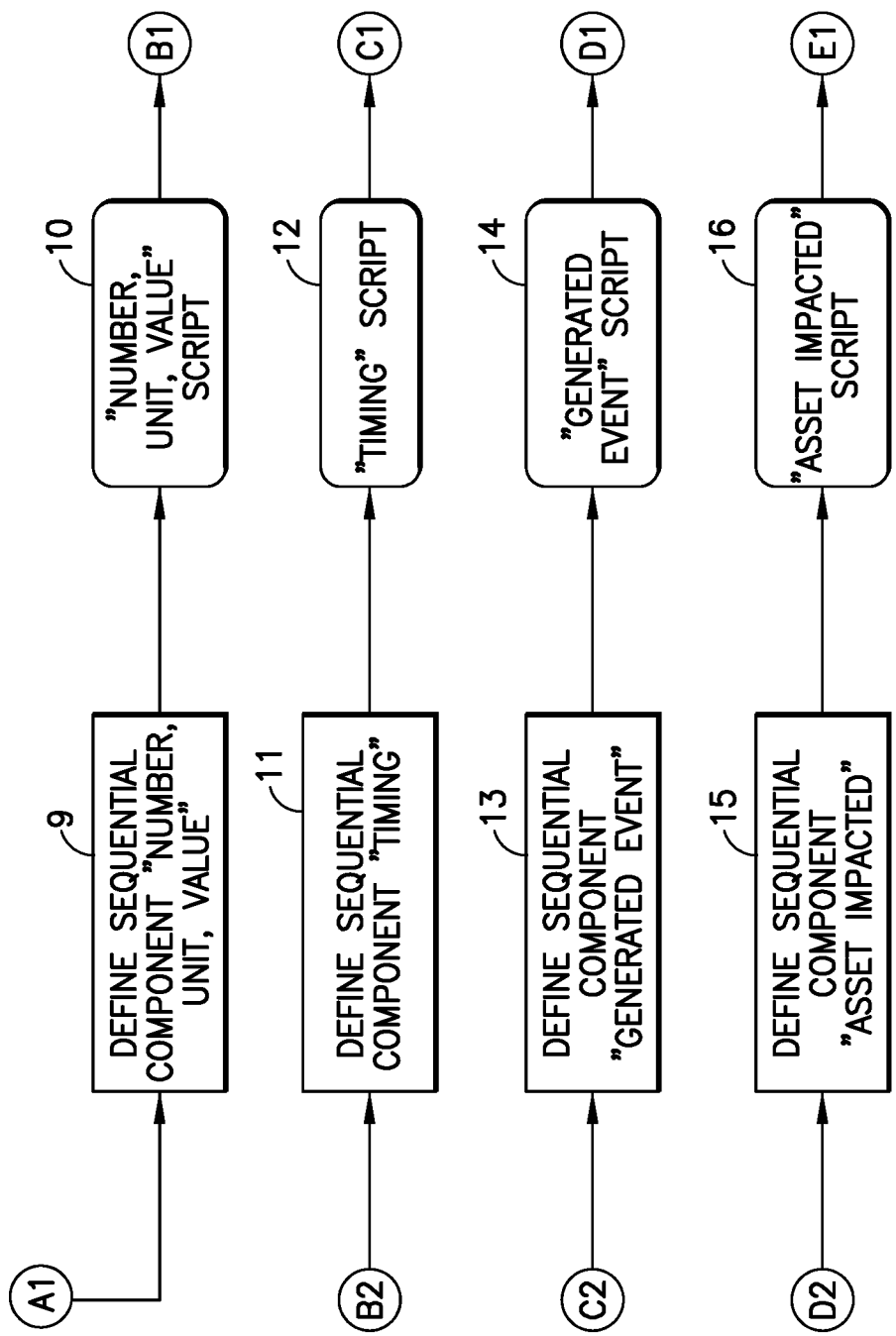
Figure 3:
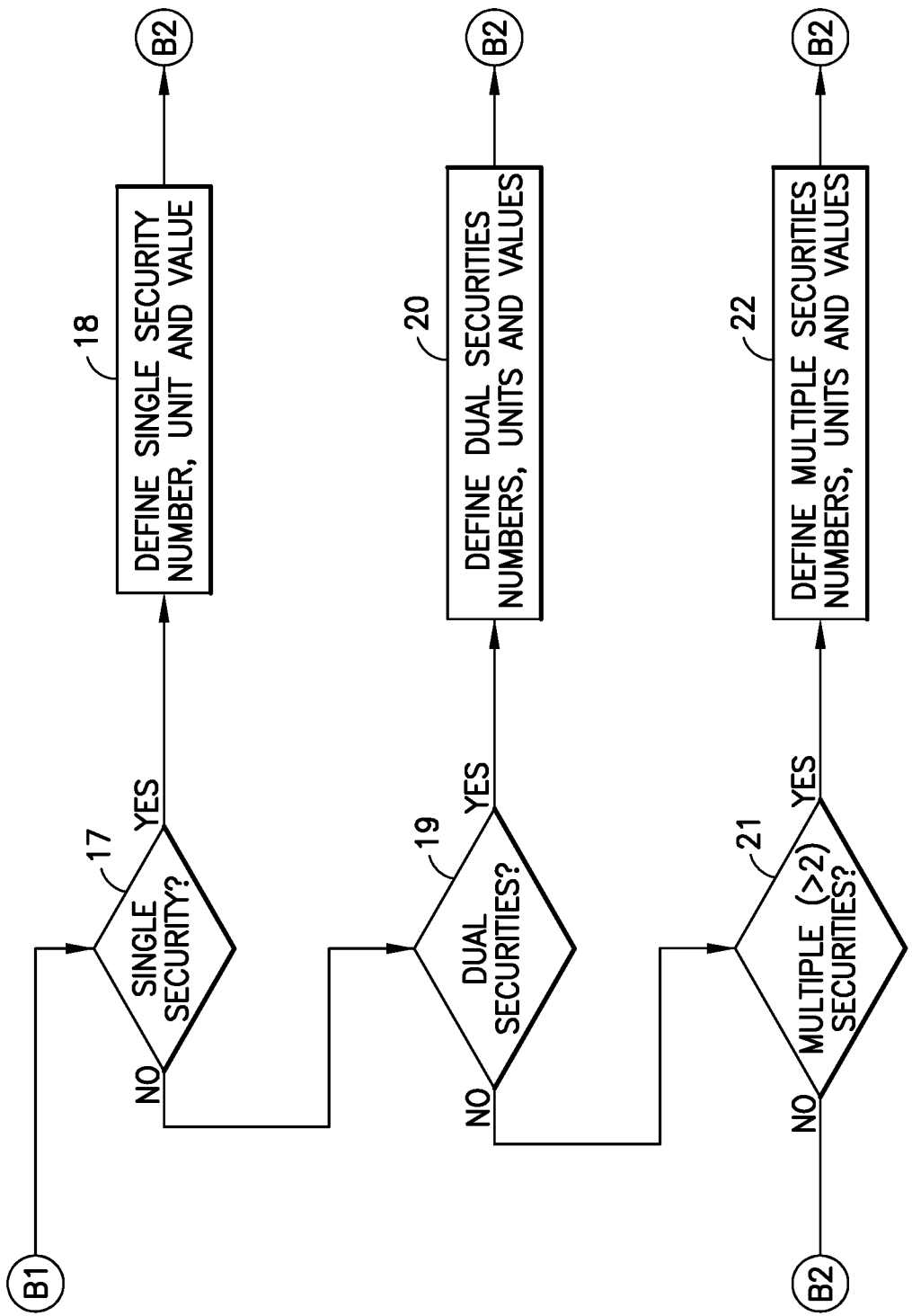

Referring to FIG. 2, each transactional component will be associated with an asset or assets, so the number (or identifier) and units (of value) must be assigned and a value may be assigned (step 9) to be used in the "Number, Unit, Value" script 10 (see connection point B1 in FIGS. 2 and 3). Referring to FIG. 3, a determination is made whether the transactional component involves a single security or not (step 17). If the transactional component involves a single security, then a number and a unit will be assigned and a value may be assigned (step 18). If a determination is made in step 17 that the transactional component does not involve a single security, then a determination is made whether the transactional component involves dual securities or not (step 19). If the transactional component involves dual securities, then numbers and units will be assigned and values may be assigned (step 20). If a determination is made in step 19 that the transactional component does not involve dual securities, then a determination is made whether the transactional component involves multiple securities or not (step 21). If the transactional component involves multiple securities, then numbers and units will be assigned and values may be assigned (step 22). The next parameter to be assigned is the timing (see connection point B2 in FIGS. 2 and 3).

Figure 4:
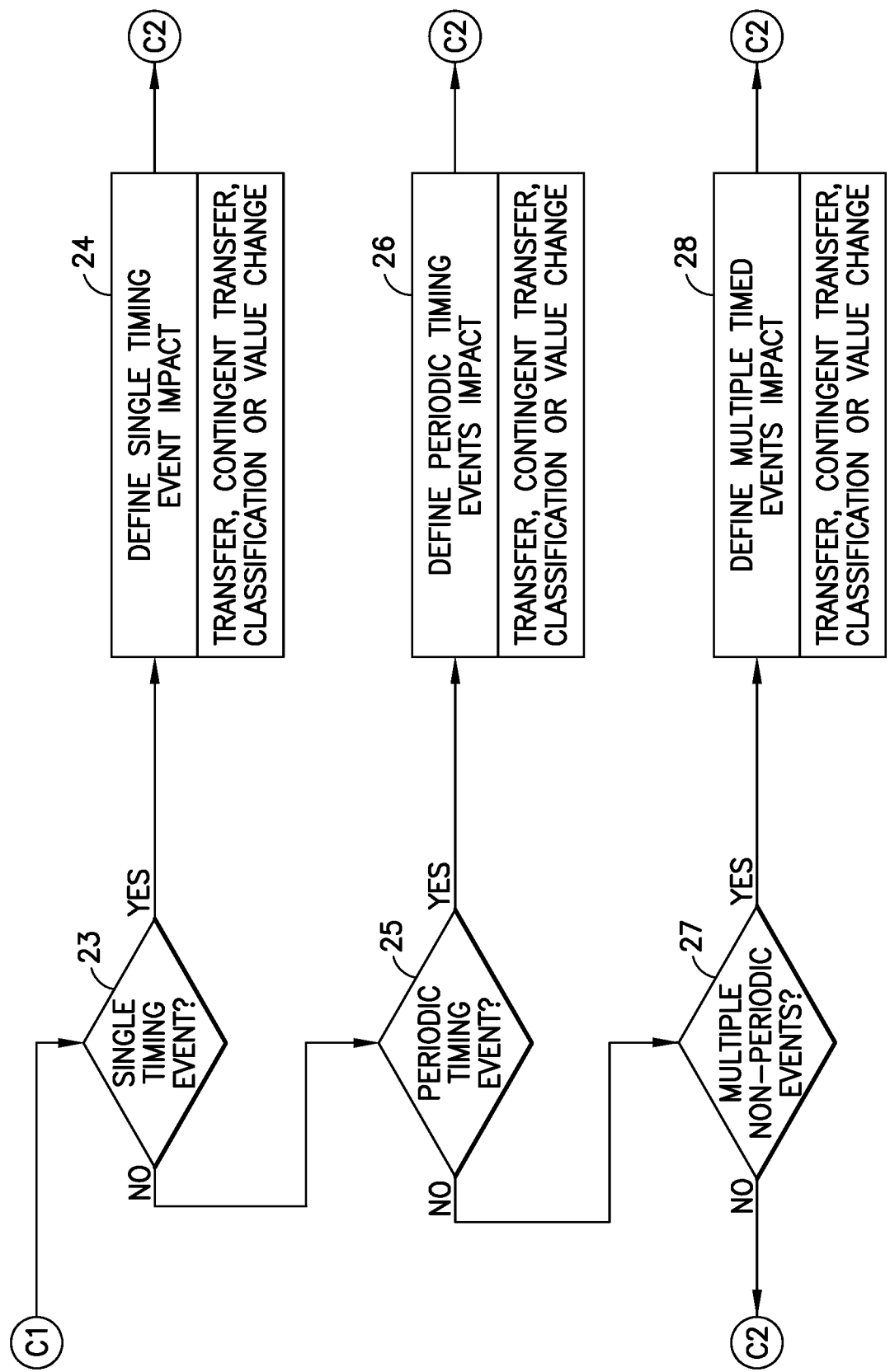

Referring again to FIG. 2, each transactional component may have a timing-driven event, so the timing may be determined (step 11) to be used in the "Timing" script 12 (see connection point C1 in FIGS. 2 and 4). Referring to FIG. 4, a determination is made whether the timing event is a single event, which will then cause a subsequent transactional component to occur, or not (step 23). If a determination is made in step 23 that the timing event is a single event, then the impact will be defined as a transfer, contingent transfer, classification change or value change (step 24). If a determination is made in step 23 that the timing event is not a single event, then a determination is made whether the timing event is periodic or not (step 25). If a determination is made in step 25 that the timing event is periodic, then the impacts will be defined as transfers, contingent transfers, classification changes or value changes (step 26). If a determination is made in step 25 that the timing event is not periodic, then a determination is made whether the timing events are multiple, non-periodic events or not (step 27). If a determination is made in step 27 that the timing events are multiple, non-periodic events, the impacts will be defined as transfers, contingent transfers, classification changes or value changes (step 28). The next parameter assignment may be generated events (see connection point C2 in FIGS. 2 and 4).

Figure 5:
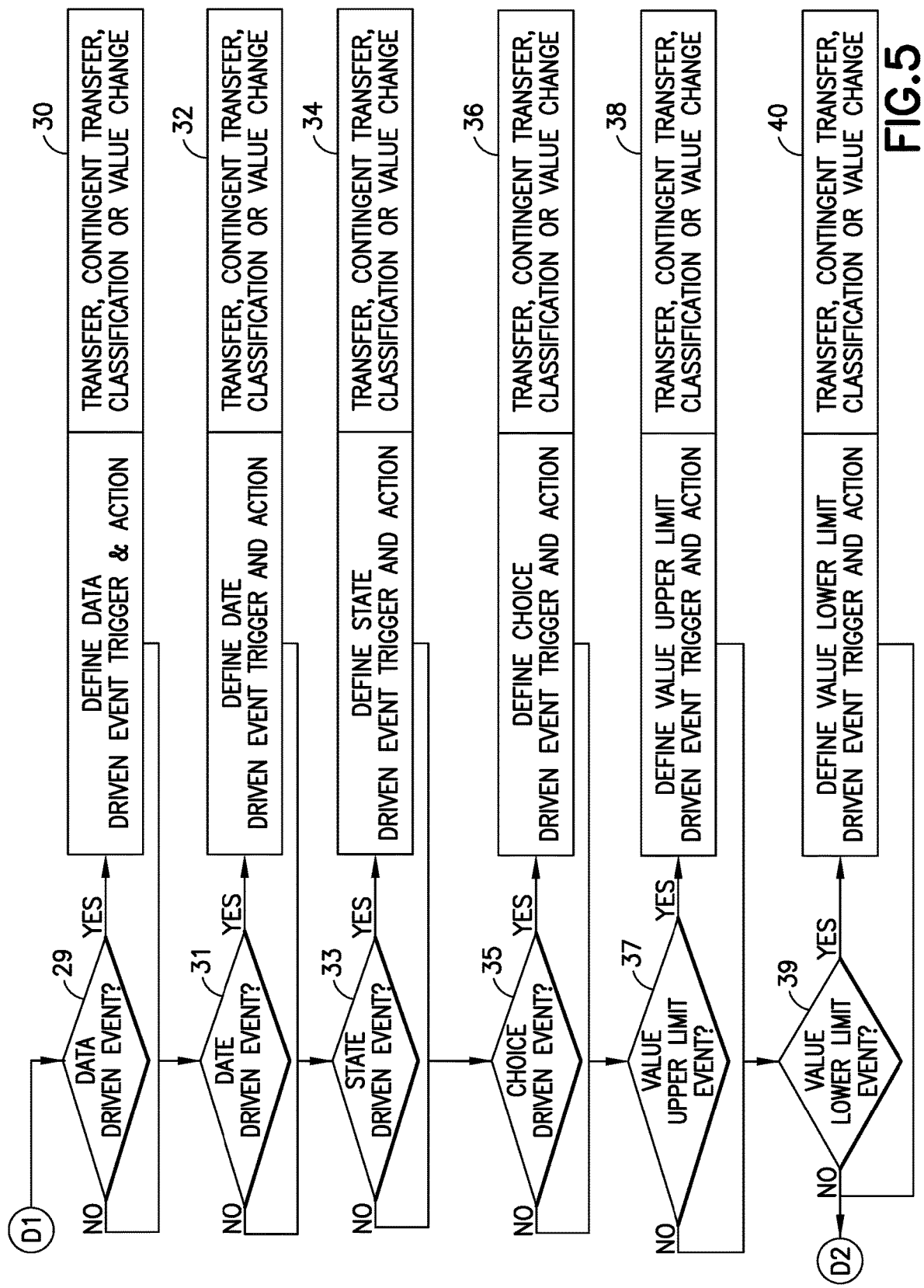

Referring again to FIG. 2, each transactional component may have a generated event, so the generated event may be determined (step 13) to be used in the "Generated Event" script 14 (see connection point D1 in FIGS. 2 and 5). Referring to FIG. 5, a determination is made whether the event is a data-driven event or not (step 29). If a determination is made in step 29 that the event is a data-driven event, then the trigger event and action or impact will be recorded against that parameter (step 30). After step 30 or if a determination is made in step 29 that the event is not a data-driven event, then a determination is made whether the event is a date-driven event or not (step 31). If a determination is made in step 31 that the event is a date-driven event, then the trigger event and action or impact will be recorded against that parameter (step 32). After step 32 or if a determination is made in step 31 that the event is not a date-driven event, then a determination is made whether the event is a state-driven event or not (step 33). If a determination is made in step 33 that the event is a state-driven event, then the trigger event and action or impact will be recorded against that parameter (step 34). After step 34 or if a determination is made in step 33 that the event is not a state-driven event, then a determination is made whether the event is a choice-driven event or not (step 35). If a determination is made in step 35 that the event is a choice-driven event, then the trigger event and action or impact will be recorded against that parameter (step 36). After step 36 or if a determination is made in step 35 that the event is not a choice-driven event, then a determination is made whether the event is a value upper limit event or not (step 37). If a determination is made in step 37 that the event is a value upper limit event, then the trigger event and action or impact will be recorded against that parameter (step 38). After step 38 or if a determination is made in step 37 that the event is not a value upper limit event, then a determination is made whether the event is a value lower limit event or not (step 39). If a determination is made in step 39 that the event is a value lower limit event, then the trigger event and action or impact will be recorded against that parameter (step 40). The next parameter assignment will be the type of asset (e.g., security) impacted (see connection point D2 in FIGS. 2 and 4).

Figure 6:
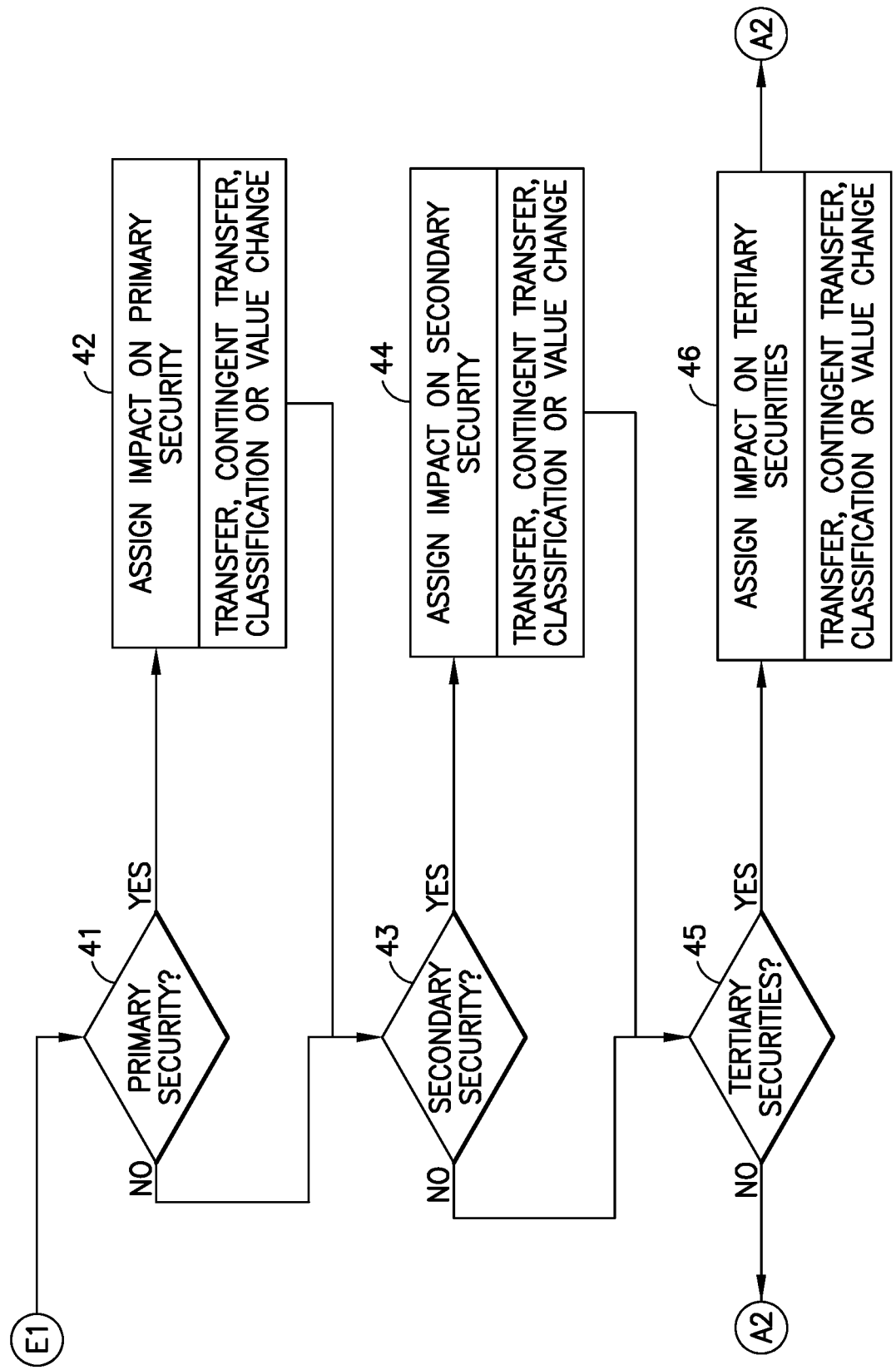

Referring again to FIG. 2, each transactional component action or impact will affect one of the security types, so the impacted asset may be determined (step 15) to be used in the "Asset Impacted" script 16 (see connection point E1 in FIGS. 2 and 6). Referring to FIG. 6, each transaction component action or impact will affect one of the security types. If the security impacted is the primary security (as determined in step 41), then the impact will be assigned to that primary security (step 42). If the security impacted is the secondary security (as determined in step 43), then the impact will be assigned to that second security (step 44). If the securities impacted are tertiary securities (as determined in step 45), then the impact will be assigned to the tertiary securities (step 46). The script component will now be fully defined as far as securities and impact events driven by certain triggers. The genome script building process then proceeds to step 47 seen in FIG. 1 (see connection point A2 in FIGS. 1 and 6). A determination is made whether the most recently processed transactional component is the last transactional component to be processed (step 47). If a determination is made in step 47 that there are more components to the script, then the next component will be lined up for definition (step 48) and the genome script building process will return to step 3. If a determination is made in step 47 that the most recently processed transactional component was the last component, then the genome script building process will end (step 49).

Genome Script Running Process

FIGS. 7 through 12 are flowcharts identifying steps of a genome script running process in accordance with one embodiment. The script running logic will be executed in the order of its sequential components and follows a parallel logic to the script building logic. The components may be pending over long periods of time waiting for conditional events or triggers to occur, whereupon the correct parameter-driven event or impact can be executed.

Figure 7:
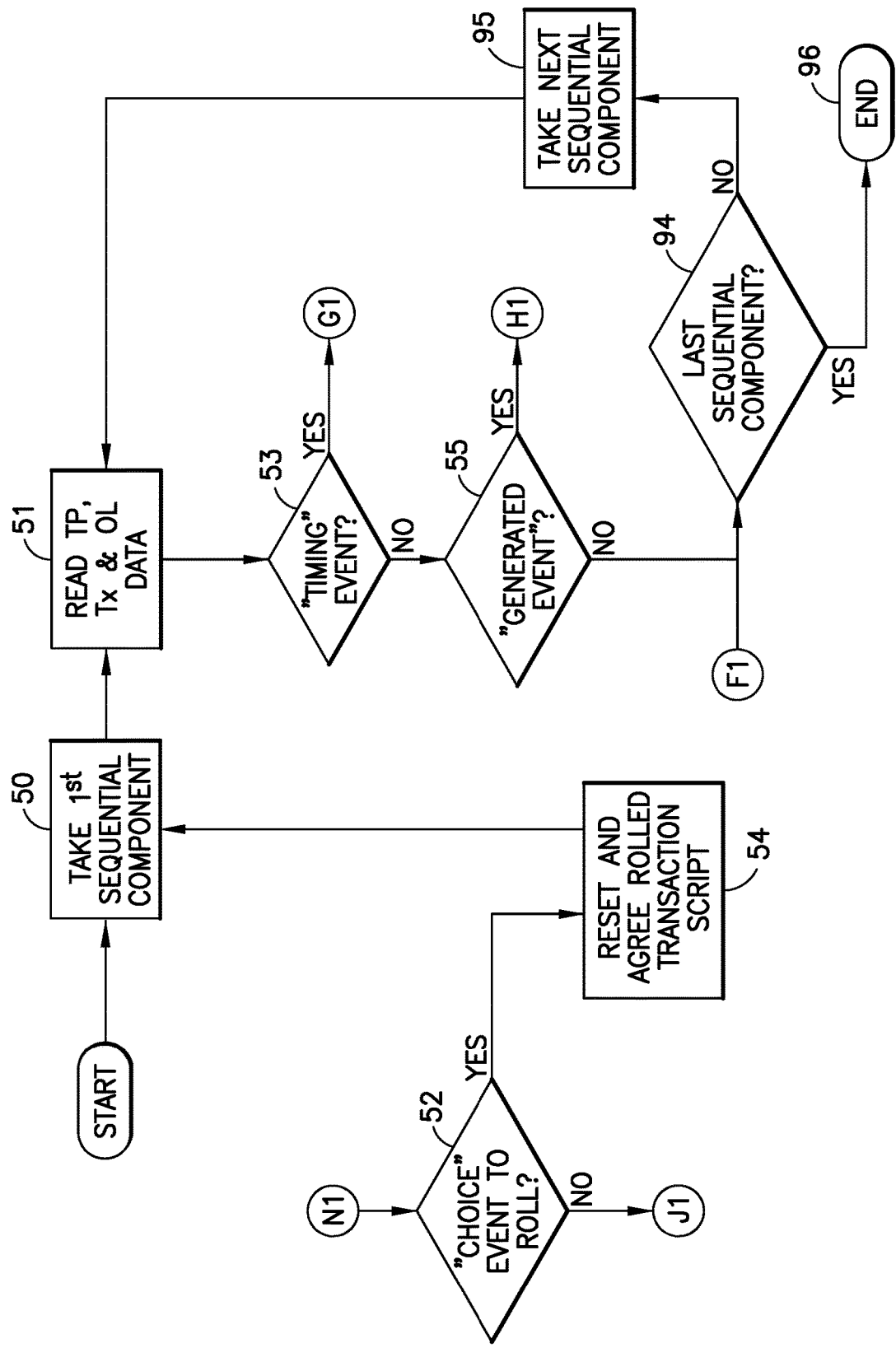
FIGS. 7 through 12 are flowcharts identifying steps of a genome script running process in accordance with one embodiment.

Referring to FIG. 7, the Start of the script running logic is to take the first transactional component of the life-cycle script (step 50), read the transacting party, transaction and ownership log data (step 51), and then determine whether there is a timing event or not (step 53). If there is a timing event, then the process proceeds to the timing event review depicted in FIG. 8 (see connection point G1 in FIGS. 7 and 8). If it is determined in step 53 that it is not a timing event, then a determination is made whether it is a generated event or not (step 55). If it is a generated event, then the process proceeds to the generated event review depicted in FIG. 9 (see connection point H1 in FIGS. 7 and 9). If it is determined in step 55 that it is not a generated event, then a determination is made whether the most recently processed transactional component is the last transactional component to be processed (step 94). If a determination is made in step 94 that there are more components to the script, then the next component will be lined up to be read (step 95) and the genome script running process will return to step 51. If a determination is made in step 94 that the most recently processed transactional component was the last component, then the genome script running process will end (step 96).

Figure 8:
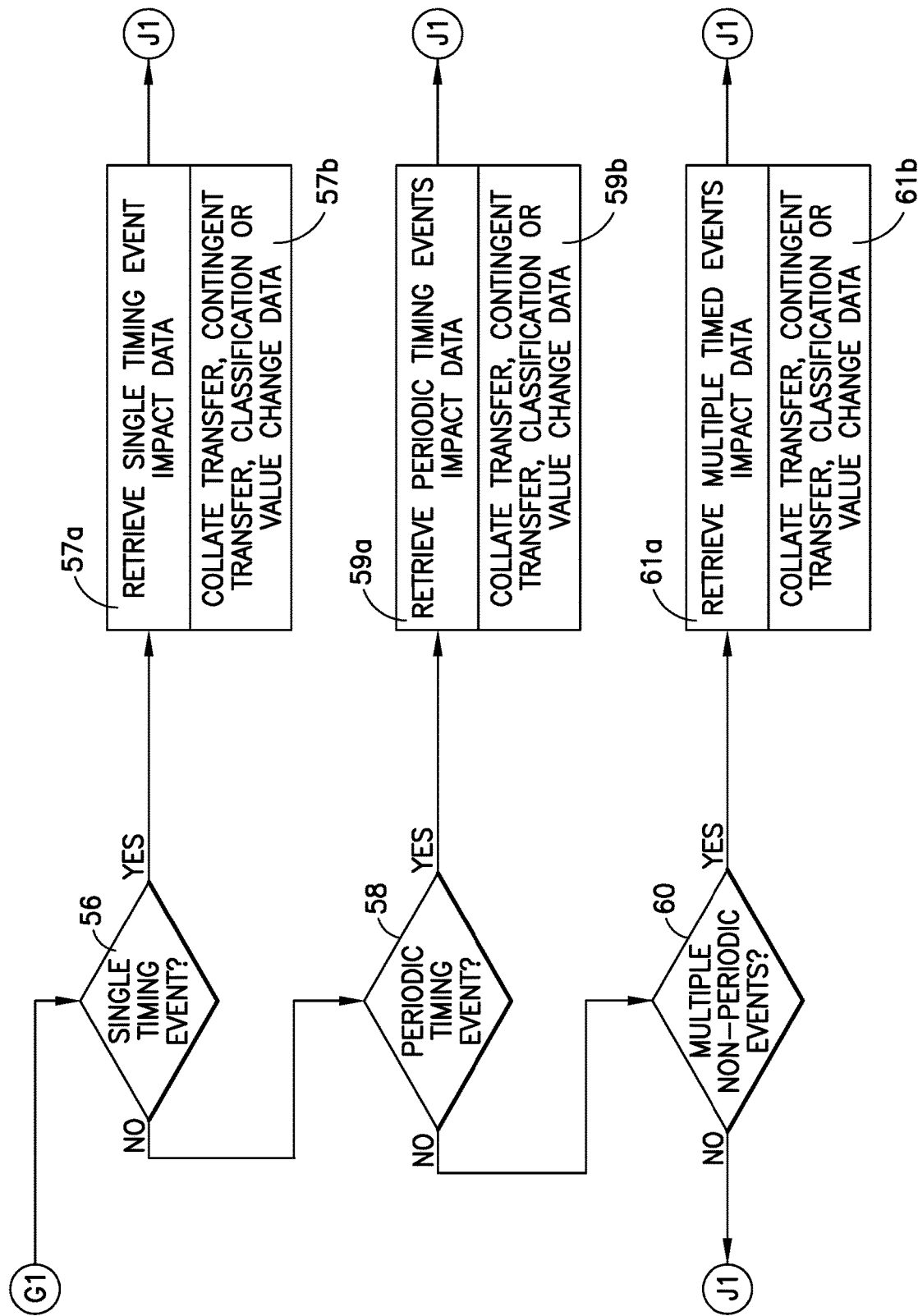

For a transactional component with a timing event, the process depicted in FIG. 8 is performed. First, a determination is made whether the timing event is a single event or not (step 56). If a determination is made in step 56 that the timing event is a single event, then the single timing event impact is retrieved (step 57a) and the impact event is collated (step 57b). If a determination is made in step 56 that the timing event is not a single event, then a determination is made whether the timing event is periodic or not (step 58). If a determination is made in step 58 that the timing event is periodic, then the periodic timing event impact is retrieved (step 59a) and the impact event is collated (step 59b). (As used herein, the term "collate" means to assemble the data relevant to the "impact", which will then be used when the transfer, classification change, value change or contingent transfer are processed.) If a determination is made in step 58 that the timing event is not periodic, then a determination is made whether the timing events are multiple, non-periodic events or not (step 60). If a determination is made in step 60 that the timing events are multiple, non-periodic events, then the multiple non-periodic timing events' impact is retrieved (step 61a) and the impact event is collated (step 61b). Whether there is a timing event or not, the genome script building process will proceed to the security type review process depicted in FIG. 10 (see connection point J1 in FIGS. 8 and 10).

Figure 9:
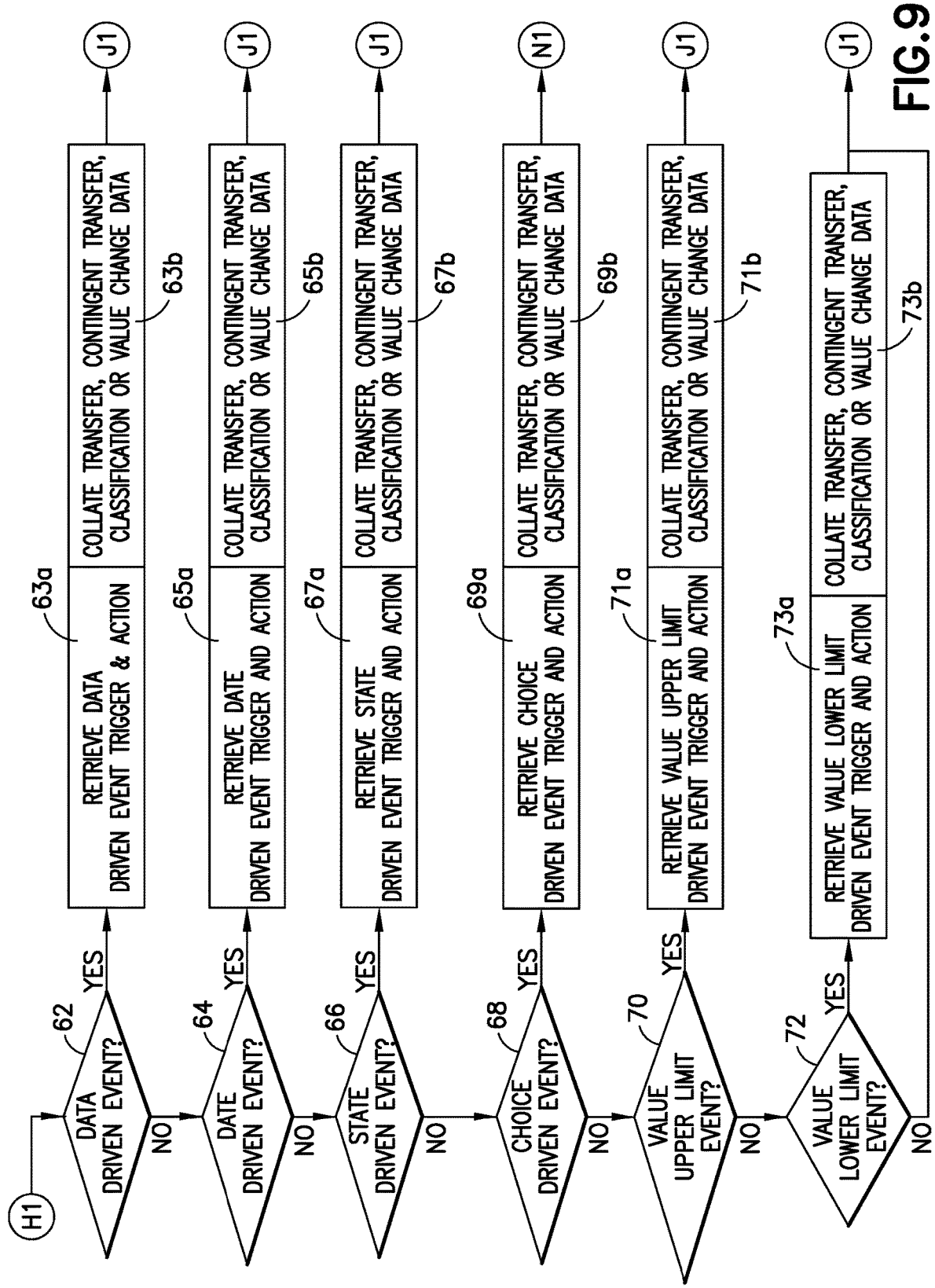

For a transactional component with a generated event, the process depicted in FIG. 9 is performed. First, a determination is made whether the event is a data-driven event or not (step 62). If a determination is made in step 62 that the event is a data-driven event, then the event trigger and action data is retrieved (step 63a) and the impact or event is collated (step 63b). If a determination is made in step 62 that the event is not a data-driven event, then a determination is made whether the event is a date-driven event or not (step 64). If a determination is made in step 64 that the event is a date-driven event, then the event trigger and action data is retrieved (step 65a) and the impact or event is collated (step 65b). If a determination is made in step 64 that the event is not a date-driven event, then a determination is made whether the event is a state-driven event or not (step 66). If a determination is made in step 66 that the event is a state-driven event, then the event trigger and action data is retrieved (step 67a) and the impact or event is collated (step 67b). If a determination is made in step 66 that the event is not a state-driven event, then a determination is made whether the event is a choice-driven event or not (step 68). If a determination is made in step 68 that the event is a choice-driven event, then the event trigger and action data is retrieved (step 69a) and the impact or event is collated (step 69b). If a determination is made in step 68 that the event is not a choice-driven event, then a determination is made whether the event is a value upper limit event or not (step 70). If a determination is made in step 70 that the event is a value upper limit event, then the event trigger and action data is retrieved (step 71a) and the impact or event is collated (step 71b). If a determination is made in step 70 that the event is not a value upper limit event, then a determination is made whether the event is a value lower limit event or not (step 72). If a determination is made in step 72 that the event is a value lower limit event, then the event trigger and action data is retrieved (step 73a) and the impact or event is collated (step 73b). Except for a choice-driven event (determined in step 68), whether there is a generated event or not, the process will proceed to the security type review process depicted in FIG. 10 (see connection point J1 in FIGS. 9 and 10). If there is a choice-driven event, the process then executes the script running control algorithm depicted in FIG. 7 (see connection point N1 in FIGS. 7 and 9).

Referring to FIG. 7, a determination is made whether the choice is to roll the current transaction or not (step 52). If it is determined in step 52 that the choice is not to roll the current transaction script, then the genome script running process, will proceed to the security type review process depicted in FIG. 10 (see connection point J1 in FIGS. 7 and 10). If it is determined in step 52 that the choice is to roll the current transaction script, then reset and agree the rolled transaction script (step 54) and start with the first transaction component again (step 50). (As used herein, the term "roll" means to continue an open-ended transaction. A repo is a repurchase agreement, normally agreed for overnight financing. If the counterparties want to continue the transaction for another day, they agree to "roll" it. The transaction then has a financial settlement that repeats under the next day's financing rate. This is the mechanism to have an open-ended transaction without an infinite loop.)

Figure 10:
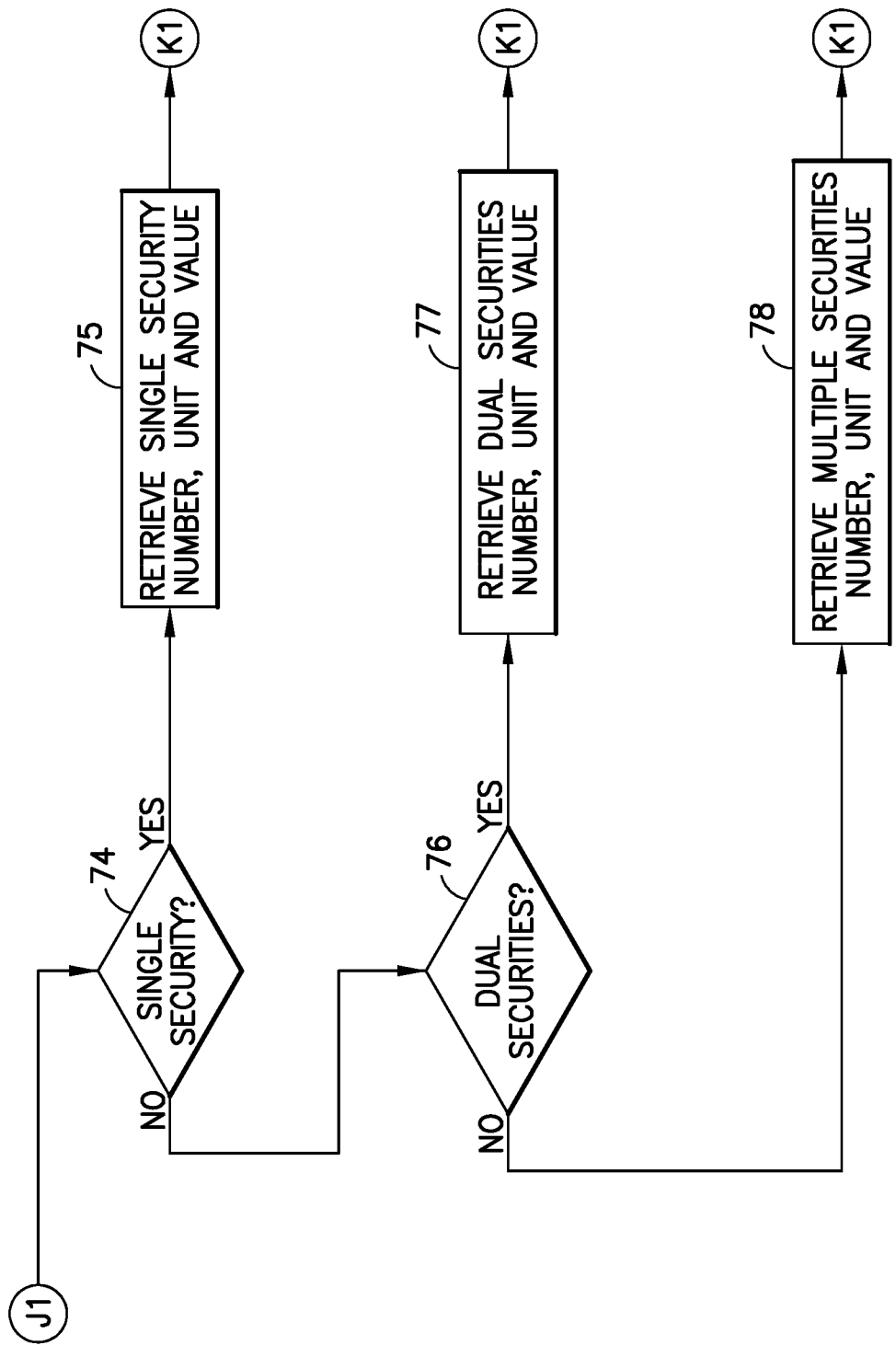

The security type review process is depicted in FIG. 10. First, a determination is made whether the transactional component involves a single security or not (step 74). If the transactional component involves a single security, then the security data for the impact or subsequent event will be retrieved (step 75), after which the genome script running process will proceed to the impacted security review process depicted in FIG. 11 (see connection point K1 in FIGS. 10 and 11). If a determination is made in step 74 that the transactional component does not involve a single security, then a determination is made whether the transactional component involves dual securities or not (step 76). If the transactional component involves dual securities, then the securities data for the impact or subsequent event will be retrieved (step 77), after which the genome script running process will proceed to the impacted security review process depicted in FIG. 11. If a determination is made in step 76 that the transactional component does not involve dual securities, they are multiple securities so the securities data for the impact or subsequent event for those multiple securities will be retrieved (step 78), after which the genome script running process will proceed to the impacted security review process depicted in FIG. 11.

Figure 11:
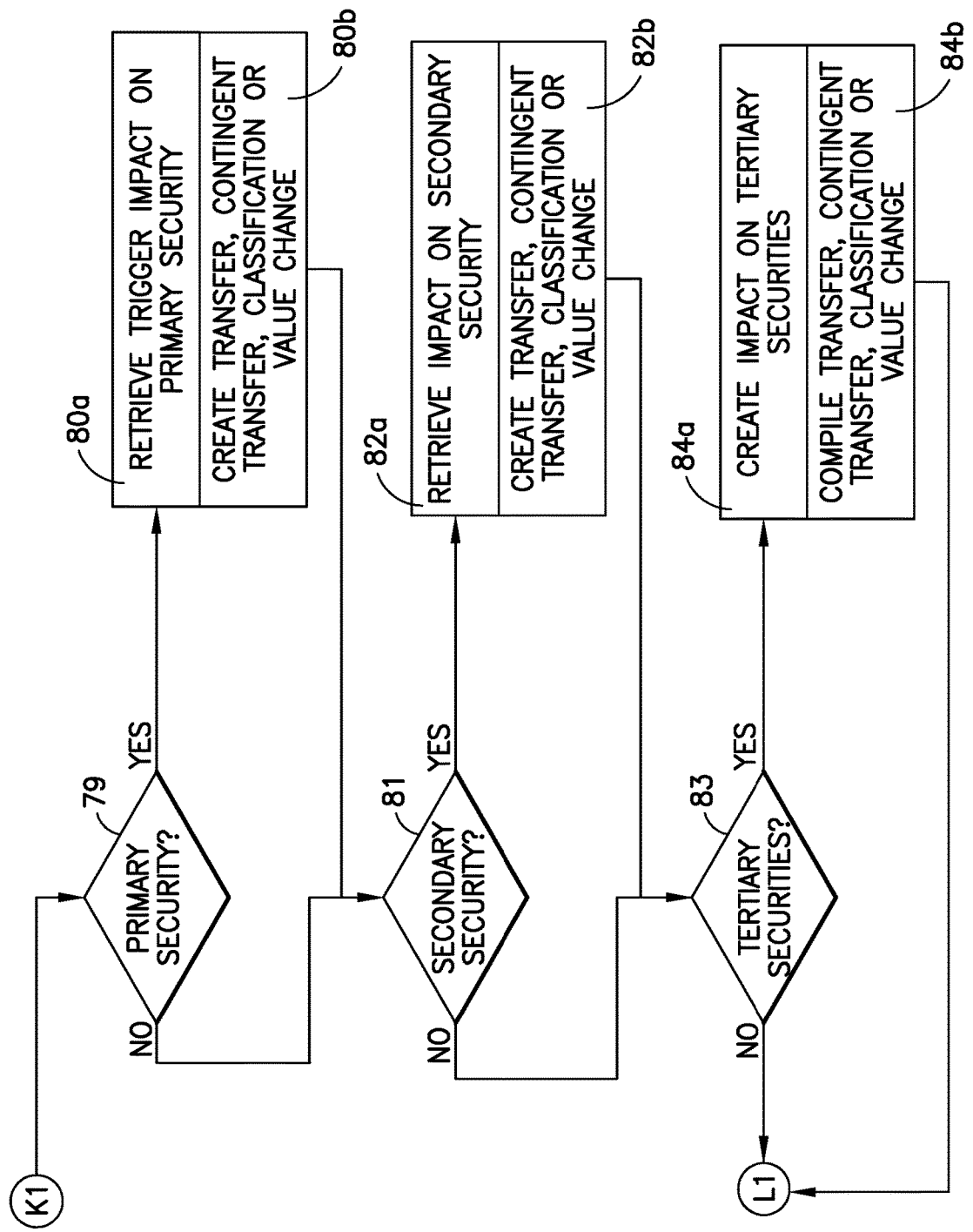

Referring to FIG. 11, a determination is made whether the asset impacted is a primary security or not (step 79). If a determination is made in step 79 that the asset impacted is a primary security, then retrieve the impact data on the primary security (step 80a) and create the event or impact to be processed and recorded (step 80b). If a determination is made in step 79 that the asset impacted is not a primary security, then a determination is made whether the asset impacted is a secondary security or not (step 81). If a determination is made in step 81 that the asset impacted is a secondary security, then retrieve the impact data on the secondary security (step 82a) and create the event or impact to be processed and recorded (step 82b). If a determination is made in step 81 that the asset impacted is not a secondary security, then a determination is made whether the asset impacted is a tertiary security or not (step 83). If a determination is made in step 83 that the assets impacted are tertiary securities, then retrieve the impact data on the tertiary securities (step 84a) and create the events or impacts to be processed and recorded (step 84b). The genome script running process then proceeds to the event processing algorithm depicted in FIG. 12 (see connector L1 in FIGS. 11 and 12).

Figure 12:
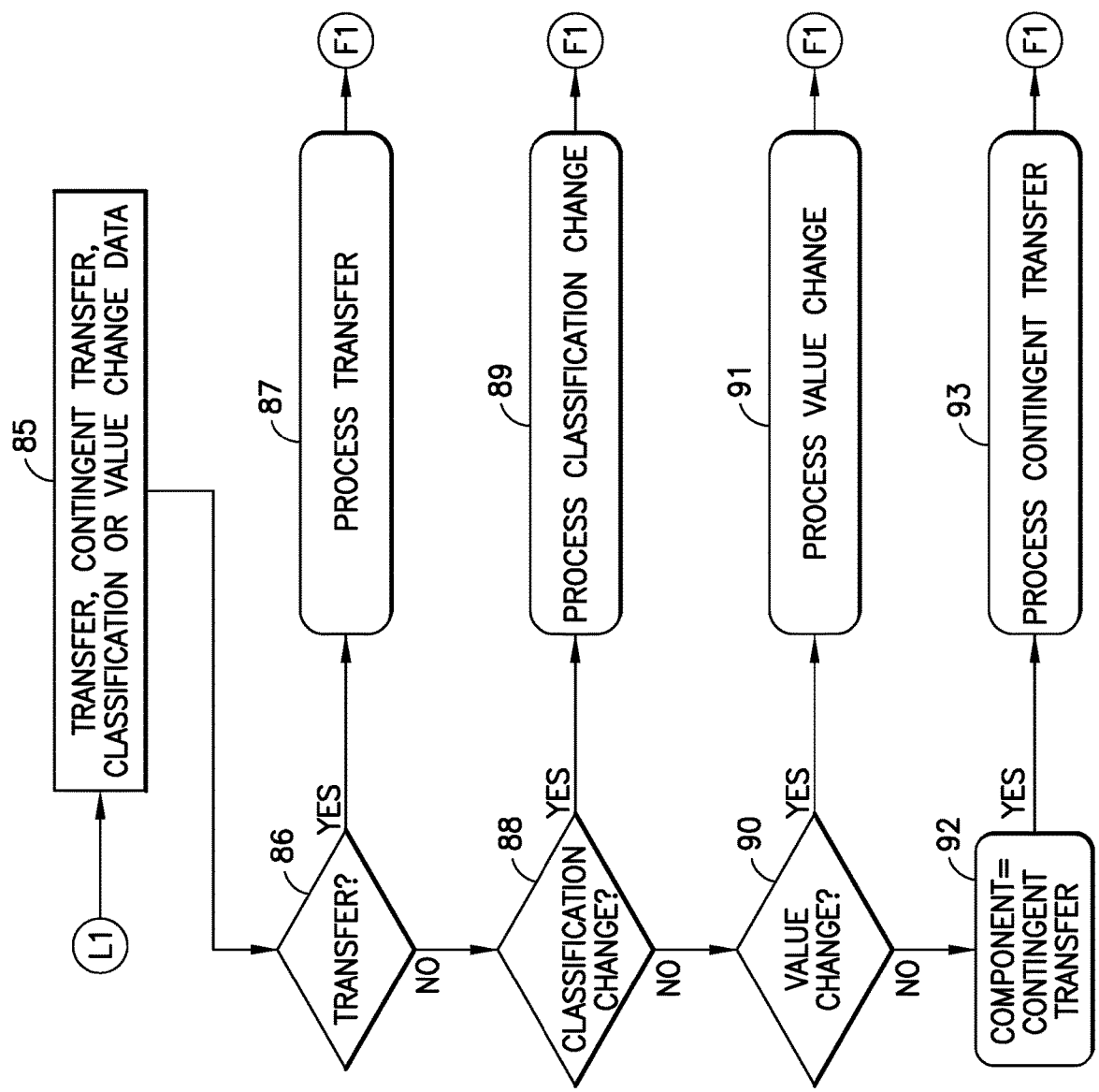

Referring to FIG. 12, a determination is made whether (or not) the component 85 will be either a transfer (step 86), a classification change (step 88), a value change (step 90) or a contingent transfer (step 92). If a determination is made in step 86 that the transactional component will be a transfer, then process the transfer (step 87). If a determination is made in step 88 that the transactional component will be a classification change, then process the classification change (step 89). If a determination is made in step 90 that the transactional component will be a value change, then process the value change (step 91). If the transactional component is none of the three, then a determination is made that the transactional component will be a contingent transfer (step 92), which contingent transfer is then processed (step 93). After each of steps 87, 89, 91 and 93, the genome script running process proceeds to the transactional component control algorithm depicted in FIG. 7 (see connector F1 in FIGS. 1 and 12).

Referring to FIG. 1, if the previous transactional component and its processed impact or event is not the last transactional component to be run (step 94), then select the next sequential transactional component (step 95) and repeat entire genome script running algorithm. If the previous transactional component and its processed impact or event is the last transactional component (step 94), then the genome script running process can end (step 96).

Note: both the script building and running processes do not involve infinite loops and lend themselves to be compiled in Turing-incomplete code. All financial services transaction life-cycles can be expressed as different sequences and orders of the four transactional components of the Genome. Open-ended transactions or financial contracts can be invoked by the "choice" event (step 68), where the choice to roll or continue (step 52) would invoke a repeat of the script to process (step 54) the next sets of transactional components in the order they processed before using the same script running algorithm again (step 51).

Ownership Log Records of Value

The types of data stored on the ownership log (OL) are listed in Table 5. This represents the data associated with every ownership position on the ownership log. With the transaction log references, the history of a transaction can be verified either inter-day (looking at the archived transaction logs) or intra-day (reviewing the current period's transaction and ownership log entries in a chain of ownership back to the SOP OL).

TABLE 5

Ownership Log Data
Ownership Log

OL ID
Encumbrance
Asset ID
Amount
$N_{DEL}$ ID
$N_{DEL}$ FL ID
$N_{DEL}$ FL$_{Address}$
$N_{REC}$ ID
$N_{REC}$ FL ID
$N_{REC}$ FL$_{Address}$
Date Transacted
Date to be Posted
OL ID = "Long", P, R, L, B, PLT or PLF
Linked OL ID for P, R, L, B, PLT or PLF The last row in Table 5 is the cross reference to the source position of value or OL ID, from which the loan (L), borrow (B), pledge (P), return (R), pledge to (PLT) or pledge from (PLF) record is derived. This is also a control for the return of the loan or pledged positions.

The relationship for a TP_Del, the unique OL IDs and the encumbrance can be represented as follows:
  Math transformation f[TP_Del pk, Data (e.g., Nonce)]→OL ID
  Math transformation f [TP_Del OL ID, Data (e.g., Nonce)]→Encumbrance It is expected that transacting parties may choose different mathematical functions to provide unique OL IDs to reference their positions of value and to create each position's encumbrance. The revealing of the identity and unlocking the encumbrances will work like the locking scripts used with encumbrances in the bitcoin UXTO and will be part of the transaction scripts for the transacting parties to use. Upon calling the identity reveal script, the receiving transacting party (TP_Rec) can use the "Reveal Data" to confirm the identity of the counterparty. Upon calling the encumbrance unlocking script, the delivering transacting party (TP_Del) can unlock the value to create a transaction.

For TP_Del to confirm its identity to TP_Rec, it will provide 'Reveal Data' such that TP_Rec can combine it with TP_Del's pk and perform the following operation:
  If Math transformation f[TP_Del pk, Reveal Data]=OL ID, then
  TP_Del is owner of pk and therefore owns the asset amount of value Amt referenced by the OL ID.
    When TP_Del creates the transaction, the unlocking script will perform the following operation:
  If Math transformation f[TP OL ID, Unlock Data]=Encumbrance,
    then allow Tx to be created versus OL ID.

Ownership Transfer Logic Summary

FIG. 13 is a diagram identifying transfer entries in an ownership log (stored in a non-transitory tangible computer-readable storage medium) in accordance with one embodiment. FIG. 13 employs the following terminology: $TP_{DEL}$ is the delivering transacting party; $TP_{REC}$ is the receiving transacting party; $Amt_{St}$ is the starting balance of the delivering transacting party; $Amt_T$ is the transferred amount; and Net=$Amt_{St}$−$Amt_T$.

A transfer involves the transfer of value from $TP_{DEL}$ to $TP_{REC}$. The transfer will be recorded on the ownership log under three unique IDs: OL ID 1 versus the amount of value held by TP_Del; OL ID 2 versus the amount transferred to TP_Rec; and OL ID 3 for the net amount, if any, retained by TP_Del.

Figure 14:
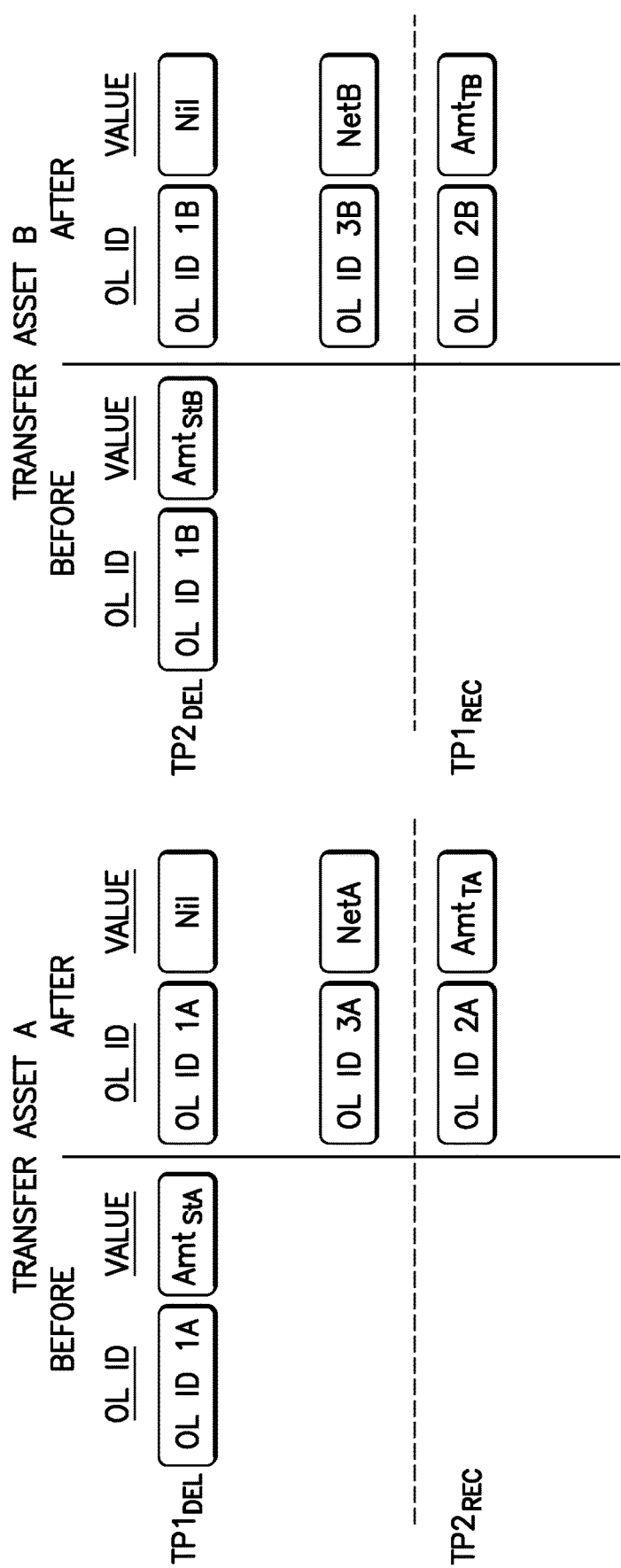
FIG. 14 is a diagram identifying contingent transfer entries in an ownership log in accordance with one embodiment.

FIG. 14 is a diagram identifying contingent transfer entries on the ownership log. FIG. 14 employs the following terminology: $TP1_{DEL}$ is the transacting party delivering asset A; $TP2_{REC}$ is the transacting party receiving asset A; $TP2_{DEL}$ is the transacting party delivering asset B; $TP1_{REC}$ is the transacting party receiving asset BA; OL ID 1A is the identifier for the starting balance for asset A; OL ID 2A is the identifier for asset A transferred; OL ID 3A is the identifier for net asset A retained by $TP1_{DEL}$; OL ID 1B is the identifier for the starting balance for asset B; OL ID 2B is the identifier for asset B transferred; OL ID 3B is the identifier for net asset B retained by $TP2_{DEL}$; $Amt_{StA}$ is the starting asset A balance of TP1 DEL; $Amt_{TA}$ is the amount of asset A transferred by $TP1_{DEL}$; NetA=$Amt_{StA}$−$Amt_{TA}$; $Amt_{StB}$ is the starting asset B balance of $TP2_{DEL}$; $Amt_{TB}$ is the amount of asset B transferred by $TP2_{DEL}$; and NetB=$Amt_{StB}$−$Amt_{TB}$.

A contingent transfer is a bilateral, dual transfer of two assets simultaneously. Examples include: receipt versus payment (RVP), delivery versus payment (DVP), FX transactions (two currencies), and collateral substitutions that can be asset-to-cash or asset-to-asset transfers. The dual transfers will be recorded on the ownership log under two sets of three unique IDs: OL ID 1 versus the amount of value held by TP_Del; OL ID 2 versus the amount transferred to TP_Rec; and OL ID 3 for the net amount, if any, retained by TP_Del. For each transfer there are two assets: asset A and asset B, which have their own respective OL IDs and transfer amounts. With respect to asset agnostic reflection, the contingent transfers are complementary receipt versus delivery (RVD) and delivery versus receipt (DVR).

With respect to block trades by brokers on behalf of multi-party settlements for fund managers representing multiple beneficial owners under the same strategy, the transacting script would be pre-allocated contingent transactions to each of the underlying beneficial owners' ledgers. They would be processed as "short" contingent transfers (see FIG. 27) with an unspecified monetary amount. The broker is then free to execute trades in the markets (fills) and through aggregation create the ownership log positions and IDs to reference to fill the shorts with the execution price of the trade for the fund manager.

FIG. 15 is a diagram identifying pledge and pledge return entries on the ownership log. FIG. 15 employs the following terminology: $TP_{PLF}$ is the transacting party the pledge is from; $TP_{PLT}$ is the transacting party the pledge is to; OL ID_PLF is the identifier for the pledge from $TP_{PLF}$; OL ID_PLT is the identifier for the pledge to $TP_{PLT}$; $Amt_{St}$ is the starting balance of $TP_{PLF}$; $Amt_{PL}$ is the pledge amount; Net=$Amt_{St}$−$Amt_{PL}$; $Amt_{St2}$ is the available pledge return balance for $TP_{PLT}$; $Net_2$=$Amt_{St2}$−$Amt_{PL}$; OL IS $1_2$ is the identifier for the balance for pledge return; OL IS $2_2$ is the identifier for pledge amount $Amt_{PL}$ returned; OL IS $3_2$ is the identifier for pledge return $Net_2$.

A pledge is a different kind of transfer. One transacting party is pledging an amount of an asset to another transacting party. The asset will be used as collateral and will either be held in escrow or available for re-hypothecation. Beyond recording the amount pledged with the normal transfer OL IDs 1-3, the transaction records unique IDs for the "pledged from" transfer from TP_PLF and "pledged to" transfer to TP_PLT. Note: TP_PLT may be able to further transfer, pledge or lend the asset pledged to it but a record of the pledge transfer and the obligation to return the asset must be kept on the ownership log.

For a return of a pledged security, the recipient may have hypothecated or used the pledge position. Therefore the position or OL ID referenced will more than likely be new and unique. In FIG. 15, the pledge recipient referenced position for the pledge return becomes OL ID $1_2$. The returned pledge is OL ID $2_2$ and the net position retained by returnee is OL ID $3_2$.

FIG. 16 is a diagram identifying loan and loan return entries on the ownership log. FIG. 16 employs the following terminology: TPS is the lender; $TP_B$ is the borrower; OL ID_B is the identifier for the borrowed amount; OL ID_L is the identifier for the loaned amount; $Amt_{St}$ is the starting balance of TPS; $Amt_L$ is the loan/borrow amount; Net=$Amt_{St}$−$Amt_L$; $Amt_{St2}$ is the available loan repayment balance for $TP_B$, $Net_2$=$Amt_{St2}$−$Amt_L$; OL ID $1_2$ is the identifier for the balance for loan return; OL ID $2_2$ is the identifier for loan amount $Amt_L$ repaid; OL ID $3_2$ is the identifier for loan repayment $Net_2$.

A loan is a transfer with the promise in the future to return the amount. Beyond recording the amount loaned with the normal transfer OL IDs 1-3, the transaction records unique IDs for the "loan" transfer from TP_L and "borrow" transfer to TP_B. Note: The borrower TP_B is free to use the asset in many different ways and may further transfer, loan or pledge the amount received. However, a record of the loan and the obligation to repay it must be kept on the ownership log.

For a return of a loaned security, the borrower will have used the borrowed position. Therefore, the position or OL ID referenced for the repayment of the loan will more than likely be new and unique. In FIG. 16, the borrower's referenced position for the loan return or repayment becomes OL ID $1_2$. The paid-off loan is OL ID $2_2$ and the net position retained by the borrower is OL ID $3_2$.

Figure 17A:
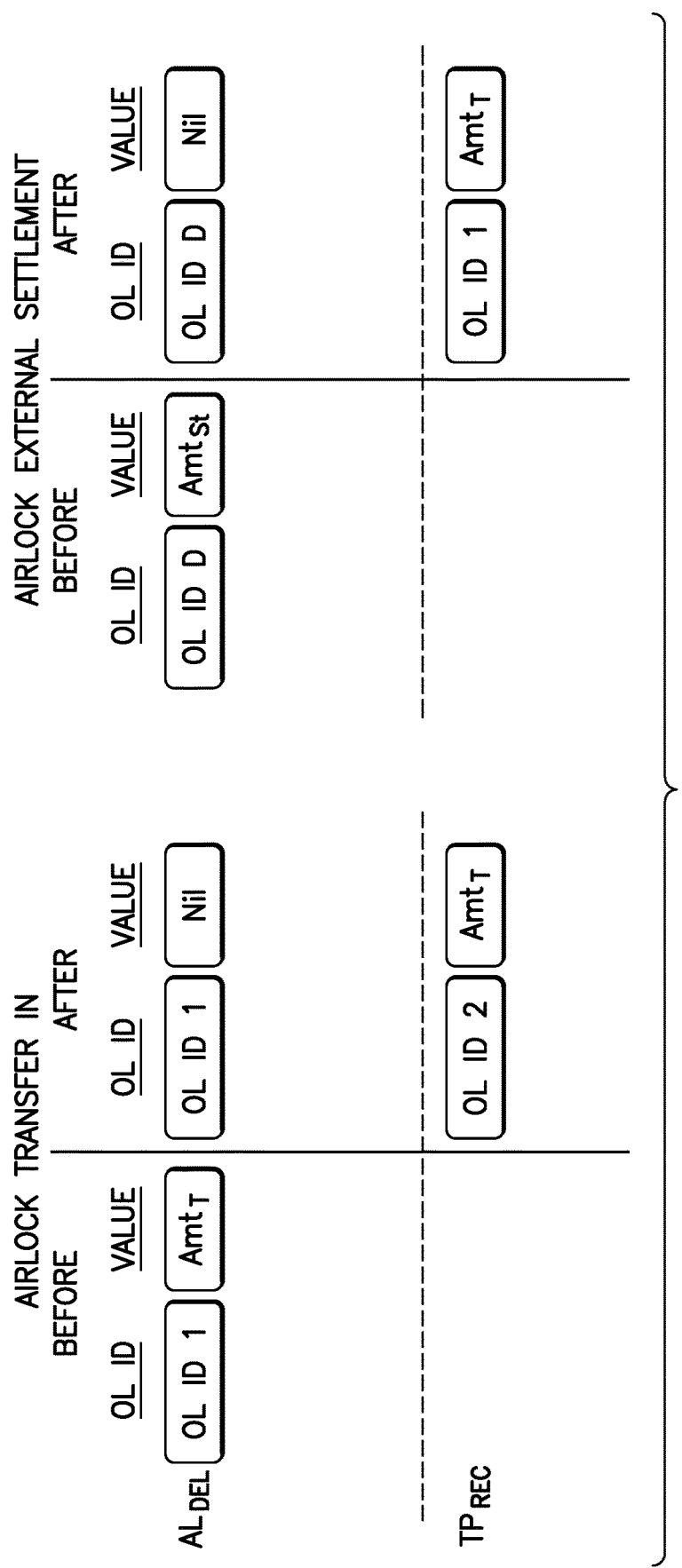

FIG. 17A is a diagram identifying ownership log entries for Airlock transfer into the network. FIG. 17A employs the following terminology: $TP_{REC}$ is the receiving transacting party; $AL_{DEL}$ is the Airlock transaction log that receives the transaction information from outside the network; OL ID D is the external delivering third party; and $Amt_T$ is the transferred amount.

FIG. 17B is a diagram identifying ownership log entries for Airlock transfer out of the network. FIG. 17B employs the following terminology: $TP_{DEL}$ is the delivering transacting party; $AL_{REC}$ is the Airlock transaction log that receives the transaction information from the network; OL ID E is the external receiving third party; $Amt_{St}$ is the starting balance of the delivering transacting party; $Amt_T$ is the transferred amount; and Net=$Amt_{St}$−$Amt_T$.

For transfers of value into and out of the network, a separate ledger will be maintained called the "Airlock". Although ownership does not change in the transaction, it provides a means for the network to control transfers of value in and out through a single process. One shared service in the network will be the independent settlement and reconciliation of the transfers into and out of the network.

Initially, this functionality will be used to allow the network participants to transact with non-participants whose transactions still settle under current market practices while adoption of the utility is in progress. It can also be used to transfer value between different implementations of the network, which may exist in independent forms for certain products, markets or regions.

Transaction and Ownership Log Posting Logic

A. Fractal Lattice Address Sequencing and Hash-Linking Logic

Figure 18:
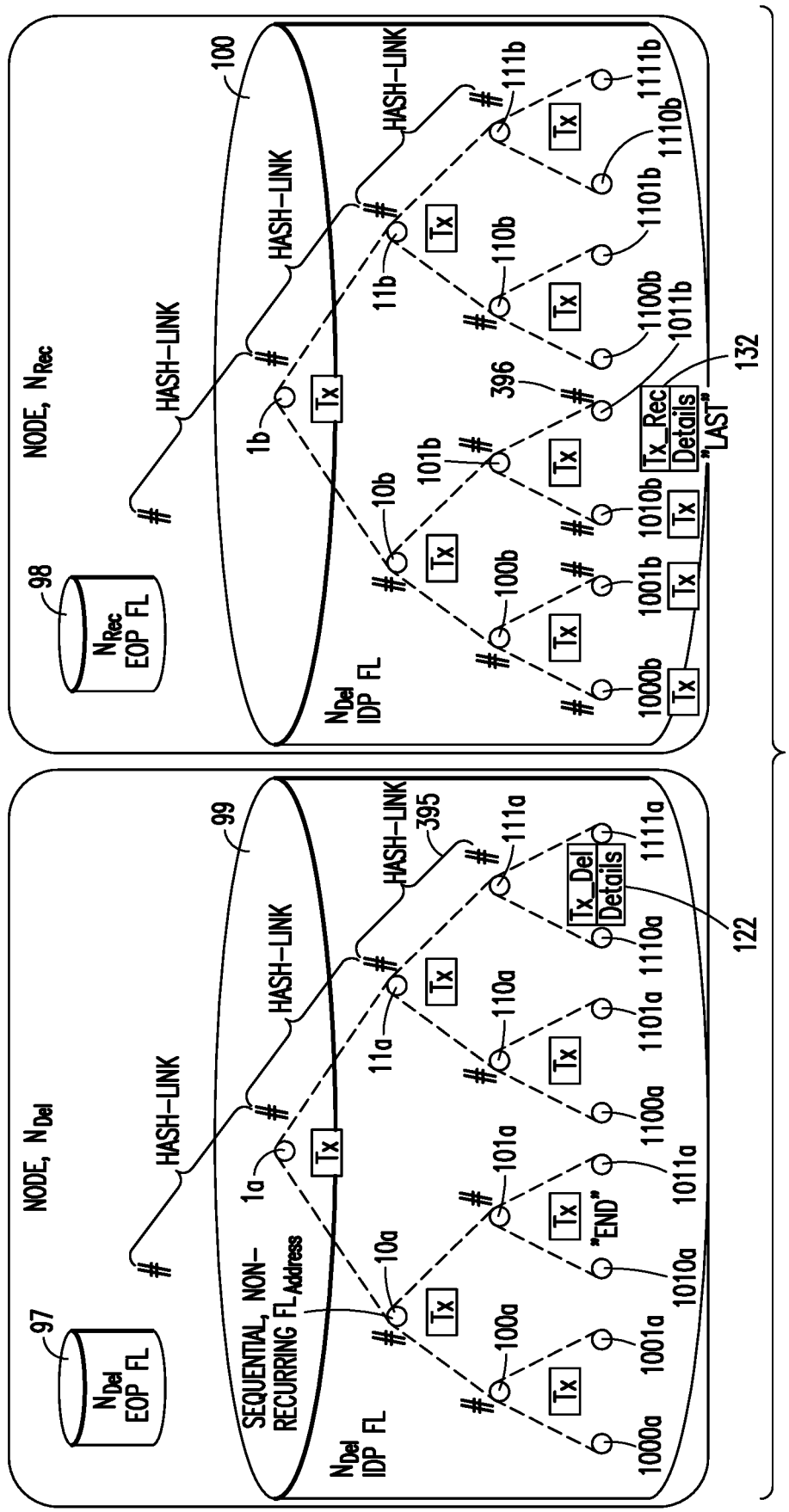
FIG. 18 is a diagram showing a fractal lattice self-defining and self-verifying process for simple fractal lattices constructed at two nodes that create the delivery and receipt contra-transactions for a transfer.

The proposed distributed ledger system for financial services disclosed herein comprises a fractal lattice-structured transaction log that utilizes fractal lattice address sequencing and hash-linking logic. FIG. 18 is a diagram showing a fractal lattice self-defining and self-verifying process for simple fractal lattices (having a fractal number Fn=2) respectively constructed at two nodes $N_{DEL}$ and $N_{REC}$ that create the delivery and receipt contra-transactions for a transfer.

As seen in FIG. 18, the use of a fractal lattice represents a variable n-dimensional structure of geometrically expanding, interconnecting but non-recurring points that form respective fractal lattice-structured transaction logs 99 and 100 in nodes $N_{DEL}$ and $N_{REC}$ respectively. Each point can be given a unique, non-recurring number or address (FL_Address) (e.g., 1a to 1111a and 1b to 1111b as seen in FIG. 18). Each FL_Address is a calculable, algorithmic means to organize, link and reference data within a database. The relationship of all the fractal lattice addresses is such that the communication of the individual fractal lattice addresses, in any order, allows a second party to reconstruct the fractal lattice without the need to refer back to the party who communicated the components. By hash-linking the linked fractal lattice addresses to a previously utilized address (e.g., parent FL_Address to child FL_Address) in sequential layers with the associated data (indicated by rectangles labeled "Tx") referenced to the fractal lattice address also allows the second party to confirm the integrity of the data within the child FL_Address ("Hash-Link #"). The first transaction at FL_Address 1a from the current transacting period for node N_Del (101) will be hash-linked to the last transaction from the prior period's fractal lattice-structured transaction log 97 ($N_{DEL}$ EOP FL). Similarly, the first transaction at FL_Address 1b from the current transacting period for node N_Rec will be hash-linked to the last transaction from the prior period's fractal lattice-structured transaction log 98 ($N_{REC}$ EOP FL).

For the simplest example, within the fractal lattice contra-transactions Tx_Del (122) and Tx_Rec (132) (indicated by respective rectangles in FIG. 18) will be assigned and posted to sequential fractal lattice addresses 111a and 1011b in the order in which the nodes $N_{DEL}$ and $N_{REC}$ create the contra-transactions.

The examples seen in FIG. 18 are of simple numerical, self-similar fractal lattice patterns. There are a multitude of more complex geometrically and complex-number defined fractal patterns. As long as the fractal pattern for addressing and linking the data is defined, many more options are available for organizing and securely recording the data. There is also the possibility of using symmetrical encryption for the hash-links on the fractal lattice addresses that can be pre-communicated to counterparty nodes. Although this will add a level of complexity and computing time to the process, it will provide another obstacle to prevent or at least delay the opportunity for malfeasance.

Referring again to FIG. 18, contra-transaction 122 at FL_Address 111a and contra-transaction 132 at FL_Address 1011b will be hash-linked to a parent FL_Address in the prior layer of the fractal lattice (i.e., 11a and 101b). The algorithm for defining the sequential fractal lattice addresses and calculating the parent FL_Address for hash-linking, for the illustrated example, is defined below. [Note: There is no requirement to fill the fractal lattice addresses sequentially or to fill all the fractal lattice addresses. For example, within fractal lattice-structured transaction log 99, addresses 1000a to 1111a represent unused addresses in the pattern at this time. Within fractal lattice-structured transaction log 100, addresses 1100b to 1111b (excluding address 1011b) represent unused addresses in the pattern at this time. There is no information posted at those addresses. In contrast, addresses 1a, 10a, 11a, 100a, 101a and 110a represent transactions prior to the example transaction that have already been posted to the fractal lattice, so their details are irrelevant for the discussion. The fact that they exist and have been posted highlights used and now unavailable FL addresses. The transactions posted to addresses 1a, 10a, 11a, 100a, 101a and 110a also represent contra-transactions which may match to contra-transactions in other nodes.]

The different branches of the fractal lattice could be utilized to segregate or organize transaction data for later ease of reference or shorter data inquiry requirements. As long as the initial layer transactions are hash-linked to the prior period's last transaction, the fractal lattice can be started at the layer with enough addresses to segregate the data to preference. The number of addresses in the initial layer will determine the possible fractal numbers for the pattern as $Fn^x$ will be greater than or equal to the number of addresses in the initial layer. If there are 63 transaction data groups, a fractal lattice with a layer of 64 addresses could be used. The subsequent fractal numbers for the next layers and fractal lattice addresses could be 2, 4 or 8 as $2^6$, $4^3$ and $8^2=64$.

If for any fractal lattice of fractal number Fn:
L_x=layer number which ranges from x=1 to x=X
L_Xa=the number of addresses in any one layer=$Fn^{(L\_x-1)}$
d=FL_Address digit where d's value range is: $1 \leq d \leq Fn-1$
Then for any layer L_x:
FL_Address will be defined as a number where the number of sequential digits=$d_1 d_2 d_3 \ldots d_{L\_Xa}$
The fractal lattice addresses will run sequentially, in numerical order, within a range:
FL_Address of $d_1=1$ and the digits $d_2$ to $d_{L\_Xa}0$
to
FL_Address of $d_1=1$ and the range of digits $d_2$ to $d_{L\_Xa}=Fn-1$
In base (Fn): each address in each layer will be numbered sequentially from:
$Fn^{(L\_x-1)}$ to $[Fn^{(L\_x-1)}+(Fn^{L\_x-1})-1)]$
The parent FL_Address for an FL_Address=$d_1 d_2 d_3 \ldots d_{L\_Xa}$ is the same FL_Address without the last digit:
i.e., child FL_Address=$d_1 d_2 d_3 \ldots d_{(L\_Xa-1)}$
[Note: the number of child FL_Addresses hash-linked to a parent FL_Address=Fn. The randomizing of the types of hash-links (e.g., parents, grandparents, uncle/aunt, cousin, siblings, etc.) or multiple linkages can provide unstructured yet re-creatable data links, as they will be referenced in the transaction (see FIG. 18).]

A fractal lattice self-defining and self-validating process in accordance with one embodiment will now be described with reference to FIG. 18. Referring to FIG. 18, as contra-transactions 122 and 132 are communicated to the network and, beyond the other control and validation techniques, the fractal lattice structure of the transaction database creates a means to both define structure, position and content integrity, without the need to refer to the originating node or other nodes for confirmation.

(a) Each contra-transaction 122 and 132, as it is created by a respective node (i.e., $N_{DEL}$ or $N_{REC}$), is assigned a respective sequential fractal lattice address (e.g., 111a and 1011b in FIG. 18).

(b) The transaction content is hash-linked to the prior layer's parent or other relation's FL_Address linked-hash (e.g., FL_Address 11a via hash-link 395 and FL_Address 101b via hash-link 396 in FIG. 18). [Note: A simple parent-child hash-link is described. For more uncertainty to thwart malfeasance, the originating node could vary hash-links to say "grandparent" (1a and 10b) or "sequential" (110a and 1010b) or "sequential −2" (101a and 1001b) or use multiple links, as long as that link methodology is communicated in the transaction data (see FIG. 18).

(c) Every node will identify its last transaction of a period, Tx_Last (e.g., transaction 132 at FL_Address 1011b in FIG. 18), for other nodes to know when the fractal lattice is complete or use an empty (null) address to signal Tx_End (e.g., at FL_Address 101a in FIG. 18).

The combination of the foregoing elements (a) through (c) allows any node in the network to update its copy of the transaction originating nodes' fractal lattices (i.e., 99 and 100 in FIG. 18). It will post the transaction to the assigned FL_Address (e.g., 111a and 1011b) and be able to verify the expanding structure and transaction content by validating the hash-links (e.g., 395 and 396) without having to confer with the originating nodes' transaction records (99 or 100) or any other node.

As seen in FIG. 18, (1) $N_{DEL}$ transacts with $N_{REC}$; (2) $N_{DEL}$ records the transaction on its fractal lattice-structured transaction log 99 on the next available FL_Address=111a, hash-links (395) it to the parent FL_Address=11a and broadcasts it to the network; (3) $N_{REC}$ records the transaction on its fractal lattice-structured transaction log 100 on the next available FL_Address=1011b, hash-links (396) it to the parent FL_Address=101b and broadcasts it to the network; and (4) the FL_Addresses 111a and 1011b in the respective contra-transactions 122 and 132 allow any node to replicate the structure of the fractal lattice and the hash-link allows the receiving node to match and confirm integrity regardless of the order of receipt of the transactions (see FIG. 18). [Note: Both the fractal lattice addresses and the relationship of parent to child fractal lattice addresses are algorithmically calculable.] The whole fractal lattice structure can have its entire population of hash-linked addresses re-verified at any time during and at the end of a transacting period.

For the simple numerically derived fractal lattices, Fn=1 creates a classic, one-dimensional blockchain, whereby the next block has only one place where it can be placed.

B. Digital Signature and Encrypted Hash (E#)

For each node, the digital signature (Sig) is an sk encryption of a hashed message. The message that is hashed for a transaction is all the fields listed in the "Tx Details" section below. The standard practice is to send:
Sig=sign(Message, sk).
The recipient then performs:
isValid=verify(pk, message, Sig)
If isValid is true, then the message was not tampered with.

Because encryption needs a lot of computing power but hashing does not, the standard practice: Sig=sign(Message, sk) actually means send the "message" and send a hash of the message (encrypted with the sender's private or secret key—sk) with it (a hash is only a 64-digit hexadecimal). At the other end, the recipient makes a hash of the "message"

and decrypts the encrypted hash (with the sender's public key). If the two hashes are the same, then the recipient knows the message came from and was digitally signed by the sender.

For the encrypted hash E#, because it is using standard fields within transaction script, the sender need only include the encrypted hash because the recipient knows which fields in the transaction script to hash to validate the decrypted E#.

Figure 19A:
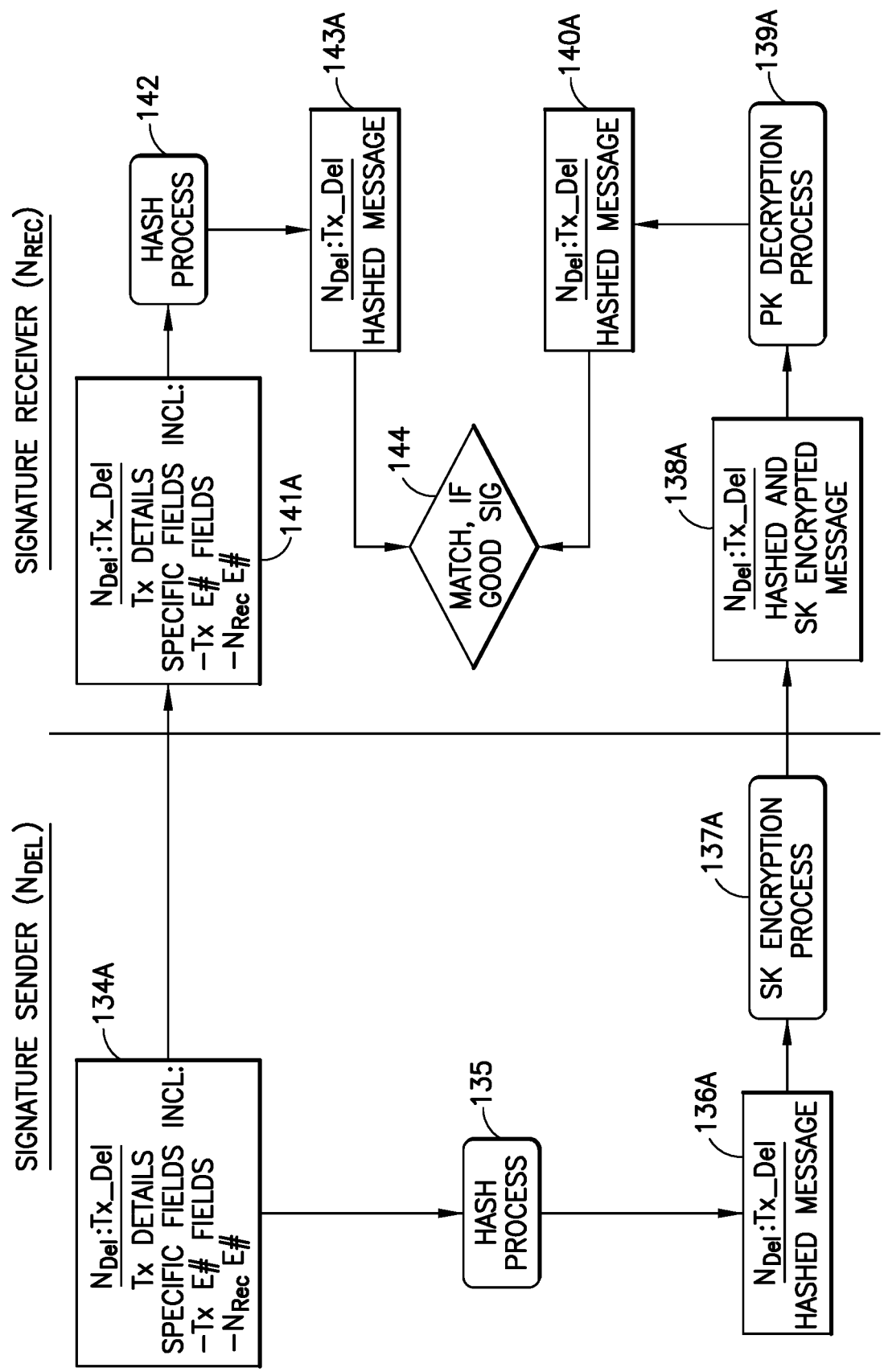
FIG. 19A is a diagram showing the process for digitally signing and verifying a delivery transfer contra-transaction.

FIGS. 19A and 19B are diagrams showing the process for digitally signing and verifying delivery and receipt contra-transactions. In FIG. 19A, the signature sender is a node $N_{DEL}$ that is generating a delivery contra-transaction for a transaction and the signature receiver is a node $N_{REC}$ that is generating a receipt contra-transaction for the same transaction. Conversely, in FIG. 19B, the signature sender is node $N_{REC}$ and the signature receiver is node $N_{DEL}$. The respective digital signatures are exchanged to ensure secure communications between the two nodes.

Referring to FIG. 19A, block 134a represents a delivery contra-transaction Tx_Del generated by node $N_{DEL}$. The transaction details are represented by data stored in specific fields of a transaction log maintained by node $N_{DEL}$ (see fields listed in Table 6). These fields include an encryption hash $N_{REC}$ E# and data identifying the fields used to generate that encryption hash. Tx_Del is hashed using hash process 135 and then the hashed message 136a is encrypted by an encryption process 137a that uses the private encryption key (sk) of node $N_{DEL}$. The resulting digital signature 138a (see $N_{DEL}$ Digital Signature, Field 30 in Table 6) is received by node $N_{REC}$, where it is decrypted by a decryption process 139a that uses the public encryption key (pk) of node $N_{DEL}$. The result of the decryption process 139a is a hashed message 140a for Tx_Del. In addition to the hashed message, node $N_{DEL}$ also sends a copy 141a of the delivery contra-transaction details to node $N_{REC}$. Those transaction details are hashed by node $N_{REC}$ using a hash process 142 to produce hashed message 143a, which hashed message 143a is then compared to hashed message 140a produced by the decryption process 139a. If the hashed messages match (step 144), then $N_{DEL}$ Digital Signature is good.

Referring to FIG. 19B, block 134b represents a receipt contra-transaction Tx_Rec generated by node $N_{REC}$. The transaction details are represented by data stored in specific fields of a transaction log maintained by node $N_{REC}$ (see fields listed in Table 7). These fields include an encryption hash $N_{DEL}$ E# and data identifying the fields used to generate that encryption hash. Tx_Rec is hashed using hash process 135 and then the hashed message 136b is encrypted by encryption process 137b that uses the private encryption key (sk) of node $N_{REC}$. The resulting digital signature 138b (see $N_{REC}$ Digital Signature, Field 30 in Table 7) is received by node $N_{DEL}$, where it is decrypted by a decryption process 139b that uses the public encryption key (pk) of node $N_{REC}$. The result of the decryption process 139b is a hashed message 140b for Tx_Rec. In addition to the hashed message, node $N_{REC}$ also sends a copy 141b of the receipt contra-transaction details to node $N_{DEL}$. Those transaction details are hashed by node $N_{DEL}$ using a hash process 142 to produce hashed message 143b, which hashed message 143b is then compared to hashed message 140b. If the hashed messages match (step 144), then $N_{REC}$ Digital Signature is good.

If after the data sharing process, the digital signatures have been verified, then the delivery contra-transaction data is posted by nodes $N_{DEL}$ and $N_{REC}$ to respective delivery transaction logs and the receipt contra-transaction data is posted by nodes $N_{DEL}$ and $N_{REC}$ to respective receipt transaction logs. In addition, node $N_{DEL}$ broadcasts Tx_Del (which includes $N_{REC}$ E#) to the network and node $N_{REC}$ broadcasts Tx_Rec (which includes $N_{DEL}$ E#) to the network, which information can be received by an independent node N_Ind (not shown in FIGS. 19A and 19B).

Figure 20:
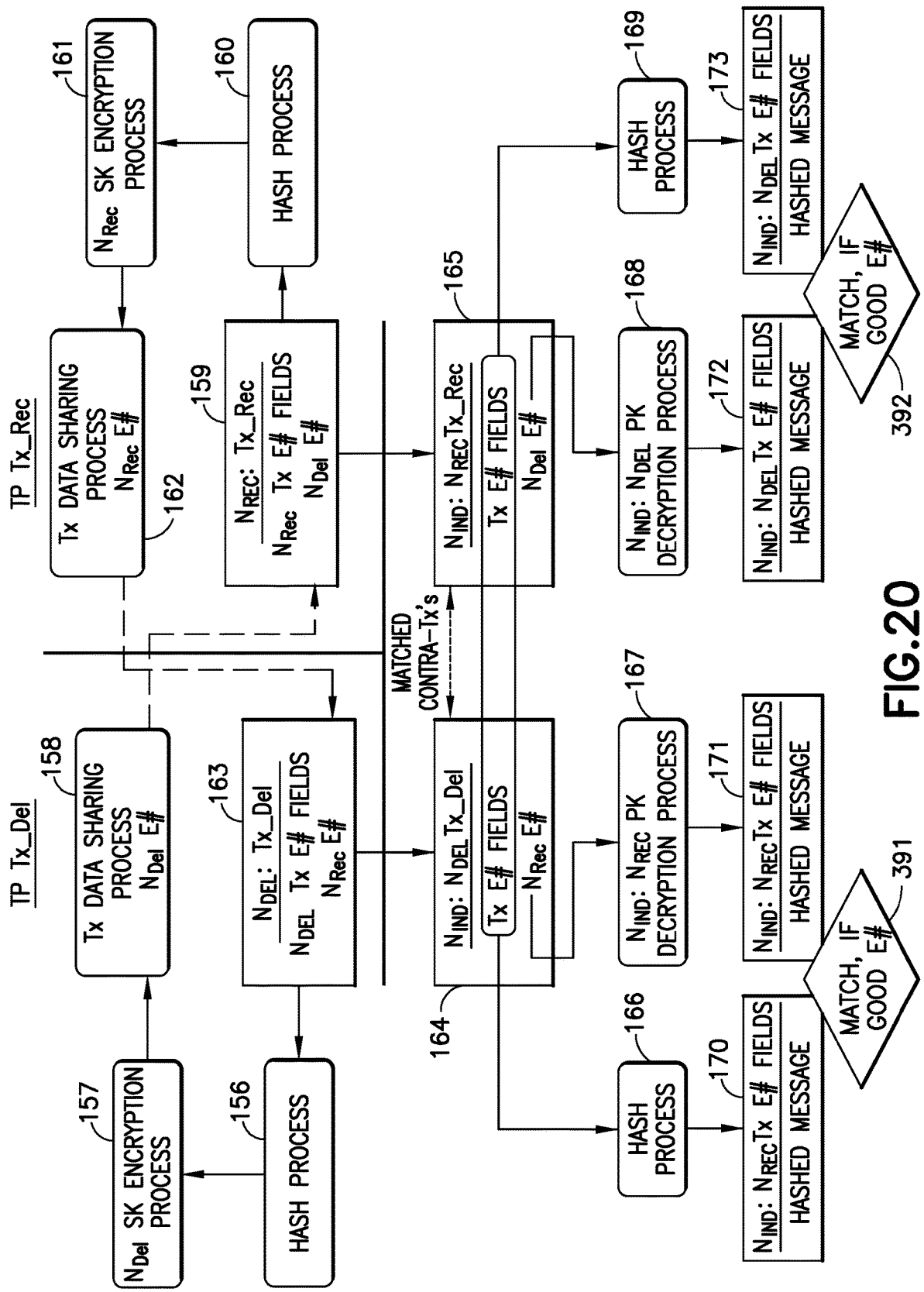
FIG. 20 is a flowchart showing a process for executing and recording transactions using multi-signature encrypted hashing in accordance with one embodiment.

B.1. Multi-Signature Encrypted Hash (E#). FIG. 20 is a flowchart showing a process for recording transactions on an independent node using multi-signature encrypted hashing in accordance with one embodiment. The encrypted hash E# is used as a form of multi-signature control and contra-transaction matching and linking.

Referring to FIG. 20:

N_Del creates N_Del E# by hashing {$N_{DEL}$ sk(Message=$N_{DEL}$ ID, $N_{DEL}$ $FL_{Address}$, $N_{REC}$ ID, Asset ID, Amount)} (step 156) and then encrypting that hashed message using its own private encryption key sk (step 157).

N_Del shares N_Del E# data with N_Rec (step 158).

N_Rec creates N_Rec E# by hashing {$N_{REC}$ sk(Message=$N_{REC}$ ID, $N_{REC}$ $FL_{Address}$, $N_{DEL}$ ID, Asset ID, Amount)} (step 160) and then encrypting that hashed message using its own private encryption key sk (step 161).

N_Rec shares N_Rec E# data with N_Del (step 162).

N_Del Tx_Del 163 does not identify N_Rec but has the N_Rec E# without identifying that N_Rec produced it.

N_Rec Tx_Rec 159 does not identify N_Del but has the N_Del E# without identifying that N_Del produced it.

When the two contra-transactions 164 and 165 are matched (indicated by a two-headed dashed arrow in FIG. 20) by the independent node N_Ind, the contra-nodes N_Del and N_Rec are identified and the encrypted hashes (E#) can be checked and verified. More specifically, N_Rec ID is one of the fields, so when the transaction is received by N_Ind or any other node, it can recreate the hashed message 170 using hash process 166 from the consistent $N_{REC}$ Tx E# data fields, including N_Rec ID. The hashed message 171 resulting from decryption process 167 (using $N_{REC}$'s public encryption key pk) of the $N_{REC}$ Tx E# data fields received in the matched transaction 164 can then be matched (by matching process 391) with the check hashed message 170 to verify the delivery contra-transaction. In parallel, N_Del ID is one of the fields, so when the transaction is received by N_Ind or any other node, it can recreate the hashed message 173 using hash process 169 from the consistent $N_{DEL}$ Tx E# data fields, including N_Del ID. The hashed message 172 resulting from decryption process 168 (using $N_{DEL}$'s public encryption key pk) of the $N_{DEL}$ Tx E# data fields received in the matched transaction 165 can then be matched (by matching process 392) with the check hashed message 173 to verify the receipt contra-transaction. This offers additional control on transaction broadcasting. To interfere with any transaction, a malfeasant would have to know the identities of both nodes and their respective private encryption keys. Contra-transactions can only be matched with the correct nodes; otherwise the encrypted hashes will not match the check hashed messages. As well as digitally signing the transaction to authenticate its origin, the node has to validate an encrypted hash, which includes the ID for both originating nodes.

Until both transactions are broadcast to the network (unless the parties or their public encryption keys are known), it is impossible to know which two nodes created the transactions and therefore recreate the public encryption key by node ID. The inclusion of transaction details prevents fraudulent interference once the transactions are broadcast as any interference would cause a mismatch with the encrypted hashed message matching processes 391 and 392 in FIG. 20.

The presence and validation of the encrypted hashes E# also prevents different transactions with identical transaction amounts being incorrectly matched as the encrypted hashes E# cannot be confirmed based on one or more of its field components being different.

Without the matching contra-transaction, the encrypted hashed message cannot be decrypted to be validated. One contra-transaction cannot be hijacked and re-used erroneously or as a malfeasant as decrypting and matching the encrypted hashed message requires the public encryption key of the unidentified node of the other contra-transaction.

B.2. Digital Signature and E# Summary.

Digital Signatures:

For the delivery contra-transaction, the digital signature is: Sig=sign(Message, sk)=sign ($Tx_{DEL}$, sk[$N_{DEL}$]).

For the receipt contra-transaction, the digital signature is: Sig=sign(Message, sk)=sign ($Tx_{REC}$, sk[$N_{REC}$]).

Encrypted Hashes:

For the delivery contra-transaction, the encrypted hash is $N_{REC}$ E#: Sig=sign(Message, sk)=sign (subset[$Tx_{DEL}$, $Tx_{REC}$], sk[$N_{REC}$]), where subset [$TX_{DEL}$, $Tx_{REC}$]=Hash [$N_{REC}$ ID, $N_{REC}$ $FL_{Address}$, $N_{DEL}$ ID, Asset ID, Amt].

For the receipt contra-transaction, the encrypted hash is $N_{DEL}$ E#: Sig=sign(Message, sk)=sign (subset[$Tx_{DEL}$, $Tx_{REC}$], sk[$N_{DEL}$]), where subset [$TX_{DEL}$, $TX_{REC}$]=Hash [$N_{DEL}$ ID, $N_{DEL}$ $FL_{Address}$, $N_{REC\ ID}$, Asset ID, Amt].

B.3. Transfer Transaction Details.

Figure 21:
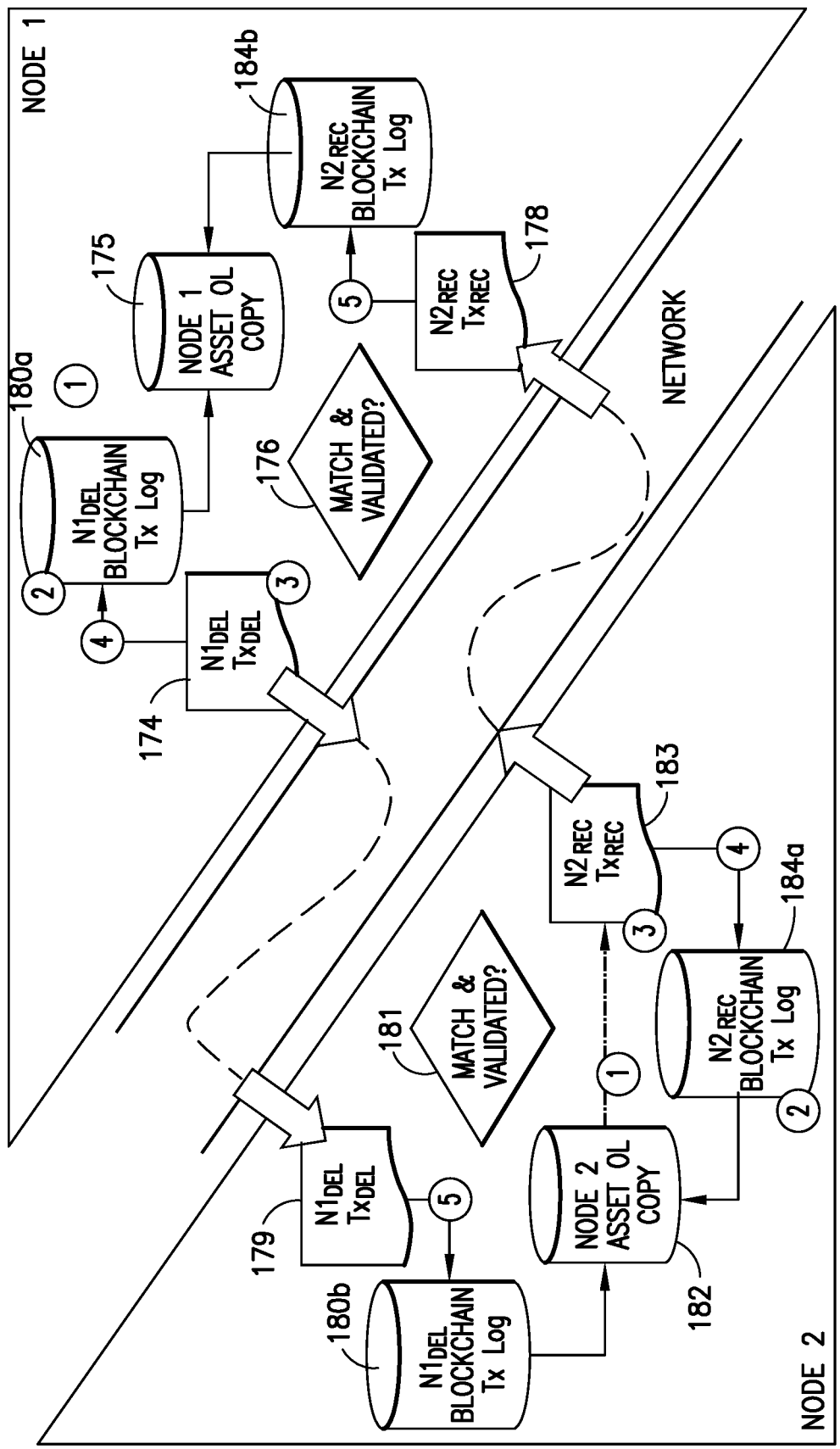
FIG. 21 is a schematic illustrating the high-level components of the execution and recording of a simple transfer process between two nodes connected by a network in accordance with one embodiment.
Figure 22:
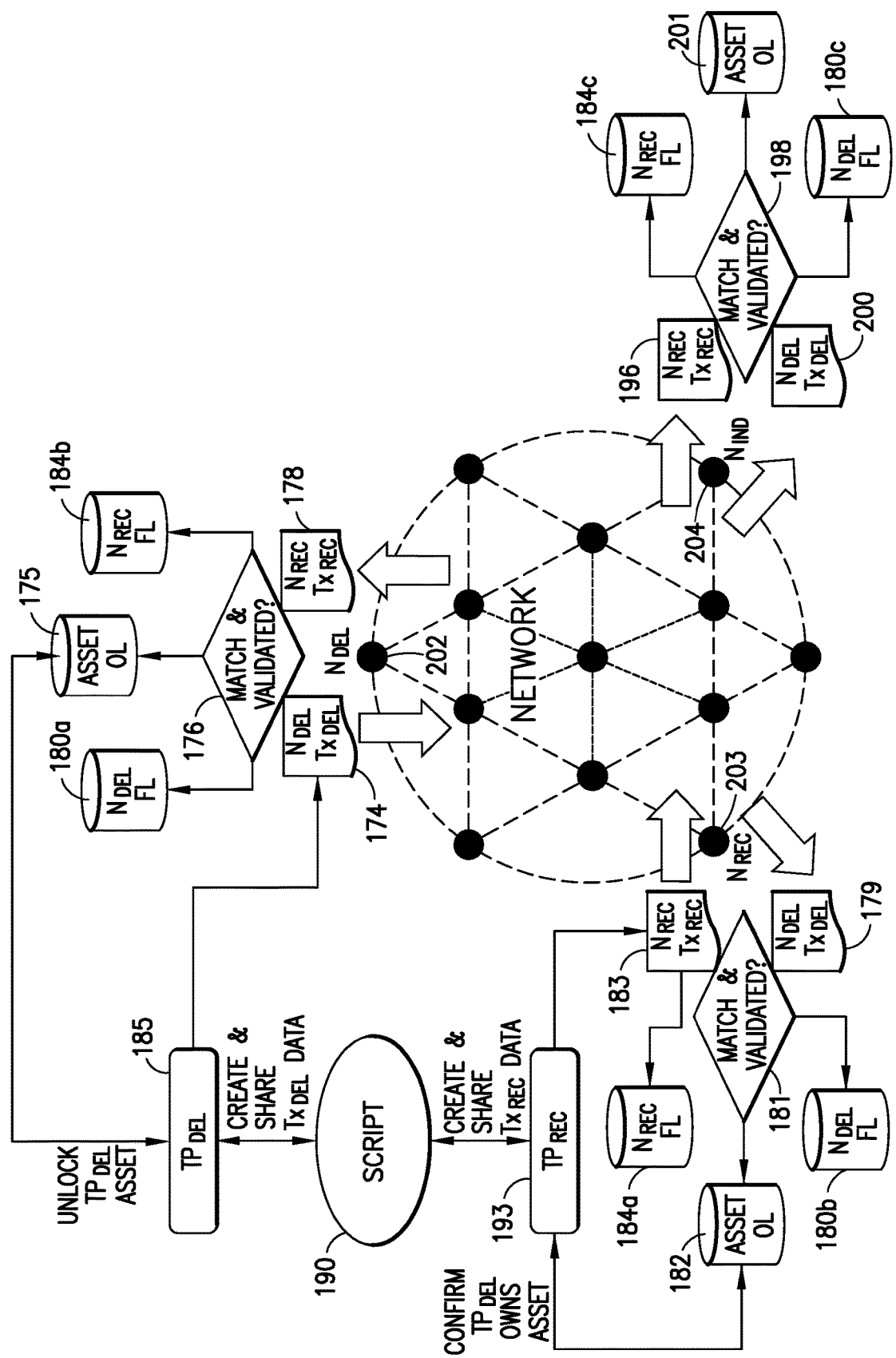
FIG. 22 is a schematic illustrating the high-level components of the execution and recording of a simple transfer process between nodes connected by a network in accordance with another embodiment.

FIG. 21 is a schematic illustrating the high-level components of the execution and recording of a simple transfer process between two nodes $N1_{DEL}$ and $N2_{REC}$ connected by a network in accordance with one embodiment. The contra-transactions 174 and 183 are assigned and posted to the originating node's fractal lattice in the $FL_{Address}$ order and hash-linked to the fractal lattice addresses in transaction logs 180a and 184a respectively, which are structurally in the prior layer of the respective fractal lattice structure. The transaction details posted to transaction log 180a for the delivery contra-transaction are listed in Table 6.

TABLE 6

$Tx_{DEL}$: Transaction Details Posted to $N_{DEL}$ Transaction Log

| | |
|---|---|
| 1. | $N_{DEL}$ ID |
| 2. | Asset ID |
| 3. | Short Fill Status Fill (Y/N) * |
| 4. | Short Status (Y/N) (2) |
| 5. | OL ID 2 Specified Amount (Y/N) * |
| 6. | $TP_{DEL}$ OL ID 1 |
| 7. | OL ID 1 = "Long", L, B, PLT or PLF |
| 8. | Linked OL ID for OL ID 1 if L, B, PLT or PLF |
| 9. | OL ID 1 Amount |
| 10. | $Tx_{DEL}$ Amount (OL ID 2) |
| 11. | $TP_{REC}$ $Tx_{REC}$ OL ID 2 * |
| 12. | OL ID 2 = "Long", L, B, PLT or PLF * |
| 13. | Linked OL ID for OL ID 2 if L, B, PLT or PLF * |
| 14. | Contingent Tx Status (Y/N) |
| 15. | Contingent Tx FL Address |
| 16. | OL ID 2 $TP_{REC}$ Encumbrance * |
| 17. | If OL ID 2 = Short Fill, then $N_{REC}$ FL ID * |
| 18. | If OL ID 2 = Short Fill, then $N_{REC}$ $FL_{Address}$* |
| 19. | $Tx_{DEL}$ Net Amount (OL ID 3) |
| 20. | $TP_{DEL}$ $TX_{DEL}$ OL ID 3 |
| 21. | OL ID 3 = "Long", L, B, PLT or PLF |
| 22. | Linked OL ID for OL ID 3 if L, B, PLT or PLF |
| 23. | OL ID 3 $TP_{DEL}$ Encumbrance |
| 24. | $N_{DEL}$ FL ID |
| 25. | $N_{DEL}$ $FL_{Address}$ |
| 26. | $N_{DEL}$ $FL_{Address}$ $\#_{LINK}$ |
| 27. | $N_{DEL}$ $FL_{Address}$ $\#_{LINK}$ Relationship |
| 28. | $N_{REC}$ Encrypted # * |
| 29. | $Tx_{DEL}$ # |

TABLE 6-continued $Tx_{DEL}$: Transaction Details Posted to $N_{DEL}$ Transaction Log

| | |
|---|---|
| 30. | $N_{DEL}$ Digital Signature |
| 31. | Tx Last (Y/N) |

The transaction details posted to transaction log 184a for the delivery contra-transaction are listed in Table 7 (see below). [Note: The asterisks in Table 6 indicate data fields which $N_{DEL}$ receives, within scripting code, from $N_{REC}$; the asterisks in Table 7 indicate data fields which $N_{REC}$ receives, within scripting code, from $N_{DEL}$.] The assigned address and hash link are included in the transaction details that are transmitted to the network. [Note: $TX_{DEL}$ does not identify $N_{REC}$ and $TX_{REC}$ does not identify $N_{DEL}$. Both are only linked upon matching the contra-transactions and having their relationship confirmed by the encrypted hashes.] This allows any recipient to recreate the identical fractal lattice structure and validate the transaction content and linkages without having to refer back to the originating node or any other node for confirmation.

TABLE 7

$Tx_{REC}$: Transaction Details Posted to $N_{REC}$ Transaction Log

| | |
|---|---|
| 1. | $N_{REC}$ ID |
| 2. | Asset ID |
| 3. | Short Fill Status Fill (Y/N) |
| 4. | Short Status (Y/N) |
| 5. | OL ID 2 Specified Amount (Y/N) |
| 6. | $TP_{DEL}$ OL ID 1 * |
| 7. | OL ID 1 = "Long", L, B, PLT or PLF * |
| 8. | Linked OL ID for OL ID 1 if L, B, PLT or PLF * |
| 9. | OL ID 1 Amount * |
| 10. | $Tx_{REC}$ Amount (OL ID 2) |
| 11. | $TP_{REC}$ $Tx_{REC}$ OL ID 2 |
| 12. | OL ID 2 = "Long", L, B, PLT or PLF |
| 13. | Linked OL ID for OL ID 2 if L, B, PLT or PLF |
| 14. | Contingent Tx Status (Y/N) |
| 15. | Contingent Tx FL Address |
| 16. | OL ID 2 $TP_{REC}$ Encumbrance |
| 17. | If OL ID 2 = Short Fill, then Short $N_{REC}$ FL ID |
| 18. | If OL ID 2 = Short Fill, then Short $N_{REC}$ $FL_{Address}$ |
| 19. | $Tx_{REC}$ Net Amount (OL ID 3) |
| 20. | $TP_{REC}$ $Tx_{DEL}$ OL ID 3 * |
| 21. | OL ID 3 = "Long", L, B, PLT or PLF * |
| 22. | Linked OL ID for OL ID 3 if L, B, PLT or PLF * |
| 23. | OL ID 3 $TP_{DEL}$ Encumbrance * |
| 24. | $N_{REC}$ FL ID |
| 25. | $N_{REC}$ $FL_{Address}$ |
| 26. | $N_{REC}$ $FL_{Address}$ $\#_{LINK}$ |
| 27. | $N_{REC}$ $FL_{Address}$ $\#_{LINK}$ Relationship |
| 28. | $N_{DEL}$ Encrypted # * |
| 29. | $Tx_{REC}$ # |
| 30. | $N_{REC}$ Digital Signature |
| 31. | Tx Last (Y/N) |

C. Transaction Process Flows

C.1. Transfer Process. The flow depicted in FIG. 21 and the following description illustrate the high-level components of the execution and recording of a simple transfer (e.g., a payment).

Node 1 ($N1_{DEL}$) and Node 2 ($N2_{REC}$) for the respective delivery and receipt transacting parties will each generate the respective contra-transactions $TX_{DEL}$ 174 and $TX_{REC}$ 183, post them to their respective node's fractal lattice-structured transaction logs 180a and 184a, and broadcast the contra-transactions to the network. Node 1 will create, post and broadcast $TX_{DEL}$ 174 and Node 2 will create, post and broadcast $TX_{REC}$ 183. Node 2 can, if the transaction is a long transaction, confirm the counterparties' ownership on its copy of the ownership log 182 as shown by the dot-dash arrow between the ownership log 182 and $TX_{REC}$ 183. The contra-transaction data will be generated from the transaction script, parameters and the data shared between the nodes.

Upon receipt of the counterparty node's transaction, each node will match and validate the contra-transaction and post the transaction to its copy of the counterparty node's fractal lattice-structured transaction log and update its ownership log. Node 1 will receive $N2_{REC}$ $Tx_{REC}$ 178 from Node 2 via the network, match and validate (process 176 in FIG. 21) it versus $N1_{DEL}$ $Tx_{DEL}$ 174 and post $Tx_{REC}$ 178 to $N1_{DEL}$'s copy 184b of $N2_{REC}$'s fractal lattice-structured transaction log and then update its copy 175 of the ownership log. Node 2 will receive $N1_{DEL}$ $Tx_{DEL}$ 179 from Node 1 via the network, match and validate (process 181 in FIG. 21) it versus $N2_{REC}$ $Tx_{REC}$ 183 and post $Tx_{DEL}$ 179 to $N1_{REC}$'s copy 180b of $N1_{DEL}$'s fractal lattice-structured transaction log and then update its copy 182 of the ownership log.

Reflecting the numbered circles in FIG. 21, the core properties and controlled process to record transactions on this distributed ledger are as follows:

(1) The transaction logs and ownership logs are separate.

(2) There is one transaction blockchain per node per security (or group of securities).

(3) For every transfer, there are two contra-transactions—a delivery contra-transaction and a receipt contra-transaction.

(4) Each node creates and posts a copy of its contra-transaction to its own fractal lattice-structured transaction log and broadcasts the contra-transaction to the network (5) Each node in the network will receive, match and validate the contra-transactions and post the resulting transfer to its copy of the contra-transaction node's fractal lattice-structured transaction log and update the ownership log.

C.2. Self-Validating Distributed Ledger Network Process.

With respect to the above transfer process and FIG. $2_2$ and starting with two transacting parties $TP_{DEL}$ 185 and $TP_{REC}$ 193 using a script 190, reviewing a broader view of the network expanded from FIG. 21 demonstrates how the contra-transactions 174 and 183 are generated by nodes $N_{DEL}$ 202 and $N_{REC}$ 203 and how any independent node ($N_{IND}$) 204, not involved with the transaction, can receive both contra-transactions 196 and 200, match and validate them (process 198) and post them to and recreate a copy 180c of $N_{DEL}$'s fractal lattice-structured transaction log and a copy 184c of $N_{REC}$'s fractal lattice-structured transaction log and update $N_{IND}$'s copy 201 of the ownership log independent of and without having to confer with nodes $N_{DEL}$ 202 and $N_{REC}$ 204 that generated the contra-transactions or any other nodes in the network. This is because of the validation processes and controls within the contra-transactions and the use of the fractal lattice addresses and hash-linking within the data structure, which can only be replicated in one, correct way.

C.3. Contingent Transfer Process.

Figure 23:
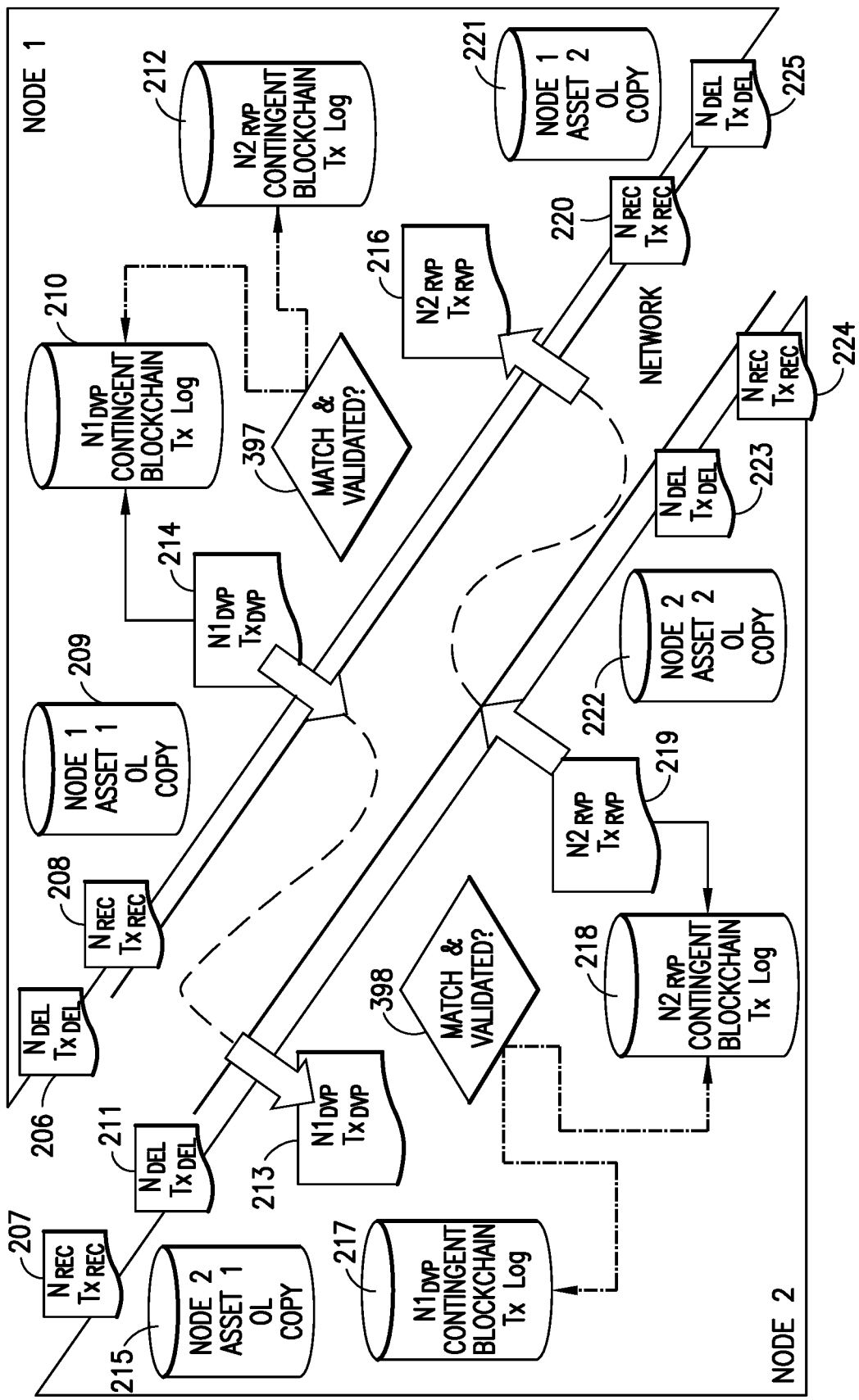
FIG. 23 is a schematic illustrating the high-level components of the execution and recording of a contingent transfer process between two nodes connected by a network in accordance with one embodiment.

FIG. 23 is a schematic illustrating the high-level components of the execution and recording of a contingent transfer process between Node 1 (also referred to as N1 or $N_{DEL}$) and Node 2 (also referred to as N2 or $N_{REC}$) connected by a network in accordance with one embodiment. The depicted system comprises independent contingent transfer fractal lattice-structured DVP and RVP transaction logs 210 and 212 in Node 1 and DVP and RVP transaction logs 217 and 218 in Node 2. The nodes of the two transacting parties will create matching DVP (213 and 214) and RVP (219 and 216) contra-transactions (i.e., $TX_{DVP}$ and $Tx_{RVP}$) with the details for both transfers created from the transaction script data and node-shared data. Once Node 2 receives a copy 213 of $TX_{DVP}$ and Node 1 receives a copy 216 of $TX_{RVP}$, these contra-transactions are matched and validated (processes 398 and 397). The contingent contra-transactions that Nodes 1 and 2 create can be broadcast to the network as each node has the data to do that, i.e., Node 1 can broadcast all four contra-transactions 206, 208, 220 and 225, whereas Node 2 can broadcast all four contra-transactions 207, 211, 223 and 224.

The RVP node (Node 2) will create a N_RVP Tx_Rec (207) and a N_Del Tx_Del (211) for Asset 1 and a N_DVP Tx_Del (223) and a N_RVP Tx_Rec (224) for Asset 2 and update N_Rec's Tx Log 218 (per transfer process, not shown) and its recreated copy of N_DVP's Tx Log 217 (per transfer process, not shown) and Node 2's copies 215 and 222 of the ownership logs for Assets 1 and 2.

The DVP Node (Node 1) will create a N_DVP Tx_Del (206) and a N_RVP Tx_Rec (208) for Asset 2 and a N_RVP Tx_Rec (220) and a N_DVP Tx_Del (225) for Asset 1 and update N_Del's Tx Log 210 (per transfer process, not shown) and its recreated copy of N_RVP's Tx Log 212 (per transfer process not shown) s and Node 1's copies 209 and 221 of the ownership logs for Assets 1 and 2.

Although not shown in FIG. 23, the two pairs of contra-transaction transfers will then be matched, validated and posted to their respective fractal lattice-structured transaction logs and the respective ownership logs updated as per the transfer process described above.

Note: All four of the transfers required to complete the contingent transfer are generated and broadcast by both originating (contingent transfer) nodes so that both legs are known to the network. Independent nodes will match and validate the two contra-contingent transfers and subsequent two sets of two contra-transfers.

C.4. Short Transfer Process.

Figure 24:
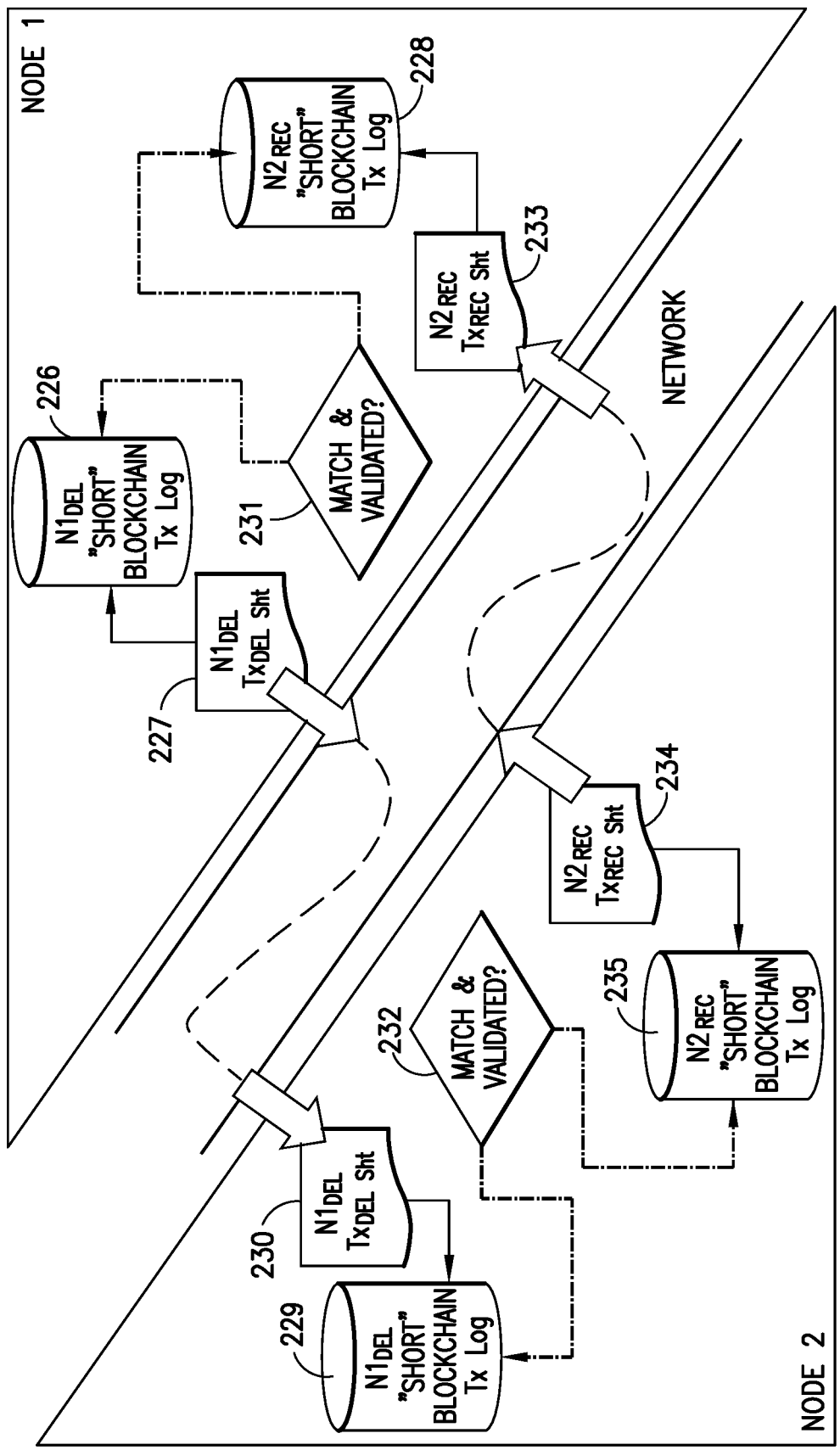
FIG. 24 is a schematic illustrating the high-level components of the execution and recording of a short transfer process between two nodes connected by a network in accordance with one embodiment.

FIG. 24 is a schematic illustrating the high-level components of the execution and recording of a short transfer process between two nodes connected by a network in accordance with one embodiment. For a short transfer, TP_Del's node, N_Del (Node 1), creates and broadcasts the agreed short Tx_Del (i.e., $TX_{DEL\ Sht}$ 227) to the network and the TP_Rec's node, N_Rec (Node 2) creates and broadcasts the agreed Short Tx-Rec (i.e., $TX_{REC\ Sht}$ 234). All nodes can receive, match and validate both short contra-transactions and record them in their copies of the nodes' respective FL transaction logs. N_Del (Node 1) receives $TX_{REC\ Sht}$ 233, matches and validates (process 231) $TX_{REC\ Sht}$ 233 with $TX_{DEL\ Sht}$ 227 and posts $TX_{DEL\ Sht}$ 227 to its N1_Del short FL transaction log 226 and posts $TX_{REC\ Sht}$ 233 to its copy 228 of N_Rec's N1_Rec short FL transaction log. Similarly, N_Rec (Node 2) receives $TX_{DEL\ Sht}$ 230, matches and validates (process 232) $TX_{DEL\ Sht}$ 230 with $TX_{REC\ Sht}$ 234 and posts $TX_{REC\ Sht}$ 234 to its N2_Rec short FL transaction log 235 and posts $TX_{DEL\ Sht}$ 230 to its copy 229 of N_Del's N1_Del short FL transaction log. Each short contra-transaction contains the information for the respective Tx_Del and Tx_Rec once the short is filled by a referenced "long" ownership log ID.

Short Transfer Fill: Although not shown in FIG. 24, once the "long" ownership log ID is referenced from another transaction, then each originating node can generate the respective Tx_Del and Tx_Rec transfers per the previously described transfer flow and broadcast them to the network to have the respective ownership logs and fractal lattice-structured transaction logs updated.

C.5. Short Contingent Transfer Process.

Figure 25:
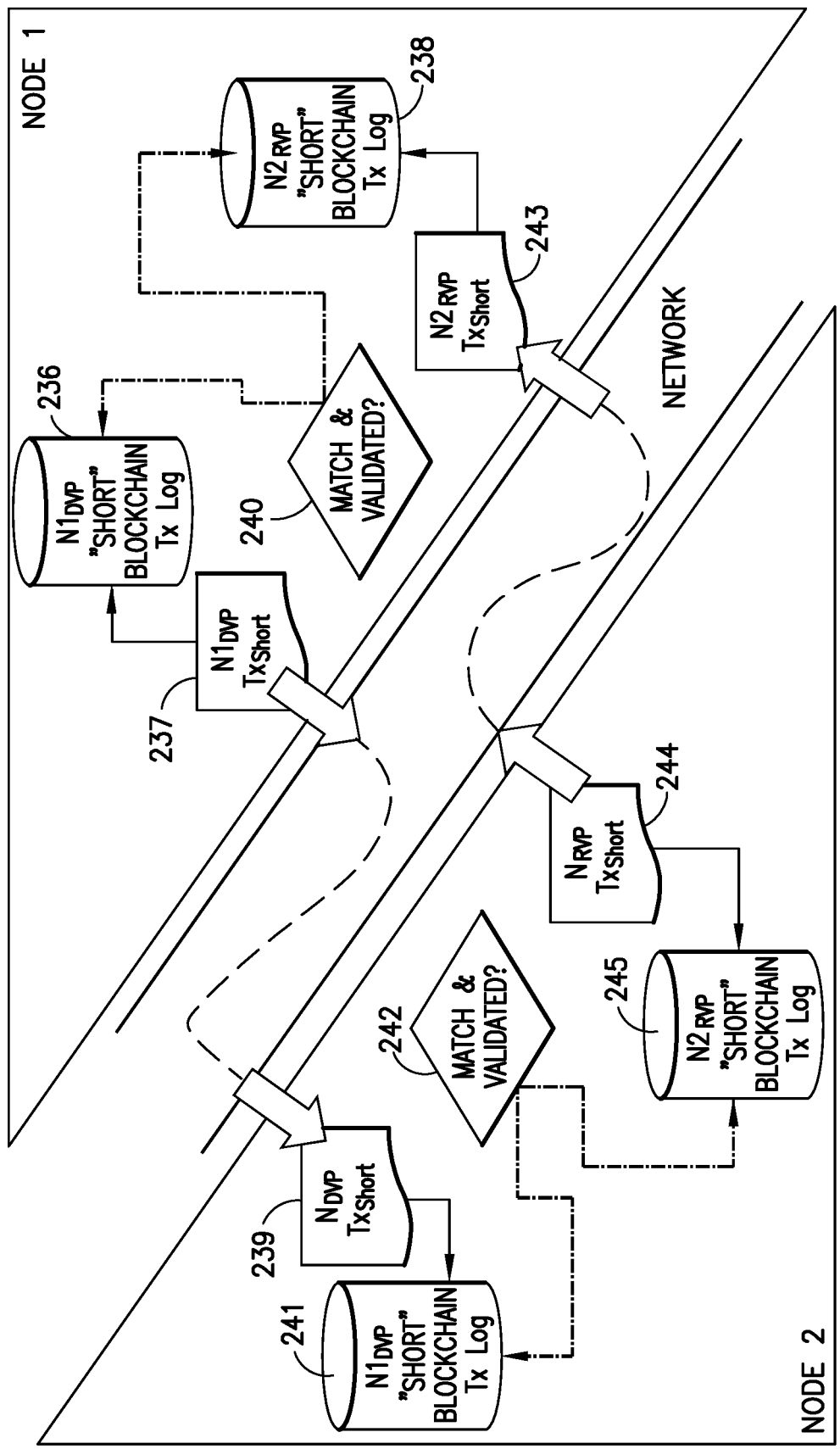
FIG. 25 is a schematic illustrating the high-level components of the execution and recording of a short contingent transfer process between two nodes connected by a network in accordance with one embodiment.

FIG. 25 is a schematic illustrating the high-level components of the execution and recording of a short contingent transfer process between two nodes connected by a network in accordance with one embodiment. For a short contingent transfer, TP_DVP short's (TP_ABBA Short) N_DVP Short (Node 1) creates and broadcasts the agreed Tx_DVP short (237) (Tx_ABBA Short) to the network and the other TP_RVP short's (TP_BAAB Short) N_RVP Short (Node 2) creates and broadcasts the agreed Tx_RVP Short (244) (Tx_BAAB Short) to the network. All nodes can receive, match and validate both short contra-transactions and record them in their copies of the TP nodes' respective FL transaction logs.

N_DVP Short (Node 1) receives Tx_RVP Short (243), and matches and validates (240) Tx_RVP Short (243) versus Tx_DVP Short (237) and posts Tx_DVP Short (237) to its own copy of N1_DVP Short FL Tx Log (236) and posts Tx_RVP Short (243) to its copy of N2_RVP Short's FL Tx Log (238).

N_RVP Short (Node 2) receives Tx_DVP Short (239), and matches and validates (242) Tx_DVP Short (239) versus Tx_RVP Short (244) and posts Tx_RVP Short (244) to its own copy of N2_RVP Short FL Tx Log (245) and posts Tx_DVP Short (239) to its copy of N1_DVP Short's FL Tx Log (241).

Each short contingent contra-transaction contains the information for the respective Tx_Del and Tx_Rec of one asset and the respective Tx_Rec and Tx_Del of the other contingent asset in readiness for processing the "fills" of the respective "long" ownership log IDs.

In certain circumstances, e.g., for allocations and fills, there will be situations where one leg of the contingent transfer will be for an unspecified amount. This contingent transfer will still be recorded, but the final transfer amounts to be recorded will be communicated with the "fill".

Short Contingent Transfer Fill: Although not shown in FIG. 25, once both "long" OL ID's are referenced from another transaction, then each originating node can generate the respective Tx_Del and Tx_Rec for one asset and the respective Tx_Rec and Tx_Del for the other asset and broadcast them to the network to have the respective ownership logs and fractal lattice-structured transaction logs updated per the transfer flow previously described. Each of the two sets Tx_Del and Tx_Rec will reference the contingent transfer FL_Address as part of their transaction data.

Validation Process and Transaction Matching Controls

A. Transfer Validation Process and Matching Controls

When a node has received both contra-transactions within a transaction, it is able to run through a series of checks and validations to ensure that both demonstrate integrity and are linked, which will then allow the update to the ownership log. The validation requires the matching of data of both contra-transactions and the verification of both encrypted hashed messages requires a digital signature verification process with specifically defined data fields from both contra-transactions. Prior to the matching and validation of the contra-transactions, some preventative checks are performed first: (1) Does the OL ID 1 amount in the Tx_Del exist and match the amount referenced by OL ID 1 on the ownership log? (2) Is N_Del the node that owns the asset or received the value of the asset during the current transaction period and is the node referenced against the ownership log? (3) Is there an uninterrupted and uncorrupted chain of ownership of the asset to be delivered via the intra-day period (IDP) ownership log back to the start of period (SOP) ownership log?

For updates to the ownership log, there are two transaction's: Tx1 and Tx2. For the types of transfers available, Tx1 and Tx 2 are as shown in Table 8 follows:

TABLE 8

Types of Transfers

| Transaction | Tx1 | Tx2 |
|---|---|---|
| Transfer | Tx_Del | Tx_Rec |
| Pledge | Tx_PLF | Tx_PLT |
| Loan | Tx_L | Tx_B |
| Contingent Transfer | Tx_ABBA | Tx_BAAB |
| Transfer 1 for Contingent Transfer | Tx_Del-AB | Tx_Rec-AB |
| Transfer 2 for Contingent Transfer | Tx_Del-BA | Tx_Rec-BA |

All transfers could be reflected as future-dated shorts or future-dated payables and receivables.

The checks and validation processes between a Tx_Del and a Tx_Rec are as shown in Table 9:

TABLE 9

Checks and Validation Processes

| | $Tx_{DEL}$ and $Tx_{REC}$ Matching Data | Match Criteria Process | |
|---|---|---|---|
| 1 | $Tx_{DEL}$ & $Tx_{REC}$ Asset ID | $Tx_{DEL}$ Field = $Tx_{REC}$ Field = | True |
| 2 | $Tx_{DEL}$ & $Tx_{REC}$ OL ID 1 | $Tx_{DEL}$ Field = $Tx_{REC}$ Field = | True |
| 3 | $Tx_{DEL}$ & $Tx_{REC}$ OL ID 1 Amount | $Tx_{DEL}$ Field = $Tx_{REC}$ Field = | True |
| 4 | $Tx_{DEL}$ & $Tx_{REC}$ Amount (OL ID 2) | $Tx_{DEL}$ Field = $Tx_{REC}$ Field = | True |
| 5 | $Tx_{DEL}$ & $Tx_{REC}$ $TP_{REC}$ $Tx_{REC}$ OL ID 2 | $Tx_{DEL}$ Field = $Tx_{REC}$ Field = | True |
| 6 | $Tx_{DEL}$ & $Tx_{REC}$ OL ID 2 $TP_{REC}$ Encumbrance | $Tx_{DEL}$ Field = $Tx_{REC}$ Field = | True |
| 7 | $Tx_{DEL}$ & $Tx_{REC}$ $Tx_{DEL}$ Net Amount (OL ID 3) | $Tx_{DEL}$ Field = $Tx_{REC}$ Field = | True |
| 8 | $Tx_{DEL}$ & $Tx_{REC}$ $TP_{DEL}$ $Tx_{DEL}$ OL ID 3 | $Tx_{DEL}$ Field = $Tx_{REC}$ Field = | True |
| 9 | $Tx_{DEL}$ & $Tx_{REC}$ OL ID 3 $TP_{DEL}$ Encumbrance | $Tx_{DEL}$ Field = $Tx_{REC}$ Field = | True |
| 10 | $Tx_{DEL}$ $N_{DEL}$ FL ID | $Tx_{DEL}$ $N_{DEL}$ FL ID Exists = | True |
| 11 | $Tx_{DEL}$ $N_{DEL}$ $FL_{Address}$ | $Tx_{DEL}$ $N_{DEL}$ $FL_{Address}$ is Open = | True |
| 12 | $Tx_{DEL}$ $N_{DEL}$ $FL_{Address}$ $\#_{Link}$ | Hash [$Tx_{DEL}$ $N_{DEL}$, prior $FL_{Address}$ $\#_{Link}$] = $FL_{Address}$ $\#_{Link}$ = | True |

TABLE 9-continued

Checks and Validation Processes

| Tx$_{DEL}$ and Tx$_{REC}$ Matching Data | Match Criteria Process | |
|---|---|---|
| 13 | Tx$_{REC}$ N$_{REC}$ FL ID | Tx$_{REC}$ N$_{REC}$ FL ID Exist = | True |
| 14 | Tx$_{REC}$ N$_{REC}$ FL$_{Address}$ | Tx$_{REC}$ N$_{REC}$ FL$_{Address}$ is Open = | True |
| 15 | Tx$_{REC}$ N$_{REC}$ FL$_{Address}$ #$_{Link}$ | Hash [Tx$_{REC}$ N$_{REC}$, Prior FL$_{Address}$ #$_{Link}$] = FL$_{Address}$ #$_{Link}$ = | True |
| 16 | Tx$_{DEL}$ # | Hash [Tx$_{DEL}$] = Tx$_{DEL}$ # = | True |
| 17 | Tx$_{REC}$ # | Hash [Tx$_{REC}$] = Tx$_{REC}$ # = | True |
| 18 | N$_{DEL}$ Digital Signature | isValid = verify(N$_{DEL}$ pk, Tx$_{DEL}$ #, N$_{DEL}$ sig) = | True |
| 19 | N$_{REC}$ E# | isValid = verify(N$_{REC}$ pk, Tx$_{REC}$ subset [Tx$_{DEL}$, Tx$_{REC}$], N$_{REC}$ E#) = | True |
| 20 | N$_{REC}$ Digital Signature | isValid = verify(N$_{REC}$ pk, Tx$_{REC}$ #, N$_{REC}$ sig) = | True |
| 21 | N$_{DEL}$ E# | isValid = verify(N$_{DEL}$ pk, Tx$_{DEL}$ subset [Tx$_{DEL}$, Tx$_{REC}$], N$_{DEL}$ E#) = | True |

Note: A contingent transfer would consist of two sets of transfers to be validated: a delivery/receipt of one security versus a receipt/delivery of the other security.

B. Ownership Log Update

The unique IDs for recording positions of ownership or value held will follow a consistent format. However, for the purpose of illustration, they can be generalized into record types. When two contra-transactions are matched, the updates to the ownership log fall into three primary records: (1) the originating value for the transfer from deliverer referenced (i.e., identified) by OL ID 1; (2) the value transferred to the recipient referenced by OL ID 2; and (3) the non-zero, net value retained by the deliverer referenced by OL ID 3. For other transactions: loans and borrows are referenced by OL ID_L and OL ID_B respectively; and pledges from and pledges to are referenced as OL ID_PLF and OL ID_PLT respectively. The data fields in each ownership log, in accordance with one embodiment, are as shown in Table 10:

TABLE 10

Ownership Log Data Fields

Ownership Logs

| | | |
|---|---|---|
| TP$_{DEL}$ OL ID 1 | TP$_{REC}$ OL ID 2 | TP$_{DEL}$ OL ID 3 |
| TP$_{DEL}$ OL ID 1 Encumbrance = Nil | TP$_{REC}$ OL ID 2 Encumbrance | TP$_{DEL}$ OL ID 3 Encumbrance |
| TP$_{DEL}$ OL ID 1 Asset ID | TP$_{REC}$ OL ID 2 Asset ID | TP$_{DEL}$ OL ID 3 Asset ID |
| TP$_{DEL}$ OL ID 1 Amount = Nil | TP$_{REC}$ OL ID 2 Amount | TP$_{DEL}$ OL ID 3 Amount |
| N$_{DEL}$ ID | N$_{DEL}$ ID | N$_{DEL}$ ID |
| N$_{DEL}$ FL ID | N$_{DEL}$ FL ID | N$_{DEL}$ FL ID |
| N$_{DEL}$ FL$_{Address}$ | N$_{DEL}$ FL$_{Address}$ | N$_{DEL}$ FL$_{Address}$ |
| N$_{REC}$ ID | N$_{REC}$ ID | N$_{REC}$ ID |
| N$_{REC}$ FL ID | N$_{REC}$ FL ID | N$_{REC}$ FL ID |
| N$_{REC}$ FL$_{Address}$ | N$_{REC}$ FL$_{Address}$ | N$_{REC}$ FL$_{Address}$ |
| Date Transacted | Date Transacted | Date Transacted |
| Date to be Posted | Date to be Posted | Date to be Posted |
| OL ID = "Long", P, R, L, B, PLT or PLF | OL ID = "Long", P, R, L, B, PLT or PLF | OL ID = "Long", P, R, L, B, PLT or PLF |
| Linked OL ID for P, R, L, B, PLT or PLF | Linked OL ID for P, R, L, B, PLT or PLF | Linked OL ID for P, R, L, B, PLT or PLF |

Although the logic shows OL ID 1 being transferred and reflected as OL ID 2 and 3, OL ID 2 and 3 effectively become OL ID 1's for the next transaction. Although it is not shown here, the implementation of the system would preferably involve the capability to reference multiple OL ID 1's to allow a larger transfer of value as well. Also, there will be a transfer from/to the same transacting party to allow either aggregation or breaking down of position lot sizes.

Transacting Period to Period Controls

A. Intra-Period Linkages

Figure 26:
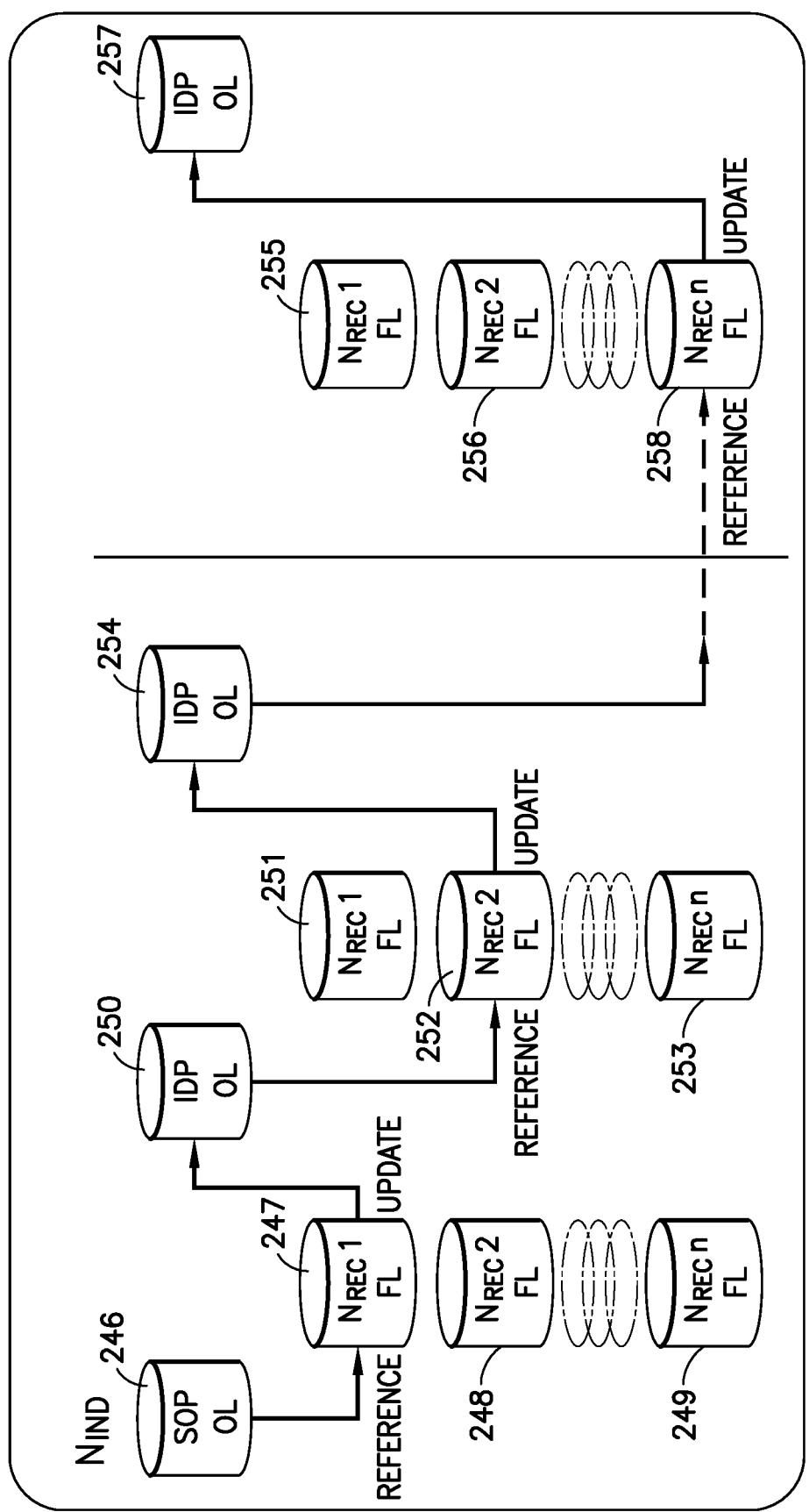
FIG. 26 is a schematic showing an intra-day ownership validation process performed by an independent node in accordance with one embodiment.

FIG. 26 is a schematic showing an intra-day ownership validation process performed by an independent node in accordance with one embodiment. A key principle of the transaction recording logic depicted in FIG. 26 is that throughout a transacting period, as long as an independent node (N$_{IND}$), i.e., a node not involved with the broadcast transactions, can reference the SOP ownership log (OL) (246) or IDP ownership log (250, 254, or 257) to validate the correct amounts available for transfer, then N$_{IND}$ can post the transactions to its copies of the ownership log (250, 254 or 257) and the fractal lattice-structured transaction logs of the respective originating nodes—N$_{REC}$ 1 through N$_{REC}$ n (i.e., nodes 247, 248, 249 or 251, 252, 253 or 255, 256, 258).

With the fractal lattice data structure (previously described with reference to FIG. 18) providing confidence in the transactions received and the tracking of all transacting nodes, at any point in time a node can, not only reference the latest asset position which a node holds, but also trace a chain of ownership back to the SOP ownership log.

For N$_{REC}$ 1 to receive a position not transacted during the current transacting period, N$_{IND}$ can validate that the position referenced is recorded in the SOP ownership log 246 before posting the transaction to its copies of the fractal lattice-structured transaction log 247 and IDP ownership log 250.

For N$_{REC}$ 2 to receive a position not transacted during the current transacting period, N$_{IND}$ can validate that the position referenced is recorded in the IDP ownership log 250 before posting the transaction to its copies of the fractal lattice-structured transaction log 252 and IDP ownership log 254.

For N$_{REC}$ n to receive a position not transacted during the current transacting period, N$_{IND}$ can validate that the position referenced is recorded in the IDP ownership log 254 before posting the transaction to its copies of the fractal lattice-structured transaction log 258 and IDP ownership log 257.

Note: The requirement for any receiving transacting party to accept a "long" transfer from a delivering transacting party is that N$_{REC}$ can confirm the delivering transacting party's position from its own records.

B. EOP Ownership Validation and Archiving

Figure 27:
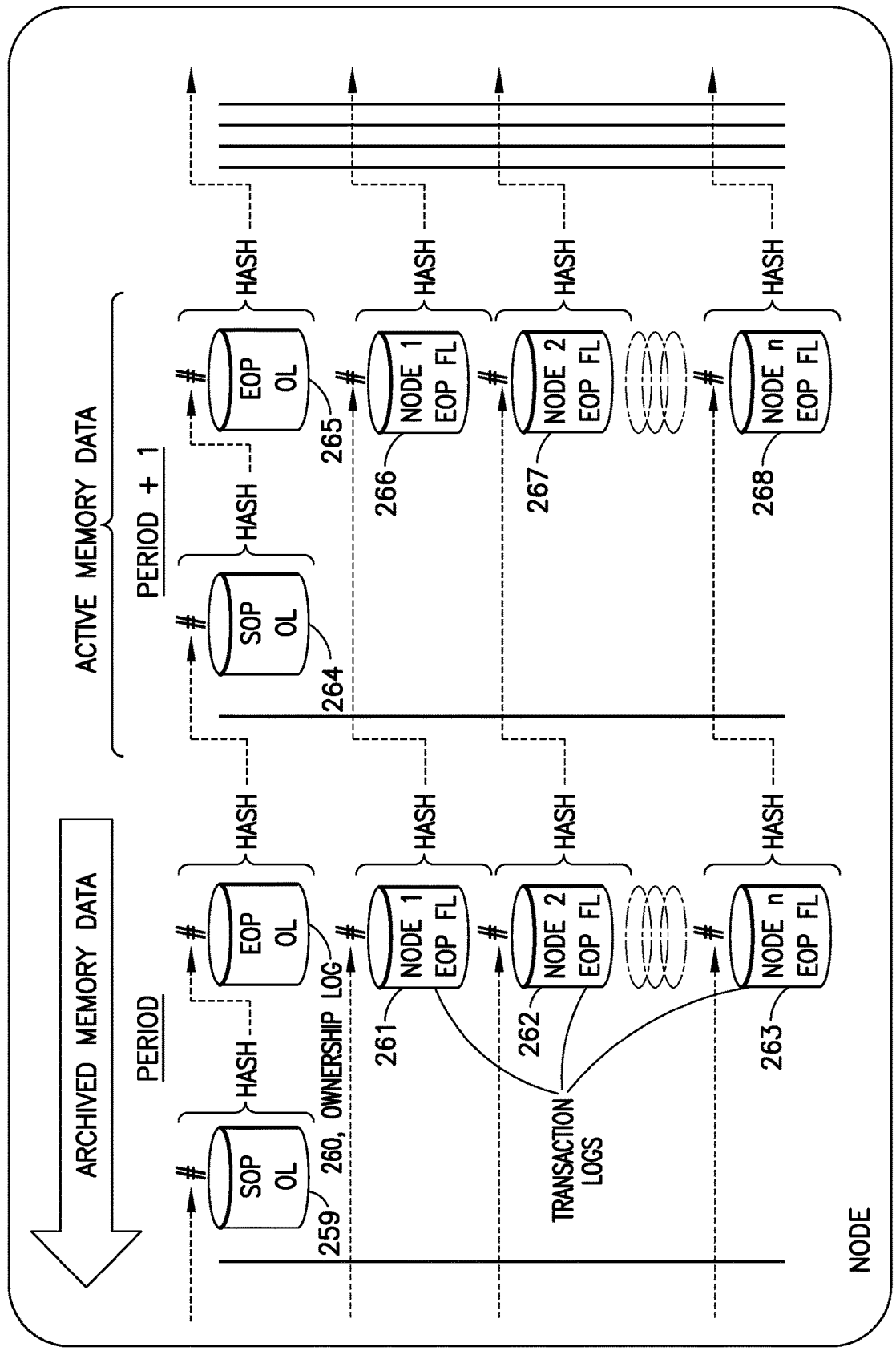
FIG. 27 is a schematic showing an inter-day ownership validation process performed by a node in accordance with one embodiment.

FIG. 27 is a schematic showing an inter-day ownership validation process performed by a node in accordance with one embodiment. For each node to transact in a particular asset, it must maintain its own copy of the ownership log for that asset, its own fractal lattice-structured transaction log for its contra-transactions in the asset and the fractal lattice-structured transaction logs for all the participating nodes.

For the ownership log (OL) it will hash link the EOP OL 260 from the prior period to the SOP OL 264 of the next period, which in turn will be hash linked to the EOP OL 265 of that period and so on. For an EOP OL, the linking hash will be a Merkel tree hash of all the non-zero entries for the following data elements: Unique OL ID, Asset ID, Amount.

For every fractal lattice-structured transaction log (FL) 261-263, the last transaction of the EOP FL will be hash linked to the first transaction of the next period's fractal lattice-structured transaction logs 266-268.

The fractal lattice-structured transaction logs and the EOP ownership logs can be archived every period (e.g., logs 259-263), meaning the active memory that needs to be referenced to confirm transactions is only the current versions 264 and 265 of the ownership log (IDP OL) and only the transactions transmitted to the network for that period (recorded in logs 266, 267, 268).

Additional Validation: Across all copies of each node's transaction log, the net transfers will equal zero. Apart from net increases or decreases via the "Airlock", the total position for any one security will be constant.

Note: Although there is no requirement to check the EOP results as the fractal lattice-structured transaction logs are self-defining and self-validating, there can be put in place best practices to randomly select certain ownership logs and fractal lattice-structured transaction logs and confirm their EOP hashes with other nodes, or there could be an end-of-day transmission of EOP hashes by every node to the network, for reference and confirmation.

C. Interdependent Linkages

Figure 28:
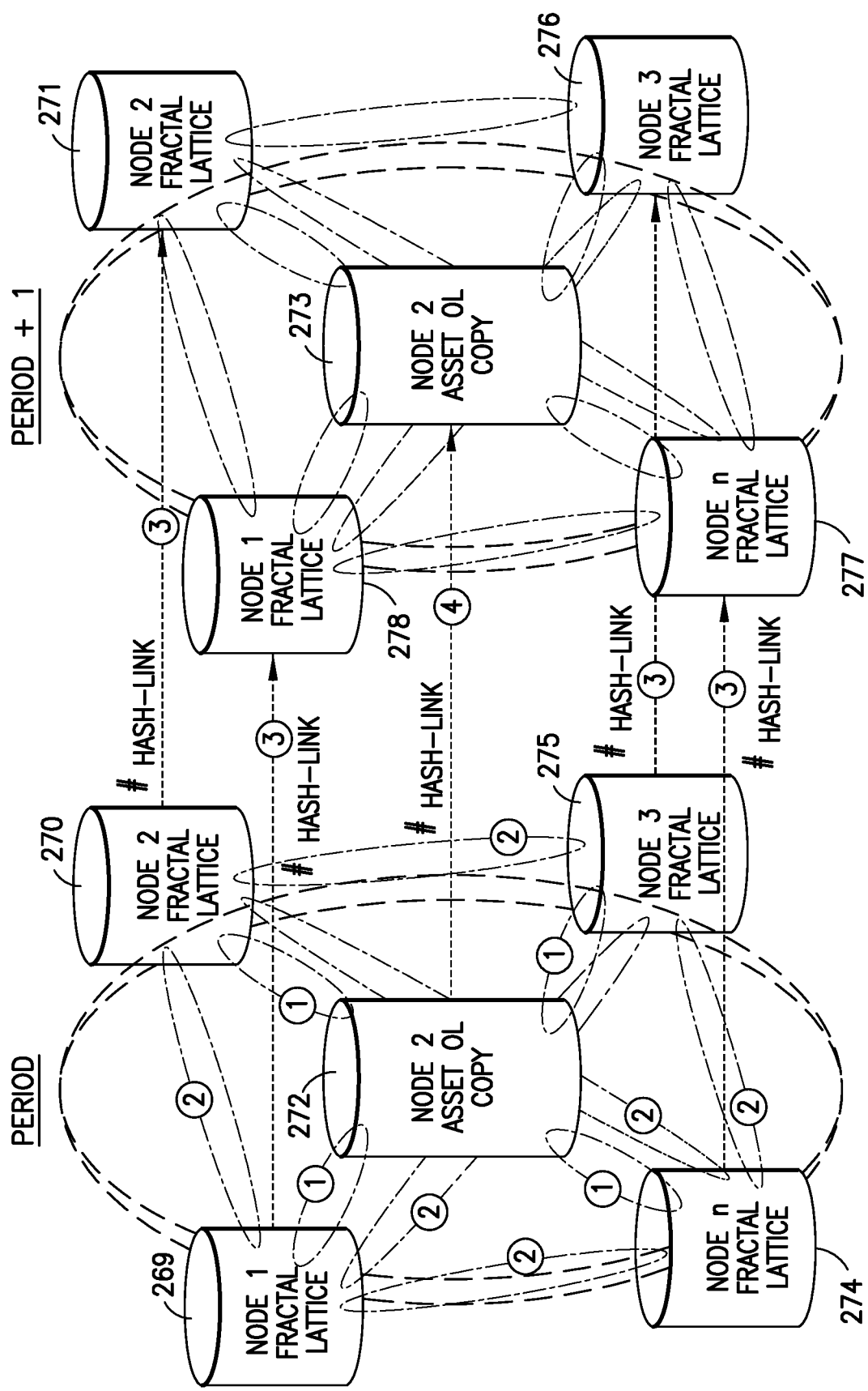
FIG. 28 is a schematic showing interdependent blockchain linkages between the ownership log of one node and the fractal lattice-structured transaction logs of itself and other nodes at two different times in accordance with one embodiment.

FIG. 28 is a schematic showing interdependent linkages between the ownership log of one node (i.e., Node 2) and the fractal lattice-structured transaction logs of itself and other nodes at two different times in accordance with one embodiment. As well as the variable, n-dimensional organizing and linking of the transaction data within the fractal lattice data structure, the ownership log and the recreations of all the nodes' transaction logs are linked via inter- and intra-period links. The numbered circles in FIG. 28 indicate the following:

(1) Each contra-transaction is posted to each node's fractal lattice and linked to the update on the ownership log.

(2) The contra-transactions from both originating nodes are cross-referenced and linked to each other.

(3) Each copy of a node's fractal lattice is hash-linked to the next period's respective transaction logs.

(4) Each copy of a node's ownership log is hash-linked to the next period's respective ownership logs, however, if a node selects to keep a limited number of counterparty transaction log records, its ownership log records will be unique to its records so the hash-link between inter-period ownership logs would only help its own integrity and would not have to be completed as there is enough integrity from transaction log links in (2) above and their respective links to the ownership logs in (1) above.

The nature of all the linkages provides the means for any node to recreate the self-validating structure. Any issues with any single contra-transaction or ownership log record will create inconsistencies in the interdependent immutable record.

For example, two contra-transactions for Nodes 1 and 2 are recorded on Node 2's records. One contra-transaction would be posted in Node 2's copy of the FL transaction log 269 for Node 1 and matched and validated with a contra-transaction from Node 2 posted in the FL transaction log 270 for Node 2. The two matched and validated contra-transactions would be used to update Node 2's ownership log 272.

At the end of a period the transaction and ownership logs would be hash-linked to their next period counter-parties. Node 2's copy of Node 1's FL transaction log 269 would be hash-linked to Node 2's copy of Node 1's FL transaction log 278 from the next period. Node 2's FL transaction log 270 would be hash-linked to Node 2's FL transaction log 271 from the next period. Node 2's ownership log 272 would be hash-linked to Node 2's ownership log 273 for the next period. Similarly, transaction logs 274 and 275 for one period can be hash-linked with transaction logs 277 and 276 respectively for the next period.

D. Future-Dated Period Linkages

Figure 29:
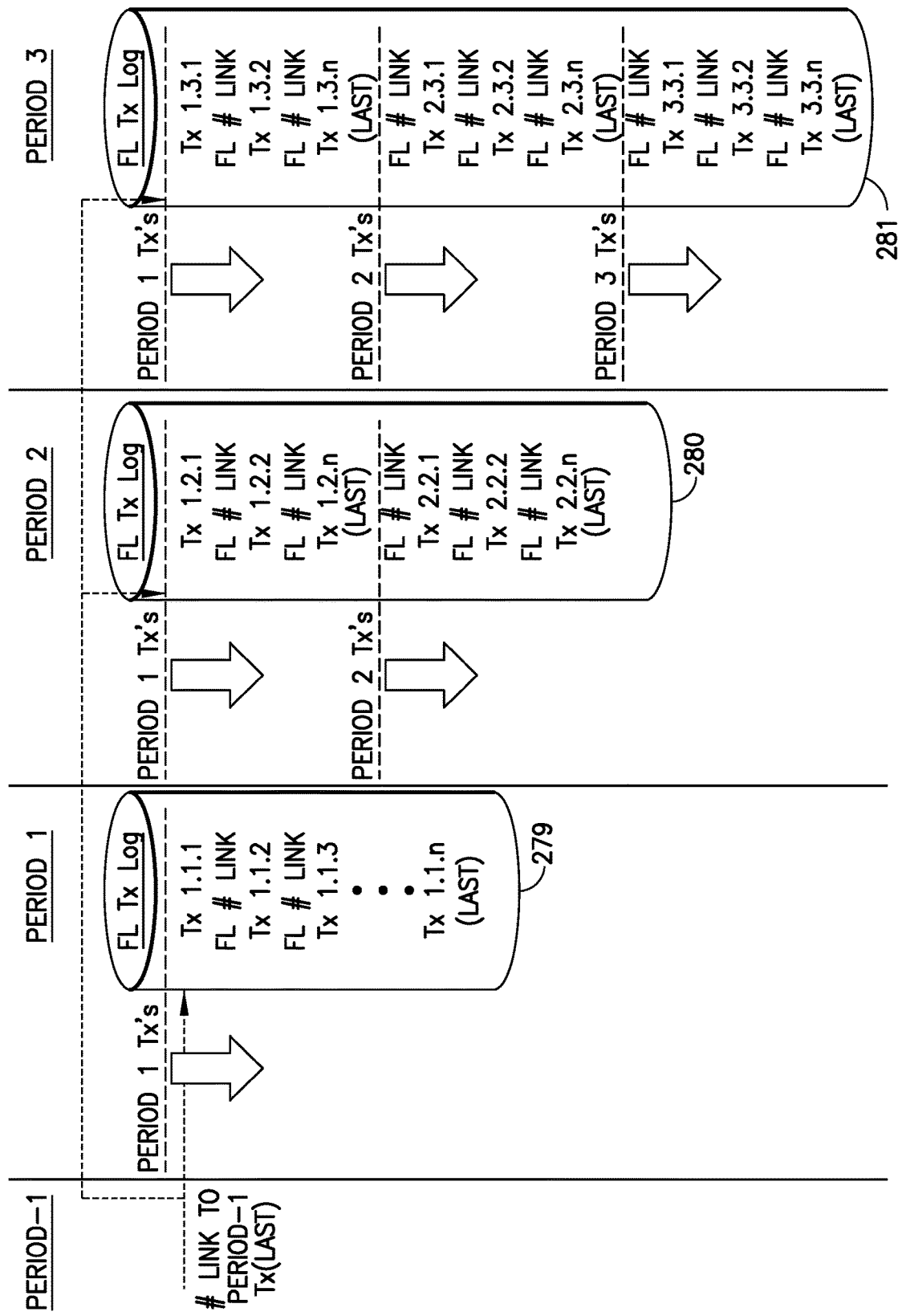
FIG. 29 is a schematic illustrating future-dated period linkages linking transaction data in a fractal lattice-structured transaction log in accordance with one embodiment.

FIG. 29 is a schematic illustrating future-dated period linkages linking transaction data in a fractal lattice-structured transaction log in accordance with one embodiment. For future-dated transactions, the logic of processing transactions remains the same except for pre-populating the fractal lattice transaction logs and the ownership logs for that future-dated period. The future-dated transactions for each prior transacting period are additive and can be archived each period until the "future" date becomes the "current" date and the fractal lattice transaction logs and the ownership logs of that date have entries recorded and linked to the prior dated transactions.

FIG. 29 demonstrates how, for one Node's FL, the transactions are recorded and linked sequentially through the successive prior periods.

If a transaction is represented as Tx a.b.c where: "a" is the period in which the transaction is executed; "b" is the period the transaction is to be posted; and "c" is the sequential transaction number (which would be the FL_Address) for the period a.b.

FIG. 29 shows the creation of future-dated and current period transactions being sequentially created. For any future-dated FL transaction log (280, 281), the first transaction recorded as Tx a.b.1 (1.1.1, 1.2.1, 1.3.1) will be hash-linked to the Tx_Last of the period (a–1). After the first transactions for any period (279, 280, 281), the subsequent transactions will be hash-linked to the period's (279) or future-dated periods' (280, 281) transactions as per the fractal lattice addressing and hash-linking as previously described.

For future-dated Period 3 (281): In Period 1 transactions, the first transaction (Tx 1.3.1) is hash-linked to the last transaction in Period –1. The transactions (Tx 1.3.1-Tx 1.3.n) are hash linked to each other. For Period 3 transactions executed in 280, the first transaction (Tx 2.3.1) is hash linked to the last future-dated transaction 281 from Period 1 (1.3.n). The Period 3 transactions executed in Period 2 (Tx 2.3.1-2.3.n) are hash-linked to each other. For Period 3 transactions executed in 281, the first transaction (Tx 3.3.1) is hash linked to the last future-dated transaction 281 from Period 2 (2.3.n). The Period 3 transactions executed in Period 3 (Tx 3.3.1-3.3.n) are hash-linked to each other.

Most future-dated transactions are expected to be transacted as "short" transfers, which will be filled on the future date. However, it is possible to record a future-dated transfer on the ownership log, which while reflecting the future obligation, does not create a transfer of value but locks the OL ID as "P"—Payable and identifies the future OL ID as "R"—Receivable.

Network

If "n" is the number of nodes in the network, the distributed ledger will be maintained by each node in (n+1) sections:

A transaction log which will consist of one fractal lattice-structured database per network node per asset or asset grouping.

The distributed ledger will include one ownership log database per network node per asset (consistent with the fractal lattice-structured transaction logs) listing the current state of all asset ownership positions.

Note: For contingent transfers there is an additional contingent fractal lattice-structured transaction log (FLCtgt) to record the transaction, which when matched is used to generate and broadcast the four contra-transactions for the two related bi-directional transfers.

The network will have a set of consensus-approved transaction scripts within the network.

The scripts will call the coded versions of the genome sequential transaction components, which are the transaction life-cycle building blocks.

For each life-cycle script and series of sequential transaction components, the transacting parties will agree upon the parameters to be agreed within the scripts.

Each transacting party's node will independently run the script to generate its contra-transactions to be broadcast to the network.

The scripts will control the process of transacting parties agreeing to transactions and the data flow to and from each transacting party and each node.

Where necessary and as defined within the process flows, the script will allow sharing of data across the network to create the two independent contra-transactions.

The simple coding language used, the small finite number of transaction options, the standardized scripts and the independent generation of the contra-transactions will make it very hard for participants to make errors or participate in malfeasant transactions.

The scripts will control the "Account Reveal" process and will reference the answer against a dataset of transacting parties.

The scripts and the code will allow the transacting party to control the locking and unlocking of value posted to the ownership logs.

Utilizing a standardized script and agreed parameters for a transaction, each transacting party, via its node, will create a contra-transaction to be broadcast to the network.

Each originating transacting party involved in the transaction has its node update its record of the fractal lattice-structured transaction log.

Each originating node will wait to receive the contra-transaction via the network Any node independent ($N_{IND}$) of the transaction will receive the two contra-transactions via the network.

For the first transaction received, the independent node $N_{IND}$ will update the respective fractal lattice-structured transaction log.

Upon receipt, matching and validation of the second contra-transaction, each node will match and validate the two contra-transactions on the separate fractal lattice-structured transaction logs per node and will record them on the fractal lattice-structured transaction log per the transaction logic and act according to the contingent flow of the coded transactions:

For short transfers or short contingent transfers, no further steps are required; the nodes will wait for the short "fill" transactions For transfers, "filled" short transfers, pledges, loans, pledge or loan returns, the nodes will update their copies of the asset's ownership log according to the transaction logic For contingent versions of transfers, "filled" short transfers, pledges, loans, pledge or loan returns. the nodes will: (1) update and validate the update of its copies of the respective contingent transfer asset fractal lattice-structured transaction logs for the originating nodes; (2) validate and update its copies of the two respective asset ownership logs; and (3) generate and broadcast the two pairs of contra-transactions to the network.

The structure of the fractal lattice-structured databases and linkages between the transactions and the ownership log as an expanding record is self-defining and self-validating. The primary requirement of a node is to match and validate transactions, and then record and broadcast the validated transactions.

Nodes need to communicate with other local nodes or specific nodes as it relates to questioning, missing or incomplete transactions or transactions that cannot be validated.

At the end of a period, before shutting down transmission of transactions, a node will mark its last transaction as its "Last" or send an empty (Null) transaction marked "End", so any other node will then know its copy of that node's fractal lattice-structured transaction log is complete.

The workflow for execution and recordation of various financial transactions will now be described with reference to FIGS. 30 through 37, each of which shows workflow in a network comprising one originating node that creates the delivery contra-transaction, another originating node that creates the receipt contra-transaction and an independent node that records the transaction and balances. In each of FIGS. 30 through 37, all three nodes end with identical copies of the two fractal lattice-structured transaction logs and one ownership log.

For simplicity of coding, the scripts for all types of transactions follow the same six fundamental steps: (1) identity confirmation between parties; (2) ownership confirmation, when needed for "long", ledger-referenced value, transactions; (3) transaction data generation by each originating node for their respective transactions; (4) transaction data sharing between transacting parties; (5) transaction posting (by the originating nodes to their records) and broadcast of the transactions to the network; and (6) receipt, validation and matching of transactions and posting to transaction logs and the ownership log of the non-originating nodes in the network.

Transfer

Figure 30B:
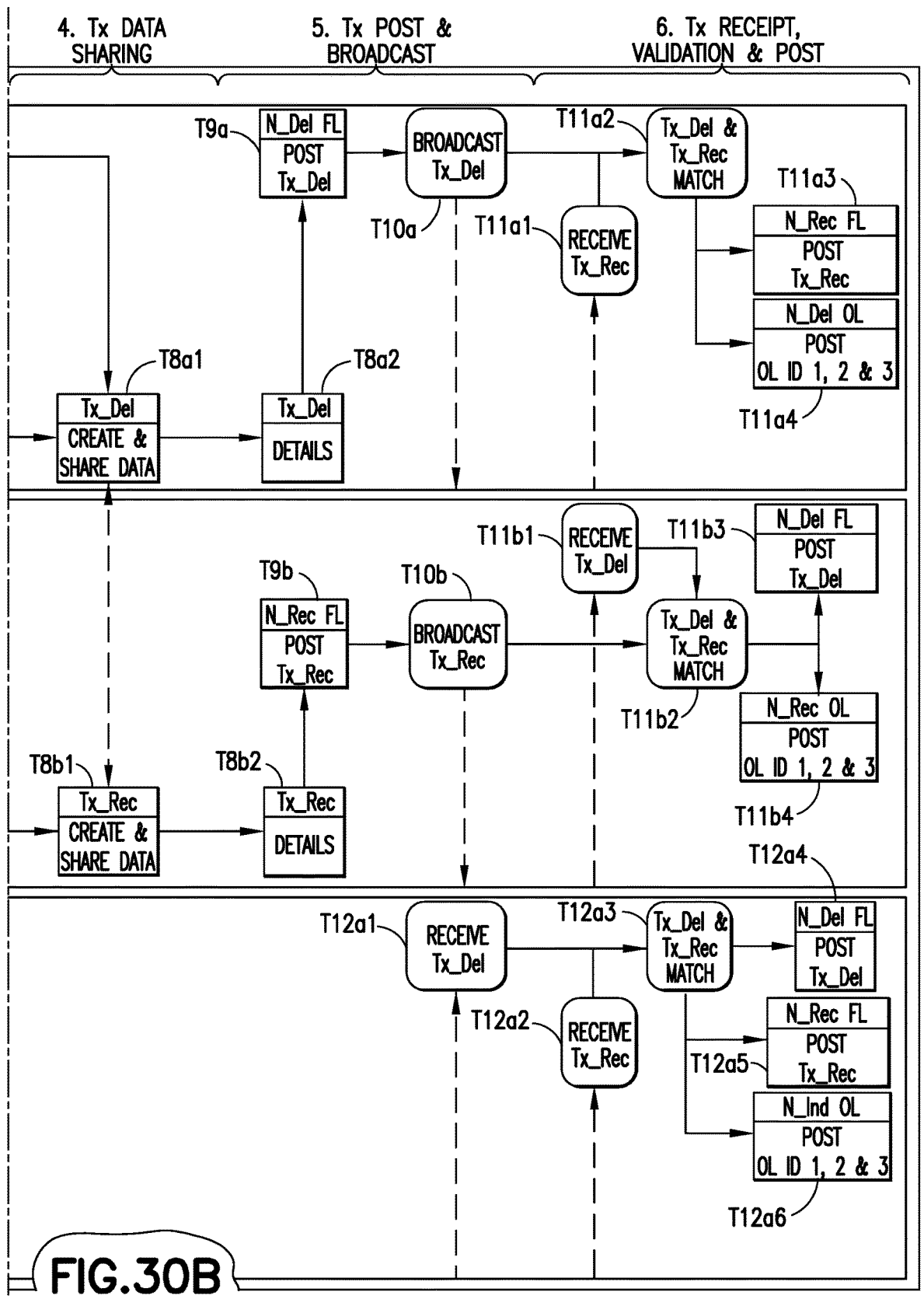

FIG. 30 is a schematic illustrating asset transfer workflow in a network comprising one node that creates the delivery contra-transaction, another node that creates the receipt contra-transaction and an independent node that records the transaction and balances in accordance with one embodiment. For FIG. 30 and the other similar, transfer FIGS. 31, 32, 34 and 35 the following are consistent elements:

The Nodes are represented as N_Del (285), N_Rec (289) and N_Ind (293). N_Del has its transaction log (286), ownership log (288) and recreated copies of N_Rec's transaction log (287). N_Del's transacting party (297) generates the delivery cross-transaction Tx_Del. N_Rec has its transaction log (291), ownership log (292) and recreated copies of N_Del's transaction log (290). N_Rec's transacting party (298) generates the receipt contra-transaction Tx_Rec. N_Ind has its ownership log (296) and recreated copies of N_Del's transaction log (294) and N_Rec's transaction log (295).

The respective transfer process steps shown in FIG. 30 and their associated logic and control factors are listed in Table 11.

TABLE 11

| | | Business and | Control |
|---|---|---|---|
| Ref | Transfer Process Steps | Process Logic | Factor |
| T1a<br>T1b | TP_Del (297) & TP_Rec (298) agree to Transact with each other via Blockchain Network | N/A | N/A |
| T2 | TP_Del (297) will reveal its identity to TP_Rec (298) and TP_Rec (298) will confirm ownership of OL ID 1 | pk & Unique ID relationship; Published pk | Pk |
| T3 | TP_Del (297) will identify TP_Rec (298) by its pk | Published pk | Pk |
| T4b1<br>T4b2 | TP_Rec (298) will be able to confirm from N_Rec's (289) records that TP_Del (297) has the value referenced in the SOP OL or IDP OL (J) | SOP OL & IDP OL Ownership Confirmation Process | Linked, published and validated Tx's on FL & OL |
| T5 | TP_Del (297) & TP_Rec (298) will execute Tx at some location (Probably outside network) | Execution process (O/side Rqmts) | N/A |
| T6a1<br>T6a2<br>T6a3 | TP_Del (297) will unlock OL ID1 | pk, Unique ID and Encumbrance Relationship | pk and defined encumbrance methodology |
| T6b | TP_Del (297) will generate OL ID 3 for Net Amount to be retained by TP_Del (297) | pk, Unique ID and Encumbrance Relationship | pk and defined OL ID methodology |
| T6c | TP_Rec (298) will generate OL ID 2 for Amount to be transferred from TP_Del (297) | pk, Unique ID and Encumbrance Relationship | pk and defined OL ID methodology |
| T7a1<br>T7a2<br>T7b2<br>T7b3 | N_Del (285) & N_Rec (289) will identify next sequential $FL_{Address}$ for the FL's | Algorithmic FL address assignment | FL Address Sequencing |
| T8a1<br>T8a2<br>T8b1<br>T8b2 | N_Del (285) & N_Rec (289) will create and share Tx data elements | Approved, defined Tx Script | Initially by script affirmation of Tx Details. Ultimately by Contra Tx match. |
| T9a<br>T9b | N_Del (285) & N_Rec (289) will post the Tx's to their own FL (D & I) (generating the Hash Linked record) | FL Self Defining and Self-Validating Process | $FL_{Address}$ and $\#_{Link}$ |
| T10a<br>T10b | N_Del (285) & N_Rec (289) will broadcast the Contra Tx's, FL Addresses and Hash Links to the Network | Network Tx broadcasting protocols | Network Tx Send/Receive Controls |
| T11a1<br>T11a2<br>T11a3<br>T11a4 | N_Del (285) will receive, validate and match N_Rec's Contra Tx and post the Tx details to N_Del's copy of N_Rec's FL (287) at the assigned $FL_{Address}$ and confirm the $\#_{Link}$ provided. N_Del will post updates to N_Del's OL (288) for the asset for OL ID's 1, 2 & 3. | Validation Process and Tx Matching Control Process; Ownership Transfer Logic Summary | Validation and Matching Data fields unchanged, since Tx creation. |
| T11b1<br>T11b2<br>T11b3<br>T11b4 | N_Rec (289) will receive, validate and match N_Del's Contra Tx and post the Tx details to N_Rec's copy of N_Del's FL (H) at the assigned $FL_{Address}$ and confirm the $\#_{Link}$ provided. N_Rec will post updates to N_Rec's OL (292) for the asset for OL ID's 1, 2 & 3. | Validation Process and Tx Matching Control Process; Ownership Transfer Logic Summary | Validation and Matching Data fields unchanged, since Tx creation. |
| T12a1<br>T12a2<br>T12a3<br>T12a4<br>T12a5 | All N_Ind (293) nodes will receive, validate and match N_Rec's Contra Tx and post the Tx details to N_Ind's copy of N_Rec's FL (295) at the assigned $FL_{Address}$ and confirm the | Validation Process and Tx Matching Control Process; | Validation and Matching Data fields unchanged, since Tx |

TABLE 11-continued

Asset Transfer Workflow

| Ref | Transfer Process Steps | Business and Process Logic | Control Factor |
|---|---|---|---|
| T12a6 | $\#_{Link}$ provided. All N_Ind nodes will receive, validate and match N_Del's Contra Tx and post the Tx details to N_Ind's copy of N_Del's FL (294) at the assigned $FL_{Address}$ and confirm the $\#_{Link}$ provided. N_Ind will post updates to N_Ind's OL (296) for the asset for OL ID's 1, 2 & 3. | Ownership Transfer Logic Summary | creation. |

Pledge

Figures 31, 31A, 31B:
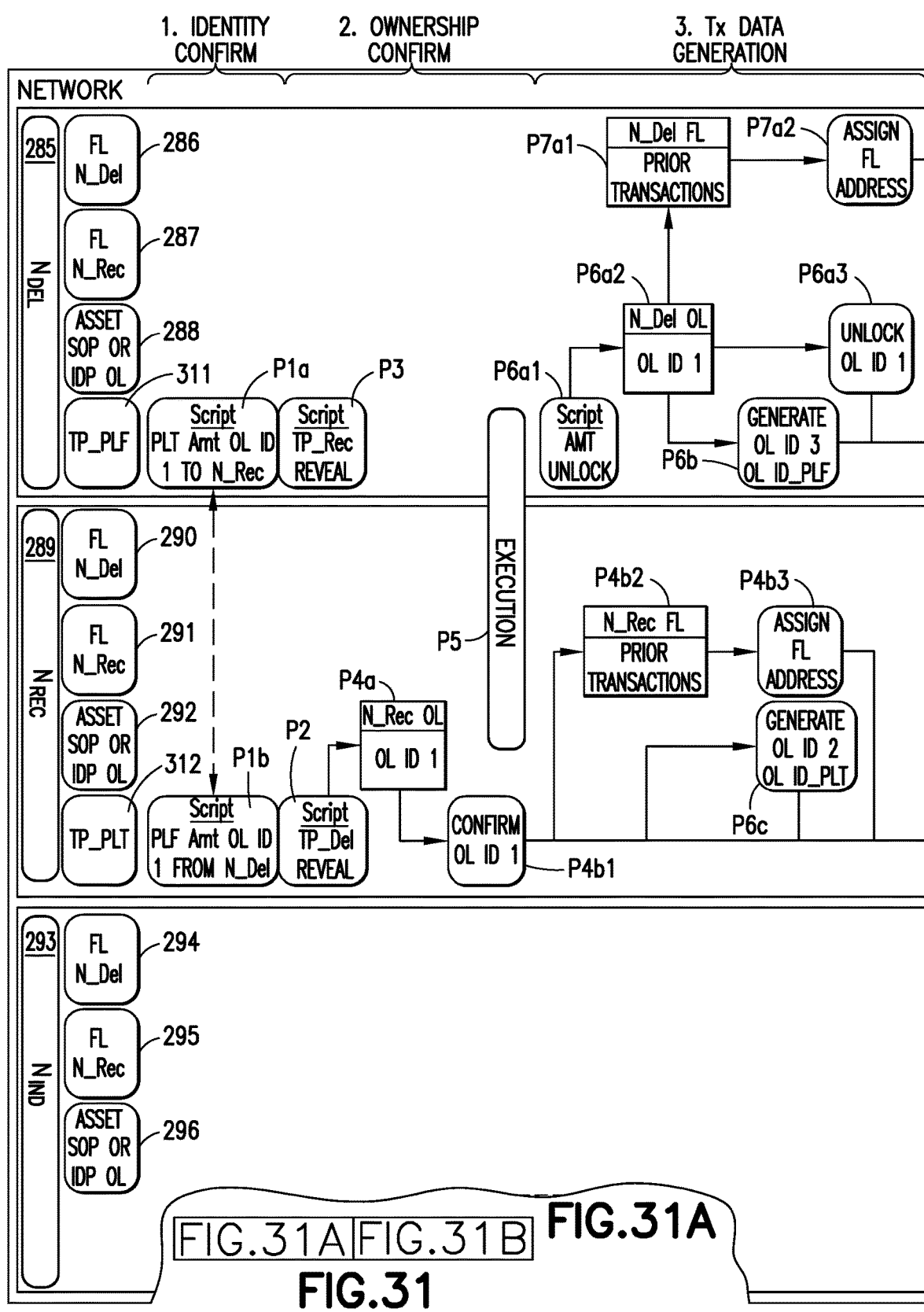
FIG. 31 is a legend showing how respective portions of a schematic hereinafter described as FIG. 31A and FIG. 31B are intended to be viewed to form one complete view of the schematic.
FIG. 31A and FIG. 31B are respective portions of a schematic illustrating an asset pledge workflow in a network comprising one node that creates the delivery contra-transaction, another node that creates the receipt contra-transaction and an independent node that records the transaction and balances in accordance with one embodiment.
Figure 31B:
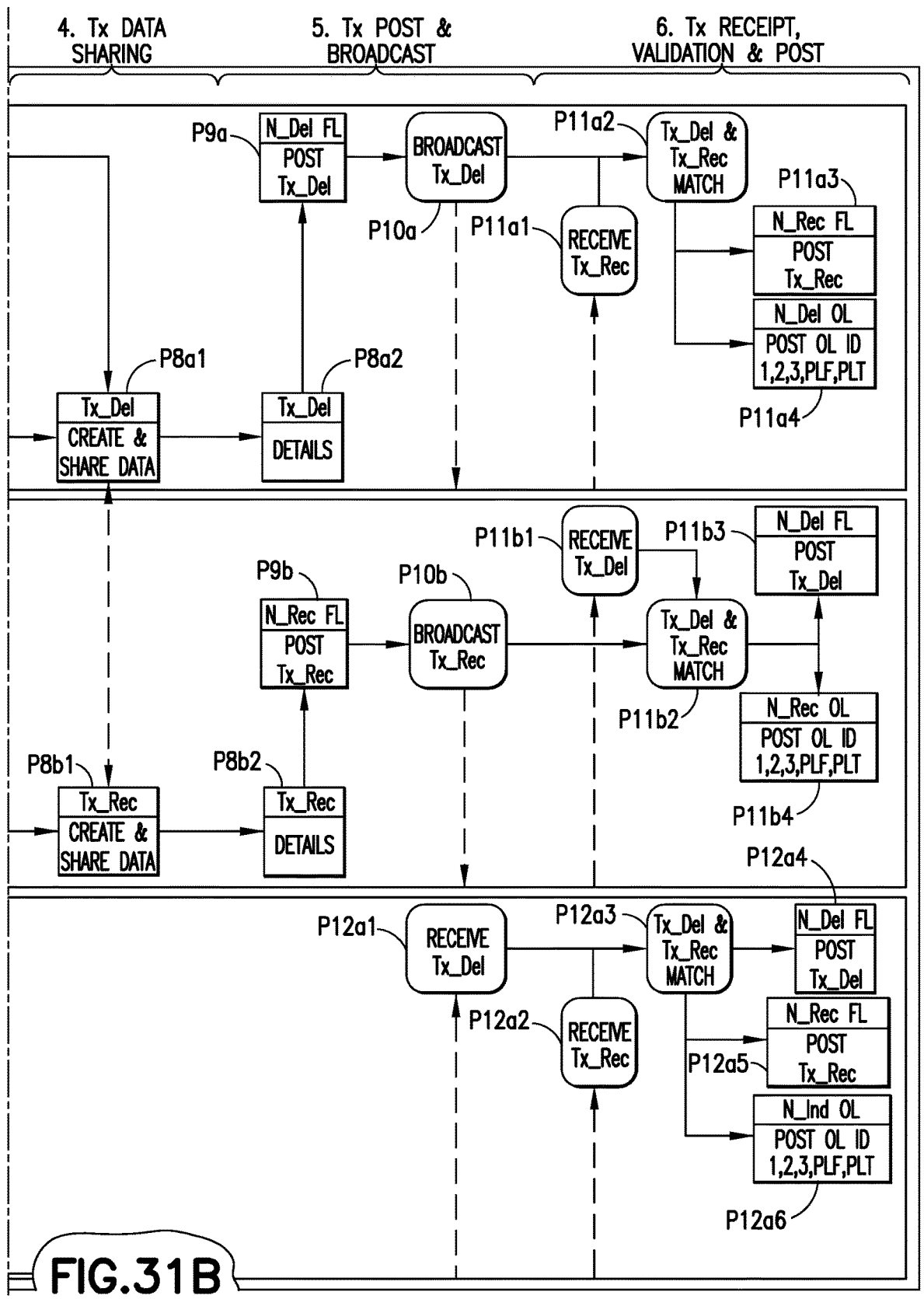

FIG. 31 is a schematic illustrating asset pledge workflow in a network comprising one node that creates the delivery contra-transaction, another node that creates the receipt contra-transaction and an independent node that records the transaction and balances in accordance with one embodiment. The respective pledge process steps shown in FIG. 31 and their associated logic and control factors are listed in Table 12.

TABLE 12

Pledge Transfer Workflow

| Ref | Pledge Process Steps | Business and Process Logic | Control Factor |
|---|---|---|---|
| P1a P1b | TP_PLF (311) & TP_PLT (312) agree to Transact a Pledge with each other via Blockchain Network | N/A | N/A |
| P2 | TP_PLF (311) will reveal its identity to TP_PLT (312) and TP_PLT (312) will confirm ownership of OL ID 1 | pk & Unique ID relationship; Published pk | pk |
| P3 | TP_PLF (311) will identify TP_PLT (312) by its pk | Published pk | pk |
| P4a P4b1 | TP_PLT (312) will be able to confirm from its N_Rec's (289) records that TP_PLF (311) has the value referenced in the SOP OL or IDP OL (F) | SOP OL & IDP OL Ownership Confirmation Process | Linked, published and validated Tx's on FL & OL |
| P5 | TP_PLF (311) & TP_PLT (312) will execute Tx at some location (Probably outside network) | Execution process (O/side Rqmts) | N/A |
| P6a1 P6a2 P6a3 | TP_PLF (311) will unlock OL ID1 | pk, Unique ID and Encumbrance Relationship | pk and defined encumbrance methodology |
| P6b | TP_PLF (311) will generate OL ID 3 for Net Amount to be retained by TP_PLF (311) and OL ID_PLF (F) to reflect the Pledged commitment to TP_PLT (312) | pk, Unique ID and Encumbrance Relationship | pk and defined OL ID methodology |
| P6c | TP_PLT (312) will generate OL ID 2 for Amount to be pledged to TP_PLT (312) and OL ID_PLT (J) to reflect the pledge return obligation | pk, Unique ID and Encumbrance Relationship | pk and defined OL ID methodology |
| P7a1 P7a2 | N_Del (285) & N_Rec (289) will identify next sequential $FL_{Address}$ for the FL's | Algorithmic FL address assignment | FL Address Sequencing |
| P8a1 P8a2 P8b1 P8b2 | N_Del (285) & N_Rec (289) will create and share Tx data elements | Approved, defined Tx Script | Initially by script affirmation of Tx Details. Ultimately by Contra Tx match. |
| P9a P9b | N_Del (285) & N_Rec (289) will post the Tx's to their own FL's (D & I) (generating the Hash Linked record). | FL Self Defining and Self-Validating Process | $FL_{Address}$ and $\#_{Link}$ |

TABLE 12-continued

Pledge Transfer Workflow

| Ref | Pledge Process Steps | Business and Process Logic | Control Factor |
|---|---|---|---|
| P10a P10b | N_Del (285) & N_Rec (289) will broadcast the Contra Tx's, FL Addresses and Hash Links to the Network | Network Tx broadcasting protocols | Network Tx Send/Receive Controls |
| P11a1 P11a2 P11a3 P11a4 | N_Del (285) will receive, validate and match N_Rec's (289) Contra Tx and post the Tx details to N_Del's (285) copy of N_Rec's FL (287) at the assigned $FL_{Address}$ and confirm the $\#_{Link}$ provided. N_Del will post updates to N_Del's OL (288) for the asset for OL ID's 1, 2, 3, PLF & PLT. | Validation Process and Tx Matching Control Process; Ownership Transfer Logic Summary | Validation and Matching Data fields unchanged, since Tx creation. |
| P11b1 P11b2 P11b3 P11b4 | N_Rec (289) will receive, validate and match N_Del's (285) Contra Tx and post the Tx details to N_Rec's (287) copy of N_Del's FL (H) at the assigned $FL_{Address}$ and confirm the $\#_{Link}$ provided. N_Rec (289) will post updates to N_Rec's (289) OL for the asset for OL ID's 1, 2, 3, PLF & PLT. | Validation Process and Tx Matching Control Process; Ownership Transfer Logic Summary | Validation and Matching Data fields unchanged, since Tx creation. |
| P12b1 P12b2 P12b3 P12b4 P12b5 P12b6 | All N_Ind (293) nodes will receive, validate and match N_Rec's (289) Contra Tx and post the Tx details to N_Ind's (293) copy of N_Rec's FL (295) at the assigned $FL_{Address}$ and confirm the $\#_{Link}$ provided. All N_Ind (293) nodes will receive, validate and match N_Del's (285) Contra Tx and post the Tx details to N_Ind's (293) copy of N_Del's FL (294) at the assigned $FL_{Address}$ and confirm the $\#_{Link}$ provided. N_Ind (293) will post updates to N_Ind's OL (296) for the asset for OL ID's 1, 2, 3, PLF & PLT. | Validation Process and Tx Matching Control Process; Ownership Transfer Logic Summary | Validation and Matching Data fields unchanged, since Tx creation. |

Loan

Figure 32B:
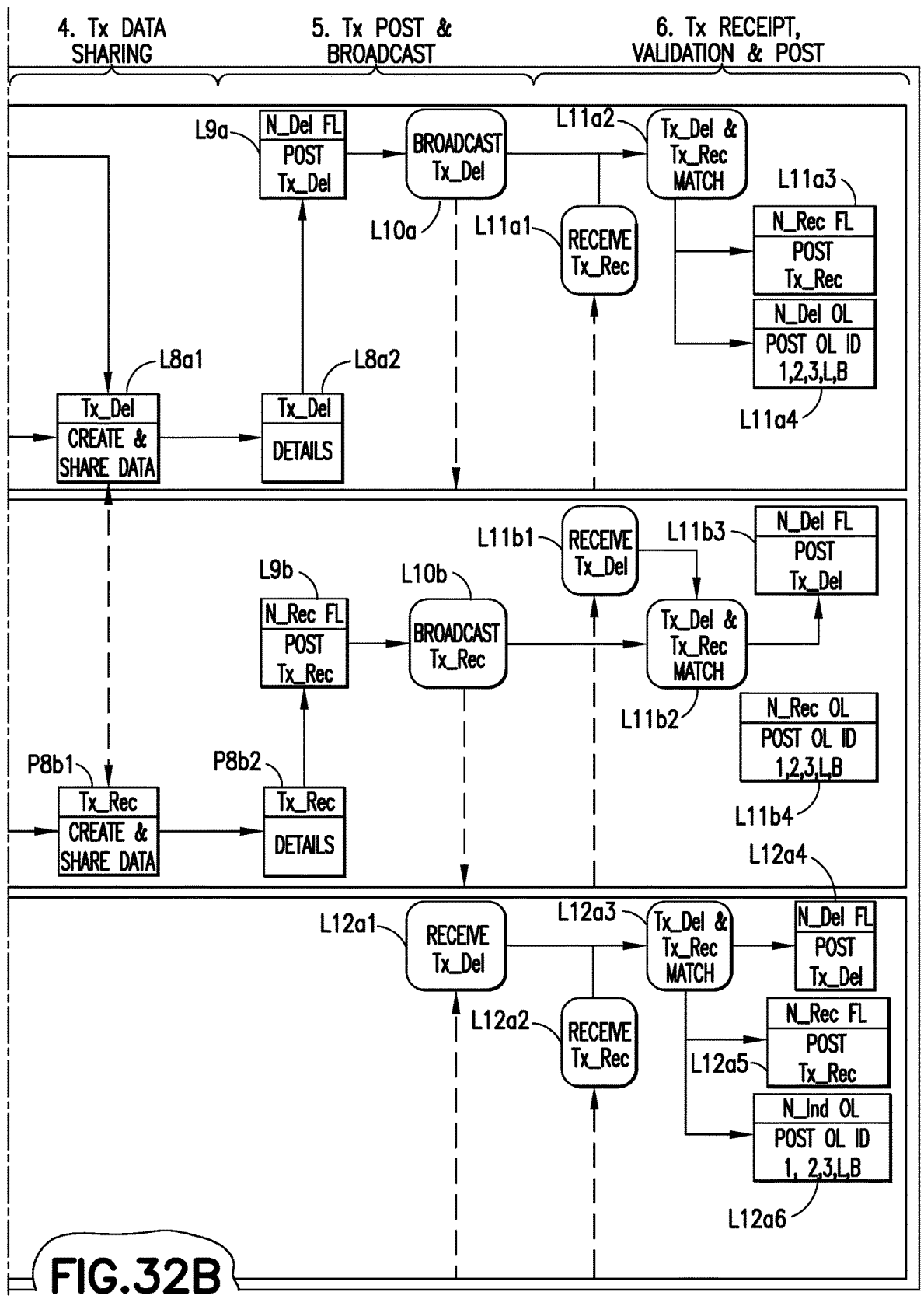

FIG. 32 is a schematic illustrating loan process workflow in a network comprising one node that creates the delivery contra-transaction, another node that creates the receipt contra-transaction and an independent node that records the transaction and balances in accordance with one embodiment. The respective loan process steps shown in FIG. 32 and their associated logic and control factors are listed in Table 13.

TABLE 13

Loan Process Workflow

| Ref | Loan Process Steps | Business and Process Logic | Control Factor |
|---|---|---|---|
| L1a L1b | TP_L (323) & TP_B (324) agree to Transact a Pledge with each other via Blockchain Network | N/A | N/A |
| L2 | TP_L (323) will reveal its identity to TP_B (324) and TP_B (K) will confirm ownership of OL ID 1 | pk & Unique ID relationship; Published pk | pk |
| L3 | TP_L (323) will identify TP_B (324) by its pk | Published pk | pk |
| L4a L4b1 | TP_B (K) will be able to confirm from its N_Rec's records that TP_L (323) has the value referenced in the SOP OL or IDP OL | SOP OL & IDP OL Ownership Confirmation Process | Linked, published and validated Tx's on FL & OL |
| L5 | TP_L (323) & TP_B (324) will execute Tx at some location (Probably outside network) | Execution process (O/side Rqmts) | N/A |

TABLE 13-continued

Loan Process Workflow

| Ref | Loan Process Steps | Business and Process Logic | Control Factor |
|---|---|---|---|
| L6a1 | TP_L (323) will unlock OL ID1 | pk, Unique ID and Encumbrance Relationship | pk and defined encumbrance methodology |
| L6a2 | | | |
| L6a3 | | | |
| L6b | TP_L (323) will generate OL ID 3 for Net Amount to be retained by TP_L (323) and OL ID_L to reflect the Loan made to TP_B (324) | pk, Unique ID and Encumbrance Relationship | pk and defined OL ID methodology |
| L6c | TP_B (324) will generate OL ID 2 for Amount to be loaned to TP_B (324) and OL ID B to reflect the Borrow from TP_L (323) | pk, Unique ID and Encumbrance Relationship | pk and defined OL ID methodology |
| L7a1 | N_Del (285) & N_Rec (289) will identify next sequential $FL_{Address}$ for the FL's | Algorithmic FL address assignment | FL Address Sequencing |
| L7a2 | | | |
| L8a1 | N_Del (285) & N_Rec (289) will create and share Tx data elements | Approved, defined Tx Script | Initially by script affirmation of Tx Details. Ultimately by Contra Tx match. |
| L8a2 | | | |
| L8b1 | | | |
| L8b2 | | | |
| L9a | N_Del (285) & N_Rec (289) will post the Tx's to their own FL (D & I) (generating the Hash Linked record). | FL Self Defining and Self-Validating Process | $FL_{Address}$ and $\#_{Link}$ |
| L9b | | | |
| L10a | N_Del (285) & N_Rec (289) will broadcast the Contra Tx's, FL Addresses and Hash Links to the Network | Network Tx broadcasting protocols | Network Tx Send/Receive Controls |
| L10b | | | |
| L11a1 | N_Del (285) will receive, validate and match N_Rec's (289) Contra Tx and post the Tx details to N_Del's (285) copy of N_Rec's FL (287) at the assigned $FL_{Address}$ and confirm the $\#_{Link}$ provided. N_Del (285) will post updates to N_Del's OL (288) for the asset for OL ID's 1, 2, 3, B & L. | Validation Process and Tx Matching Control Process; Ownership Transfer Logic Summary | Validation and Matching Data fields unchanged, since Tx creation. |
| L11a2 | | | |
| L11a3 | | | |
| L11a4 | | | |
| L11b1 | N_Rec (289) will receive, validate and match N_Del's (285) Contra Tx and post the Tx details to N_Rec's (289) copy of N_Del's FL (290) at the assigned $FL_{Address}$ and confirm the $\#_{Link}$ provided. N_Rec (289) will post updates to N_Rec's OL (292) for the asset for OL ID's 1, 2, 3, B & L. | Validation Process and Tx Matching Control Process; Ownership Transfer Logic Summary | Validation and Matching Data fields unchanged, since Tx creation. |
| L11b2 | | | |
| L11b3 | | | |
| L11b4 | | | |
| L12b1 | All N_Ind nodes will receive, validate and match N_Rec's Contra Tx and post the Tx details to N_Ind's copy of N_Rec's FL at the assigned $FL_{Address}$ and confirm the $\#_{Link}$ provided. All N_Ind nodes will receive, validate and match N_Del's Contra Tx and post the Tx details to N_Ind's copy of N_Del's FL at the assigned $FL_{Address}$ and confirm the $\#_{Link}$ provided. N_Ind will post updates to N_Ind's OL for the asset for OL ID's 1, 2, 3, Borrow & Loan. | Validation Process and Tx Matching Control Process; Ownership Transfer Logic Summary | Validation and Matching Data fields unchanged, since Tx creation. |
| L12b2 | | | |
| L12b3 | | | |
| L12b4 | | | |
| L12b5 | | | |
| L12b6 | | | |

Contingent Transfer

Figures 33, 33A:
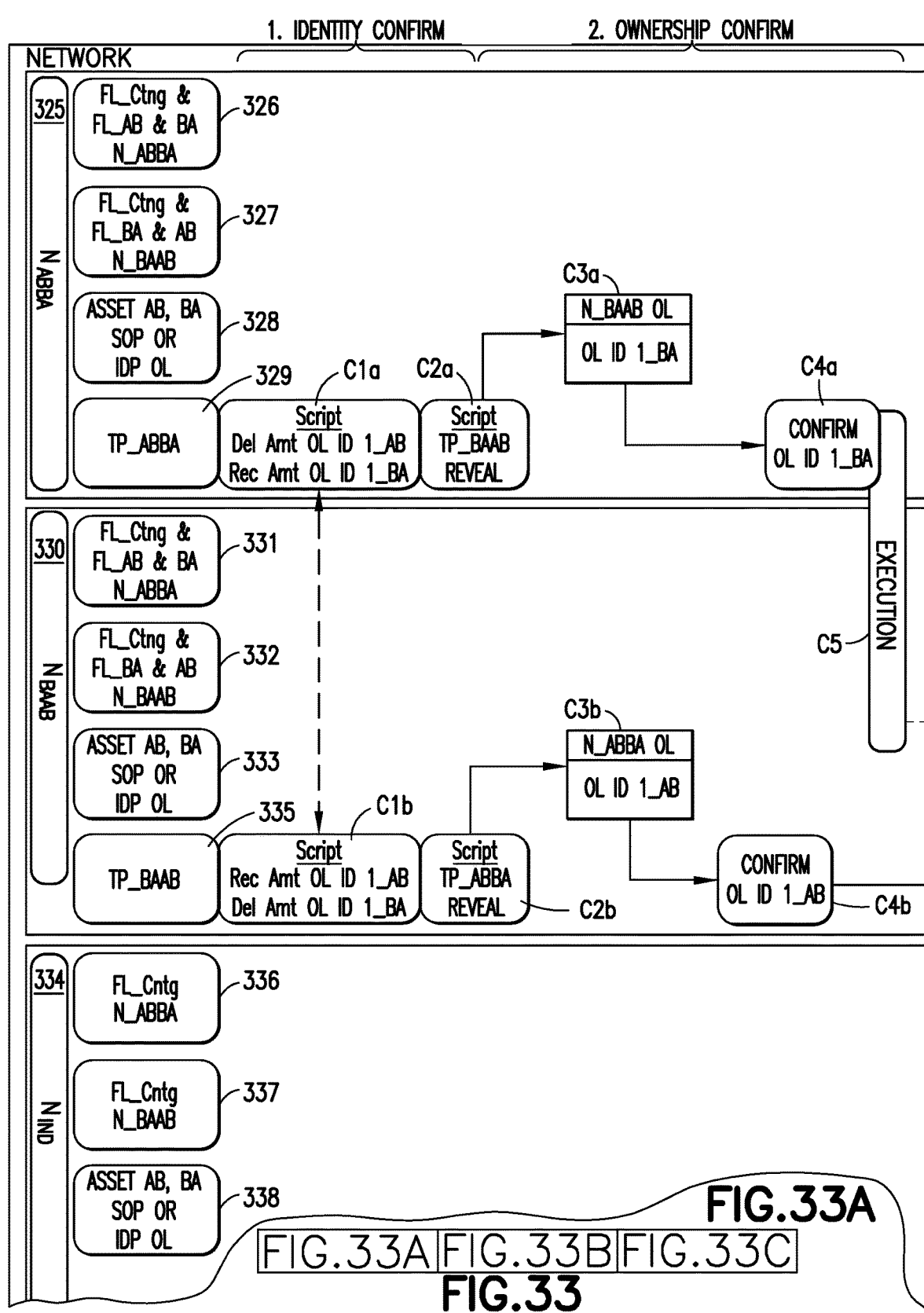
FIG. 33 is a legend showing how respective portions of a schematic hereinafter described as FIG. 33A, FIG. 33B, and FIG. 33C are intended to be viewed to form one complete view of the schematic.
FIG. 33A, FIG. 33B, and FIG. 33C are respective portions of a schematic illustrating a contingent transfer workflow in a network comprising one node that creates the delivery contra-transaction, another node that creates the receipt contra-transaction and an independent node that records the transaction and balances in accordance with one embodiment.
Figure 33B:
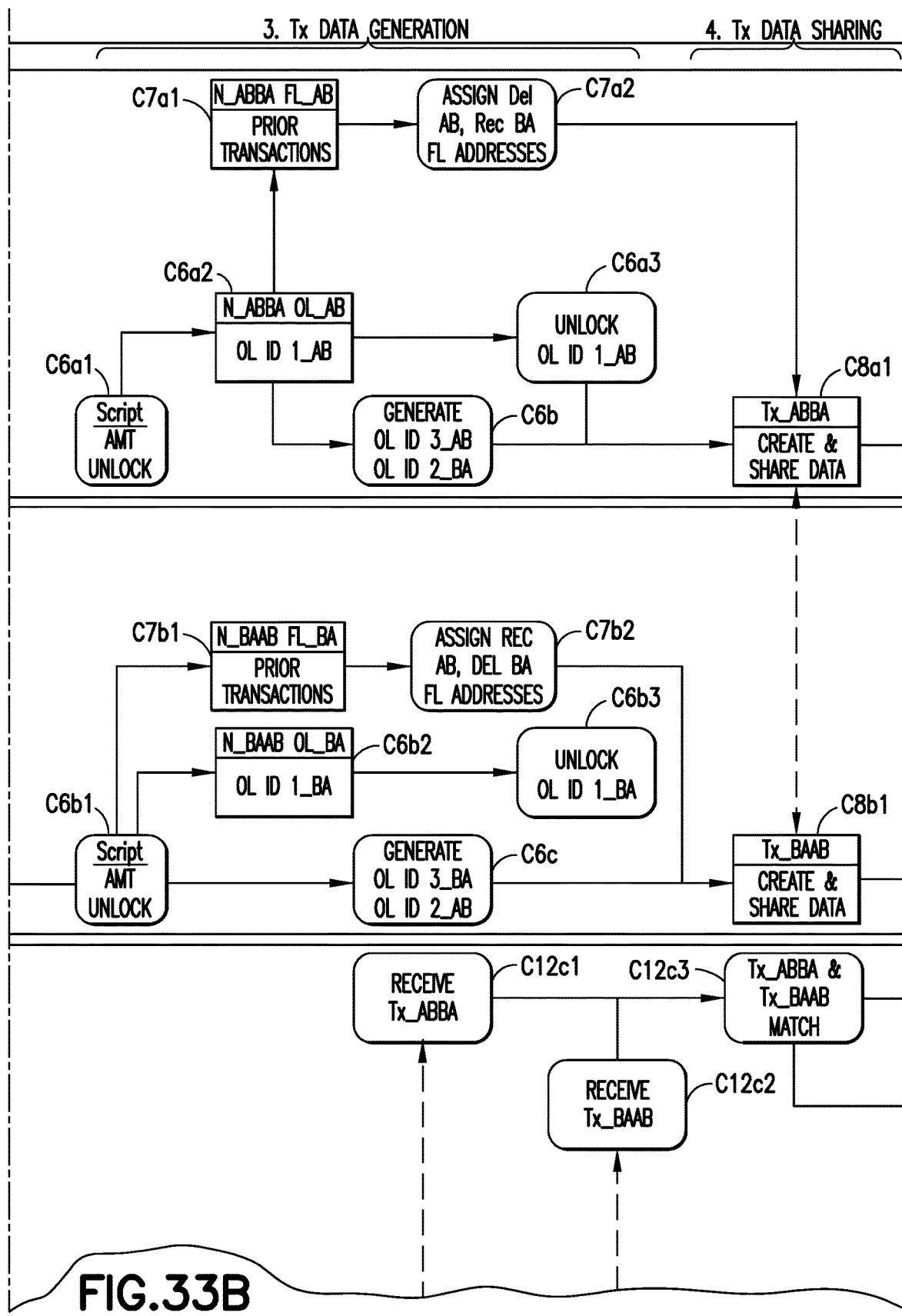
Figure 33C:
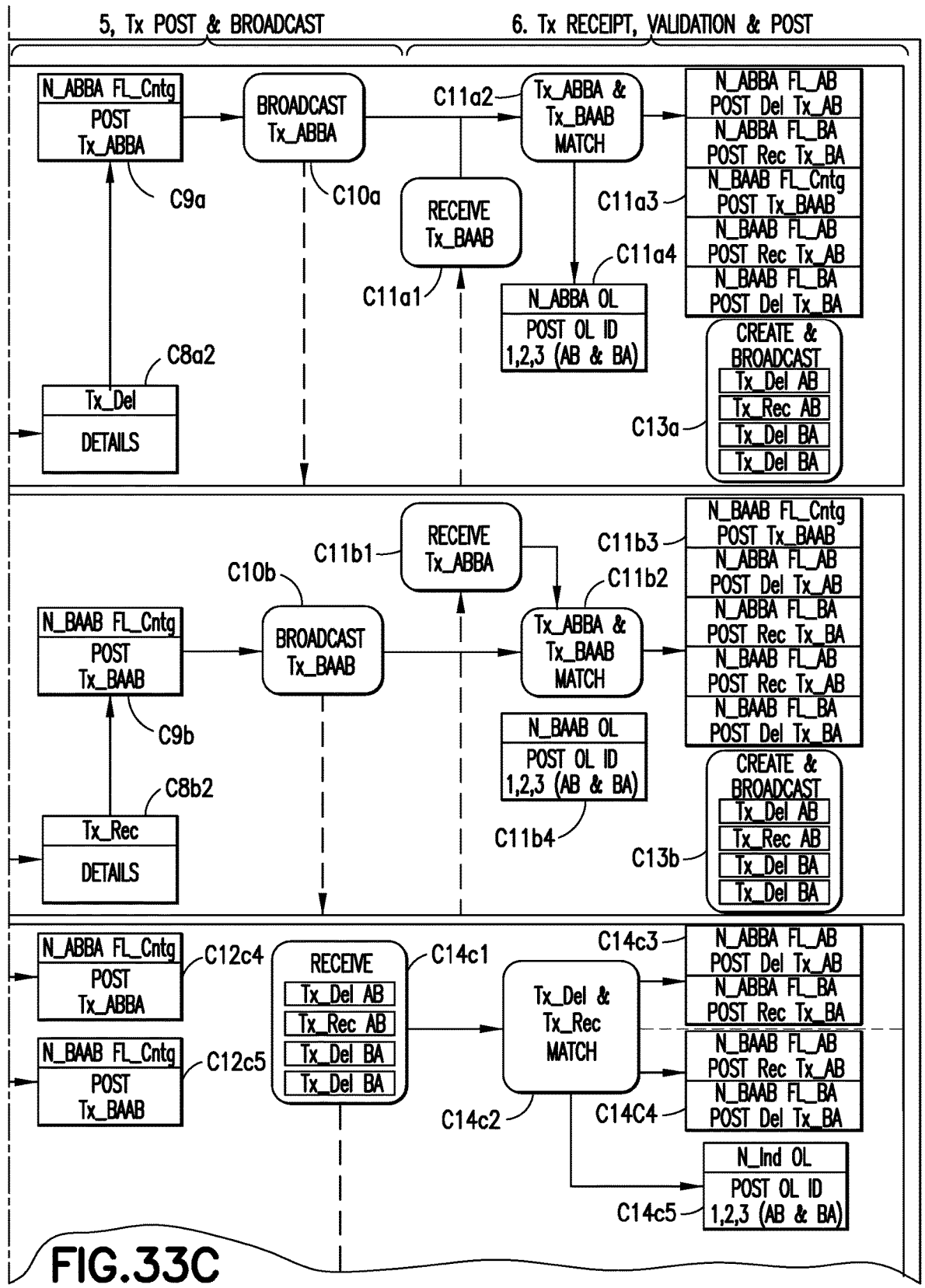

FIG. 33 is a schematic illustrating contingent transfer workflow in a network comprising one node that creates the delivery contra-transaction, another node that creates the receipt contra-transaction and an independent node that records the transaction and balances in accordance with one embodiment. For FIG. 33 and the other similar, transfer FIGS. 36 and 37 the following are consistent elements:

The Nodes are represented as N_ABBA (325), N_BAAB (330) and N_Ind (334). N_ABBA has its contingent transfer transaction log (326), ownership logs for assets AB and BA (328) and recreated copies of N_BAAB's contingent transfer transaction log (327). N_ABBA's transacting party generates the TP_ABBA (329). N_BAAB has its contingent transfer transaction log (332), ownership logs for assets AB and BA (333) and recreated copies of N_ABBA's contingent transfer transaction log (331). N_BAAB's transacting party generates the TP_BAAB (335). N_Ind has its ownership logs for assets AB and BA (338) and recreated copies of N_ABBA's transaction log (336) and N_BAAB's transaction log (337).

The respective contingent transfer process steps shown in FIG. 33 and their associated logic and control factors are listed in Table 14.

TABLE 14

Contingent Transfer Workflow

| Ref | Contingent Transfer Process Steps | Business and Process Logic | Control Factor |
|---|---|---|---|
| C1a<br>C1b | TP_ABBA (329) & TP_BAAB (335) agree to Transact a Contingent Transfer with each other via Blockchain Network | N/A | N/A |
| C2a<br>C3a | TP_ABBA (329) will reveal its identity to TP_BAAB (335) and TP_BAAB (335) will confirm ownership of OL ID AB | pk & Unique ID relationship; Published pk | pk |
| C2b<br>C3b | TP_BAAB (329) will reveal its identity to TP_ABBA (329) and TP_ABBA (329) will confirm ownership of OL ID BA | pk & Unique ID relationship; Published pk | pk |
| C4a | TP_ABBA (329) will be able to confirm from its N_ABBA's (325) records that TP_BAAB (335) has the value referenced in the SOP OL or IDP OL (F) as OL ID 1_BA | SOP OL & IDP OL Ownership Confirmation Process | Linked, published and validated Tx's on FL & OL |
| C4b | TP_BAAB (335) will be able to confirm from its N_BAAB's (330) records that TP_ABBA (329) has the value referenced in the SOP OL or IDP OL (J) as OL ID 1_AB | SOP OL & IDP OL Ownership Confirmation Process | Linked, published and validated Tx's on FL & OL |
| C5 | TP_ABBA (329) & TP_BAAB (335) will execute Tx at some location (Probably outside network) | Execution process (O/side Rqmts) | N/A |
| C6a1<br>C6a2<br>C6a3 | TP_ABBA (329) will unlock OL ID 1_AB | pk, Unique ID and Encumbrance Relationship | pk and defined encumbrance methodology |
| C6b1<br>C6b2<br>C6b3 | TP_BAAB (335) will unlock OL ID 1_BA | pk, Unique ID and Encumbrance Relationship | pk and defined encumbrance methodology |
| C6b | TP_ABBA (329) will generate OL ID 3_AB for Net Amount to be retained by TP_ABBA (329) and OL ID 2_BA to be transferred from TP_BAAB (335) | pk, Unique ID and Encumbrance Relationship | pk and defined OL ID methodology |
| C6c | TP_BAAB (335) will generate OL ID 3_BA for Net Amount to be retained by TP_BAAB (335) and OL ID 2_AB to be transferred from TP_ABBA (329) | pk, Unique ID and Encumbrance Relationship | pk and defined OL ID methodology |
| C7a1<br>C7a2 | N_ABBA (325) will identify next sequential $FL_{Address}$ for N_ABBA's (325) FL_Cntg (D) | Algorithmic FL address assignment | FL Address Sequencing |
| C7b1<br>C7b2 | N_BAAB (330) will identify next sequential $FL_{Address}$ for N_BAAB'a (330) FL_Ctng (I) | | |
| C8a1<br>C8a2 | N_ABBA (325) will create and share Tx_ABBA data elements | Approved, defined Tx Script | Initially by script affirmation of Tx Details. Ultimately by Contra Tx match. |
| C8b1<br>C8b2 | N_BAAB (330) will create and share Tx_BAAB data elements | Approved, defined Tx Script | Initially by script affirmation of Tx Details. Ultimately by Contra Tx match. |
| C9a | N_ABBA (325) will post the Tx_ABBA to N_ABBA's FL_Ctng (D) (generating the Hash Linked record). | FL Self Defining and Self-Validating Process | $FL_{Address}$ and $\#_{Link}$ |
| C9b | N_BAAB (330) will post the Tx_BAAB to N_BAAB's FL_Ctng (I) (generating the Hash Linked record). | FL Self Defining and Self-Validating Process | $FL_{Address}$ and $\#_{Link}$ |
| C10a<br>C10b | N_ABBA (325) & N_BAAB (330) will broadcast the Contra Tx's, FL Addresses and Hash Links to the Network | Network Tx broadcasting protocols | Network Tx Send/Receive Controls |

TABLE 14-continued

Contingent Transfer Workflow

| Ref | Contingent Transfer Process Steps | Business and Process Logic | Control Factor |
|---|---|---|---|
| C11a1<br>C11a2<br>C11a3<br>C11a4 | N_ABBA (325) will receive, validate and match N_BAAB's (330) Contra Tx and post the Tx details to N_ABBA's (325) copy of N_BAAB's FL_Ctng (327) at the assigned $FL_{Address}$ and confirm the $\#_{Link}$ provided. N_ABBA (325) will post Tx_Del details to N_ABBA's FL_AB (326)and Tx_Rec to N_ABBA's copy of N-BAAB's FL_AB (327) and will post Tx_Rec details to N_ABBA's FL_BA (326) and Tx_Del to N_ABBA's copy of N-BAAB's FL_BA (327). N_ABBA will post updates to N_ABBA's OL (328) for the Asset AB OL ID's 1_AB, 2_AB, 3_AB and Asset BA OL ID's 1_BA, 2_BA, #_BA | Validation Process and Tx Matching Control Process; Ownership Transfer Logic Summary | Validation and Matching Data fields unchanged, since Tx creation. |
| C11b1<br>C11b2<br>C11b3<br>C11b4 | N_BAAB (330) will receive, validate and match N_ABBA's (325) Contra Tx and post the Tx details to N_BAAB's (330) copy of N_ABBA's FL_Ctng (331) at the assigned $FL_{Address}$ and confirm the $\#_{Link}$ provided. N_BAAB (330) will post Tx_Rec details to N_BAAB's FL_AB (332) and Tx_Del to N_BAAB's copy of N-ABBA's FL_AB (331) and will post Tx_Del details to N_BAAB's FL_BA (332) and Tx_Rec to N_BAAB's copy of N-ABBA's FL_BA (331). N_BAAB will post updates to N_BAAB's OL (333) for the Asset AB OL ID's 1_AB, 2_AB, 3_AB and Asset BA OL ID's 1_BA, 2_BA, 3BA | Validation Process and Tx Matching Control Process; Ownership Transfer Logic Summary | Validation and Matching Data fields unchanged, since Tx creation. |
| C12c1<br>C12c2<br>C12c3<br>C12c4<br>C12c5 | All N_Ind (293) nodes will receive, validate and match N_BAAB's (330) Contra Tx_BAAB and post the Tx_BAAB details to N_Ind's copy of N_BAAB's FL_Ctng (M) at the assigned $FL_{Address}$ and confirm the $\#_{Link}$ provided.<br>All N_Ind (293) nodes will receive, validate and match N_ABBA's (325) Contra Tx_ABBA and post the Tx_ABBA details to N_Ind's copy of N_ABBAI's FL_Cntg (L) at the assigned $FL_{Address}$ and confirm the $\#_{Link}$ provided. | Validation Process and Tx Matching Control Process; Ownership Transfer Logic Summary | Validation and Matching Data fields unchanged, since Tx creation. |
| C13a<br>C13b | N_ABBA (325) and N_BAAB (330) will independently create and broadcast N_ABBA-Tx_Del_AB, N_BAAB-Tx_Rec_AB, N_BAAB-Tx_Del_BA, N_ABBA-Tx_Rec_BA | Validation Process and Tx Matching Control Process; Ownership Transfer Logic Summary | Validation and Matching Data fields unchanged, since Tx creation. |
| C14c1<br>C14c2<br>C14c3<br>C14c4<br>C14c5 | All N_Ind (293) Nodes will receive, validate and match Tx_Del_AB, N_BAAB-Tx_Rec_AB, N_BAAB-Tx_Del_BA, N_ABBA-Tx_Rec_BA. N_Ind (293) will post Tx_Del details to N_Ind's copy of N_ABBA's FL_AB (Y1) and Tx_Rec to N_Ind's copy of N-BAAB's FL_AB (Z1) and will post Tx_Del details to N_Ind's copy of N_BAAB's FL_BA (Z2) and Tx_Rec to N_Ind's copy of N-ABBA's FL_BA (Y2). N_Ind (293) will post updates to N_Ind's OL (N) for the Asset AB OL ID's 1_AB, 2_AB, 3_AB and Asset BA OL ID's 1_BA, 2_BA, 3BA | Validation Process and Tx Matching Control Process; Ownership Transfer Logic Summary | Validation and Matching Data fields unchanged, since Tx creation. |

Short Transfer

Figure 34A:
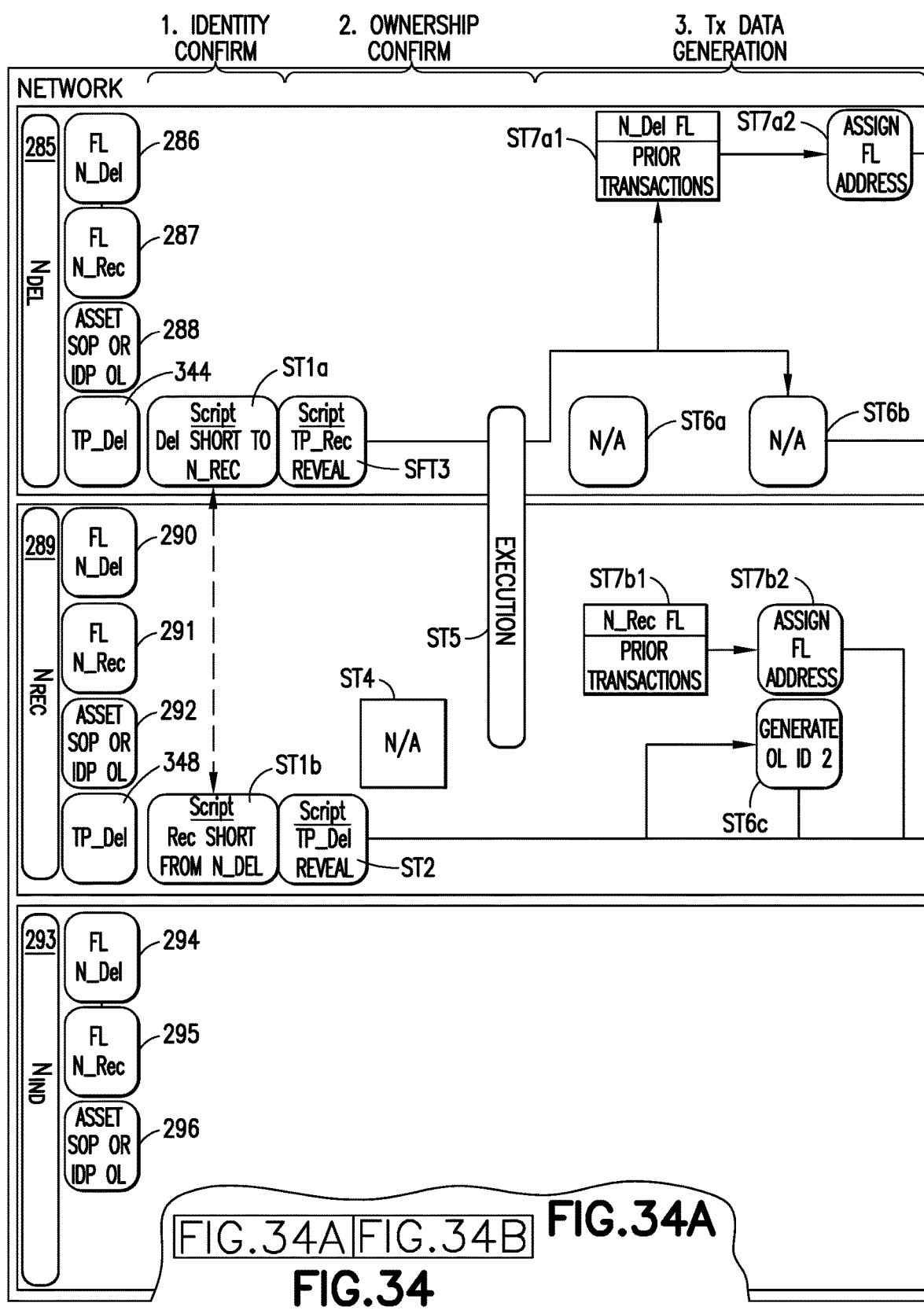
FIG. 34A and FIG. 34B are respective portions of a schematic illustrating a short transfer workflow in a network comprising one node that creates the delivery contra-transaction, another node that creates the receipt contra-transaction and an independent node that records the transaction and balances in accordance with one embodiment.
Figure 34B:
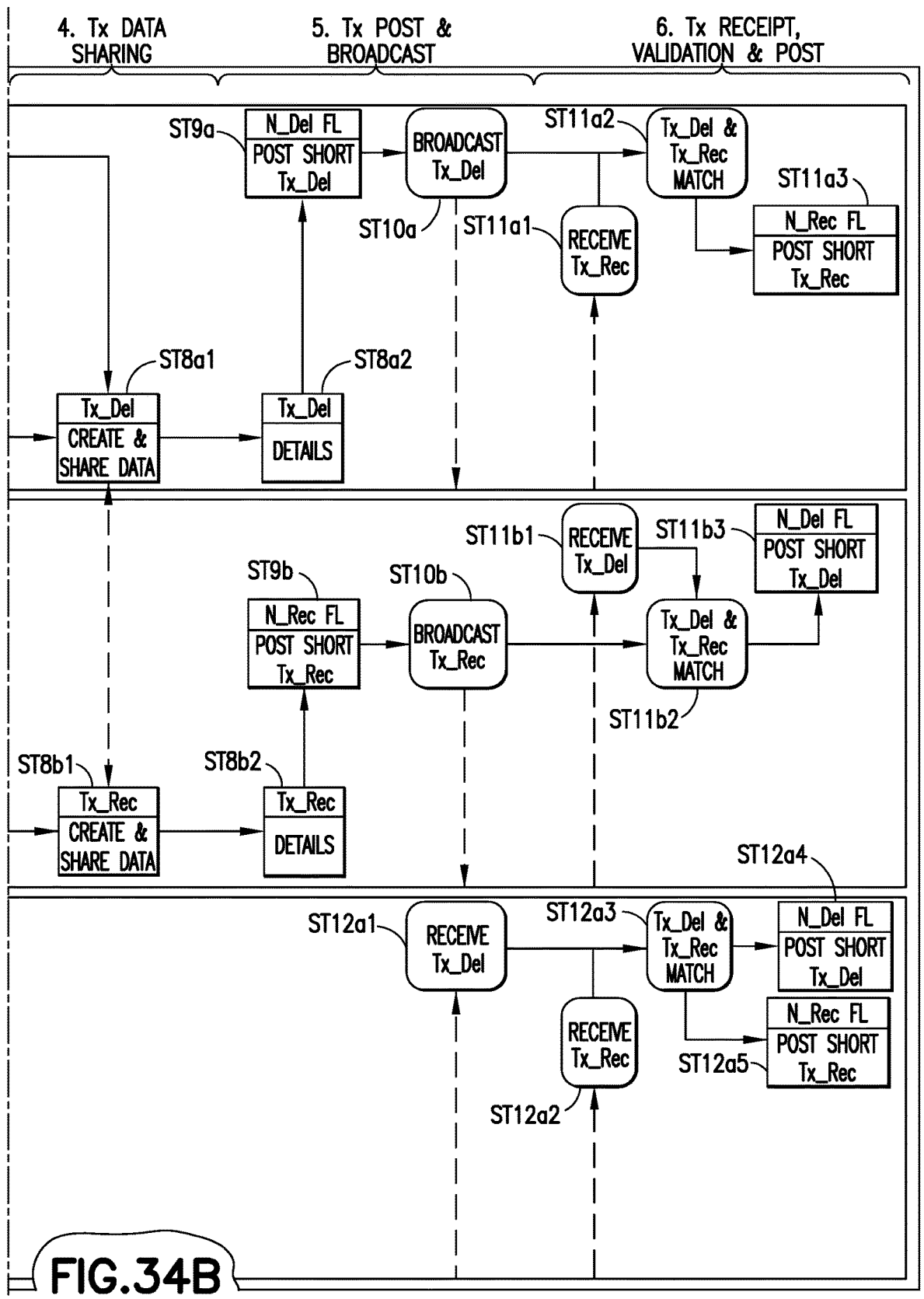

FIG. 34 is a schematic illustrating short transfer workflow in a network comprising one node that creates the delivery contra-transaction, another node that creates the receipt contra-transaction and an independent node that records the transaction and balances in accordance with one embodiment. The respective short transfer process steps shown in FIG. 34 and their associated logic and control factors are listed in Table 15.

TABLE 15

Short Transfer Workflow

| Ref | Short Transfer Process Steps | Business and Process Logic | Control Factor |
|---|---|---|---|
| ST1a<br>ST1b | TP_Del & TP_Rec agree to Transact with each other via Blockchain Network, however, TP_Del does not have the value to transfer. The value may be specified or unspecified, variable dependent and Future-Dated. | N/A | N/A |
| ST2 | TP_Rec will identify TP Del by it pk | Published pk | pk |
| ST3 | TP_Del (344) will identify TP_Rec (348) by its pk | Published pk | pk |
| ST4 | N/A | SOP OL & IDP OL Ownership Confirmation Process | Linked, published and validated Tx's on FL & OL |
| ST5 | TP_Del (344) & TP_Rec (348) will execute Tx at some location (Probably outside network) | Execution process (O/side Rqmts) | N/A |
| ST6a | N/A | pk, Unique ID and Encumbrance Relationship | pk and defined encumbrance methodology |
| ST6b | N/A | pk, Unique ID and Encumbrance Relationship | pk and defined OL ID methodology |
| ST6c | TP_Rec (348) will generate OL ID 2 for Amount (Unspecified, Variable-Dependent or Future-Dated) to be transferred from TP_Del (344) | pk, Unique ID and Encumbrance Relationship | pk and defined OL ID methodology |
| ST7a1<br>ST7a2<br>ST7b1<br>ST7b2 | N_Del (285) & N_Rec (289) will identify next sequential $FL_{Address}$ for the FL's | Algorithmic FL address assignment | FL Address Sequencing |
| ST8a1<br>ST8a2<br>ST8b1<br>ST8b2 | N_Del (285) & N_Rec (289) will create and share Tx data elements | Approved, defined Tx Script | Initially by script affirmation of Tx Details. Ultimately by Contra Tx match. |
| ST9a<br>ST9b | N_Del (285) will post the Tx to N-Del FL (D) & N_Rec (289) will post the Tx to N-Recl FL (I) (generating the Hash Linked records) | FL Self Defining and Self-Validating Process | $FL_{Address}$ and $\#_{Link}$ |
| ST10a<br>ST10b | N_Del (285) & N_Rec (289) will broadcast the Short Contra Tx's, FL Addresses and Hash Links to the Network | Network Tx broadcasting protocols | Network Tx Send/Receive Controls |
| ST11a1<br>ST11a2<br>ST11a3 | N_Del (285) will receive, validate and match N_Rec's (289) Contra Tx and post the Tx details to N_Del's copy of N_Rec's FL (E) at the assigned $FL_{Address}$ and confirm the $\#_{Link}$ provided. | Validation Process and Tx Matching Control Process; Ownership Transfer Logic Summary | Validation and Matching Data fields unchanged, since Tx creation. |
| ST11b1<br>ST11b2<br>ST11b3 | N_Rec (289) will receive, validate and match N_Del's (285) Contra Tx and post the Tx details to N_Rec's copy of N_Del's FL (H) at the assigned $FL_{Address}$ and confirm the $\#_{Link}$ provided. | Validation Process and Tx Matching Control Process; Ownership Transfer Logic Summary | Validation and Matching Data fields unchanged, since Tx creation. |

TABLE 15-continued

Short Transfer Workflow

| Ref | Short Transfer Process Steps | Business and Process Logic | Control Factor |
|---|---|---|---|
| ST12a1 ST12a2 ST12a3 ST12a4 ST12a5 | All N__Ind (293) nodes will receive, validate and match N__Rec's (289) Contra Tx and post the Tx details to N__Ind's copy of N__Rec's FL (295) at the assigned $FL_{Address}$ and confirm the $\#_{Link}$ provided. All N__Ind (293) nodes will receive, validate and match N__Del's (285) Contra Tx and post the Tx details to N__Ind's copy of N__Del's FL (294) at the assigned $FL_{Address}$ and confirm the $\#_{Link}$ provided. | Validation Process and Tx Matching Control Process; Ownership Transfer Logic Summary | Validation and Matching Data fields unchanged, since Tx creation. |

Short Transfer Fill

Figures 35, 35A, 35B:
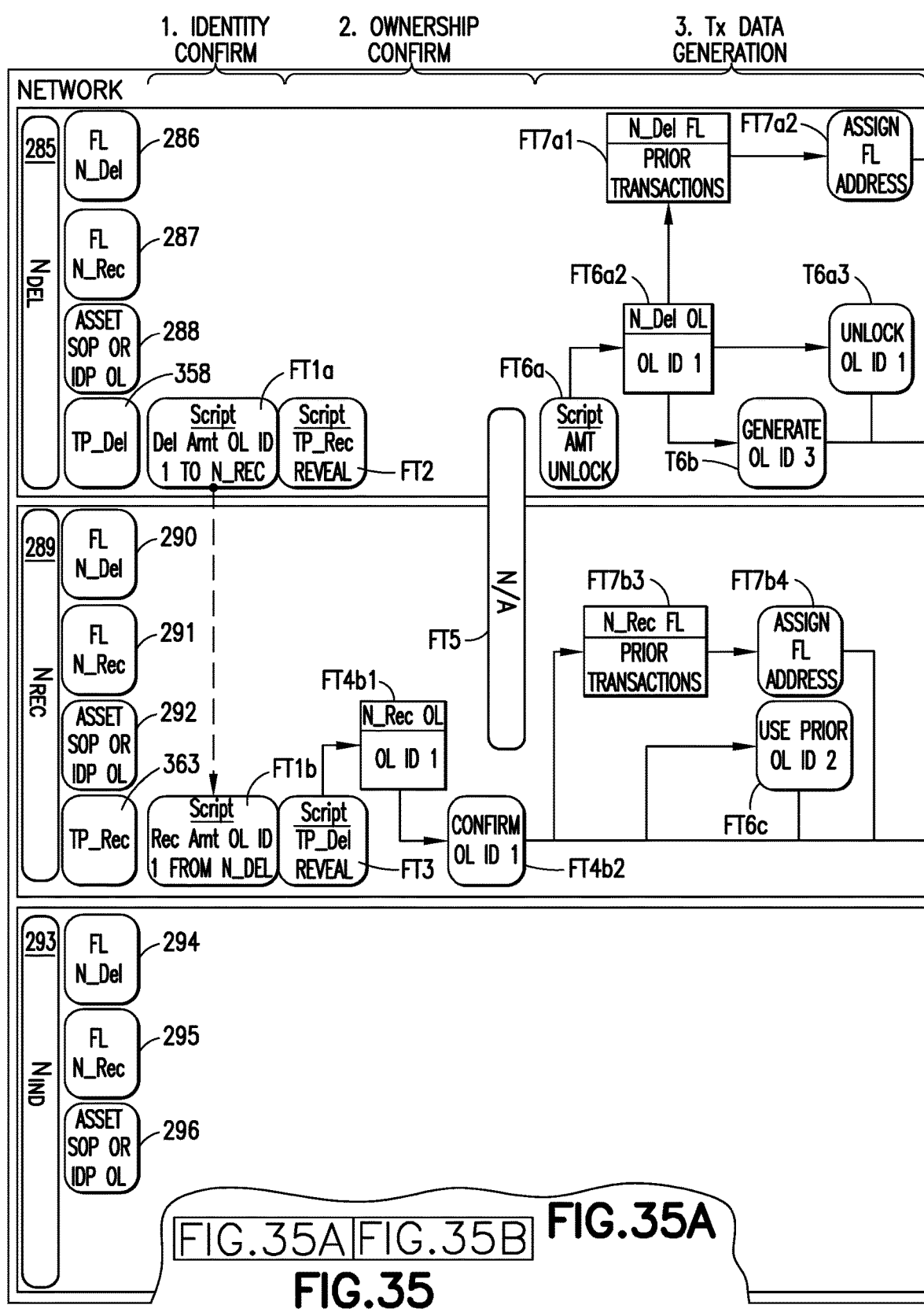
FIG. 35 is a legend showing how respective portions of a schematic hereinafter described as FIG. 35A and FIG. 35B are intended to be viewed to form one complete view of the schematic.
FIG. 35A and FIG. 35B are respective portions of a schematic illustrating a short fill workflow in a network comprising one node that creates the delivery contra-transaction, another node that creates the receipt contra-transaction and an independent node that records the transaction and balances in accordance with one embodiment.
Figure 35B:
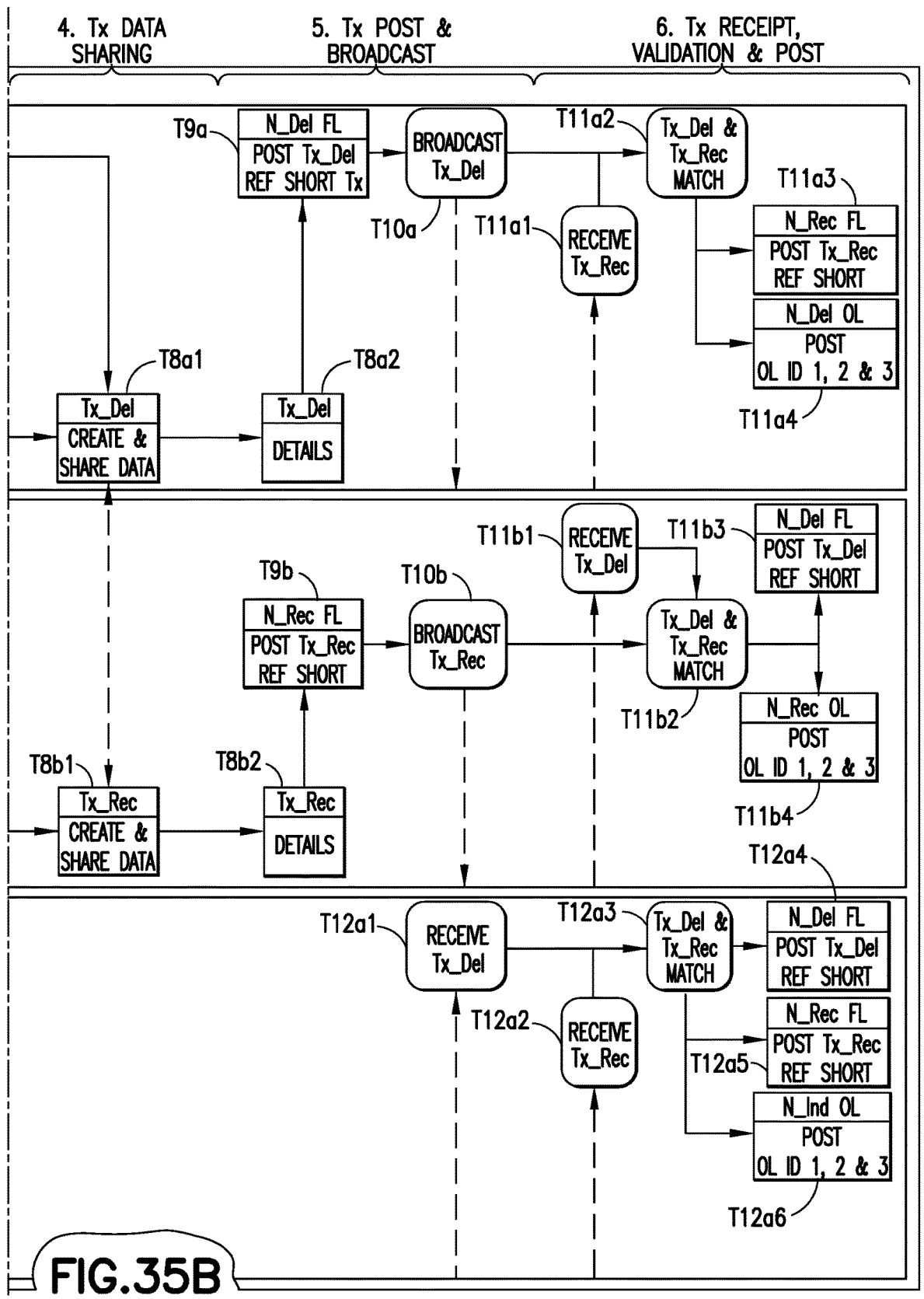

FIG. 35 is a schematic illustrating short transfer fill workflow in a network comprising one node that creates the delivery contra-transaction, another node that creates the receipt contra-transaction and an independent node that records the transaction and balances in accordance with one embodiment. The respective short transfer fill process steps shown in FIG. 35 and their associated logic and control factors are listed in Table 16.

Assume TP_AB that was short in the previous transaction is now filled by TP_AB. With a short fill, a transfer creating OL ID 1 referencing the "short" FL_Address and 2 and generated OL ID 3 (if necessary), of the short position to be transferred, a new "long" transaction with both contra-transactions posted to the fractal lattice-structured transaction log and referenced OL ID 2 can allow steps T6a1 thru T12a6 to be completed within the transfer flow and the short to be filled.

TABLE 16

Short Transfer Fill Workflow

| Ref | Short Transfer Fill Process Steps | Business and Process Logic | Control Factor |
|---|---|---|---|
| FT1a FT1b | TP__Del (358) will identify an OL ID 1 to fill the short and communicate it to TP__Rec | N/A | N/A |
| FT2 | TP__Del (358) will confirm its identity to TP__Rec (363) via the OL ID | pk & Unique ID relationship; Published pk | pk |
| FT3 | TP__Del (358) will identify TP__Rec (363) by its pk | Published pk | pk |
| FT4b1 FT4b2 | TP__Rec (363) will be able to confirm from N__Rec's (289) records that TP__Del (358) has the value referenced in the SOP OL or IDP OL (J) | SOP OL & IDP OL Ownership Confirmation Process | Linked, published and validated Tx's on FL & OL |
| FT5 | N/A | Execution process (O/side Rqmts) | N/A |
| FT6a1 FT6a2 FT6a3 | TP__Del (358) will unlock OL ID1 | pk, Unique ID and Encumbrance Relationship | pk and defined encumbrance methodology |
| FT6b | TP__Del (358) will generate OL ID 3 for Net Amount to be retained by TP__Del (358) | pk, Unique ID and Encumbrance Relationship | pk and defined OL ID methodology |
| FT6c | TP__Rec (363) will use previously generated OL ID 2 for Amount to be transferred from TP__Del (358) | pk, Unique ID and Encumbrance Relationship | pk and defined OL ID methodology |
| FT7a1 FT7a2 FT7b2 FT7b3 | N__Del (285) & N__Rec (289) will identify next sequential $FL_{Address}$ for the FL's | Algorithmic FL address assignment | FL Address Sequencing |
| FT8a1 FT8a2 FT8b1 FT8b2 | N__Del (285) & N__Rec (289) will create and share Tx data elements | Approved, defined Tx Script | Initially by script affirmation of Tx Details. Ultimately by Contra Tx match. |

TABLE 16-continued

Short Transfer Fill Workflow

| Ref | Short Transfer Fill Process Steps | Business and Process Logic | Control Factor |
|---|---|---|---|
| FT9a FT9b | N_Del (285) & N_Rec (289) will post the Tx's to their own FL (D & I) (generating the Hash Linked record) and referencing FL_ID and FL_Address of Short Tx. | FL Self Defining and Self-Validating Process | $FL_{Address}$ and $\#_{Link}$ |
| FT10a FT10b | N_Del (285) & N_Rec (B) will broadcast the Contra Tx's, FL Addresses and Hash Links to the Network. | Network Tx broadcasting protocols | Network Tx Send/Receive Controls |
| FT11a1 FT11a2 FT11a3 FT11a4 | N_Del (285) will receive, validate and match N_Rec's Contra Tx and post the Tx details to N_Del's copy of N_Rec's FL (E), referencing FL_ID and FL_Address of the Short Tx, at the assigned $FL_{Address}$ and confirm the $\#_{Link}$ provided. N_Del will post updates to N_Del's OL (288) for the asset for OL ID's 1, 2 & 3. | Validation Process and Tx Matching Control Process; Ownership Transfer Logic Summary | Validation and Matching Data fields unchanged, since Tx creation. |
| FT11b1 FT11b2 FT11b3 FT11b4 | N_Rec (289) will receive, validate and match N_Del's Contra Tx and post the Tx details to N_Rec's copy of N_Del's FL (H), referencing FL_ID and FL_Address of the Short Tx, at the assigned $FL_{Address}$ and confirm the $\#_{Link}$ provided. N_Rec will post updates to N_Rec's OL (J) for the asset for OL ID's 1, 2 & 3. | Validation Process and Tx Matching Control Process; Ownership Transfer Logic Summary | Validation and Matching Data fields unchanged, since Tx creation. |
| FT12a1 FT12a2 FT12a3 FT12a4 FT12a5 FT12a6 | All N_Ind (293) nodes will receive, validate and match N_Rec's Contra Tx and post the Tx details to N_Ind's copy of N_Rec's FL (295), referencing FL_ID and FL_Address of the Short Tx, at the assigned $FL_{Address}$ and confirm the $\#_{Link}$ provided. All N_Ind nodes will receive, validate and match N_Del's Contra Tx and post the Tx details to N_Ind's copy of N_Del's FL (294), referencing FL_ID and FL_Address of the Short Tx, at the assigned $FL_{Address}$ and confirm the $\#_{Link}$ provided. N_Ind will post updates to N_Ind's OL (296) for the asset for OL ID's 1, 2 & 3. | Validation Process and Tx Matching Control Process; Ownership Transfer Logic Summary | Validation and Matching Data fields unchanged, since Tx creation. |

Short Contingent Transfer

Figure 36A:
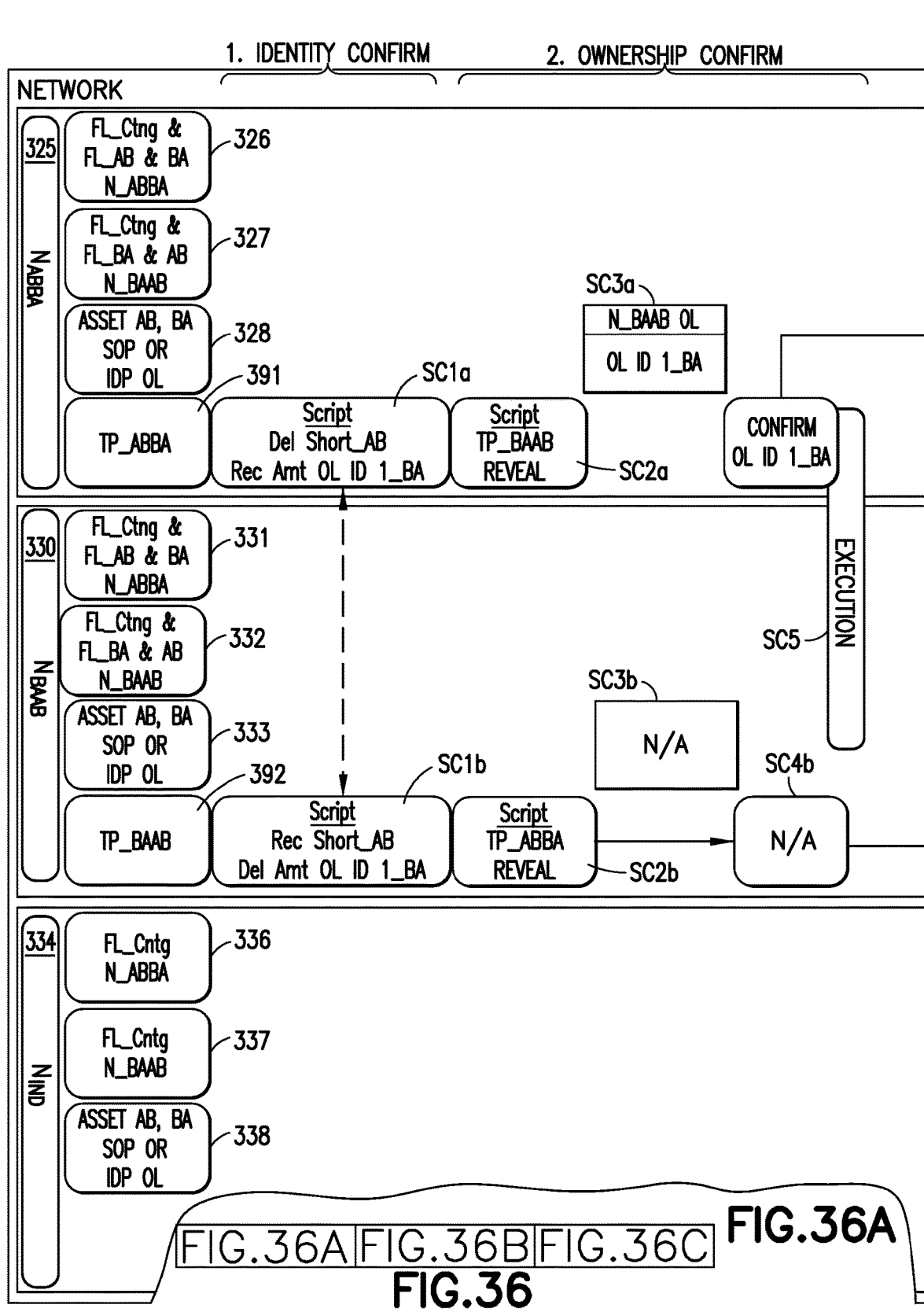
FIG. 36A, FIG. 36B, and FIG. 36C are respective portions of a schematic illustrating a short contingent transfer workflow in a network comprising one node that creates the delivery contra-transaction, another node that creates the receipt contra-transaction and an independent node that records the transaction and balances in accordance with one embodiment.
Figure 36B:
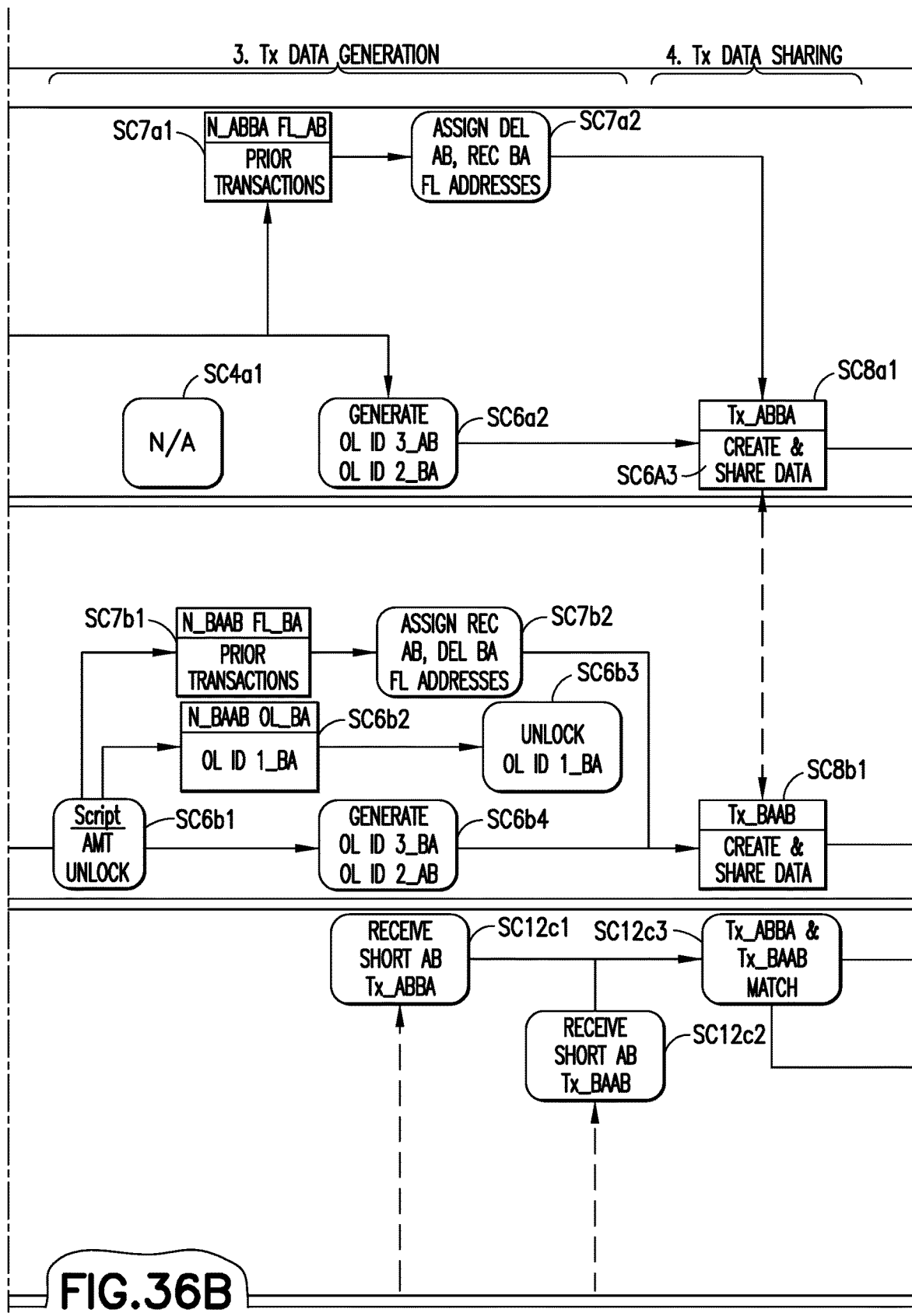
Figure 36C:
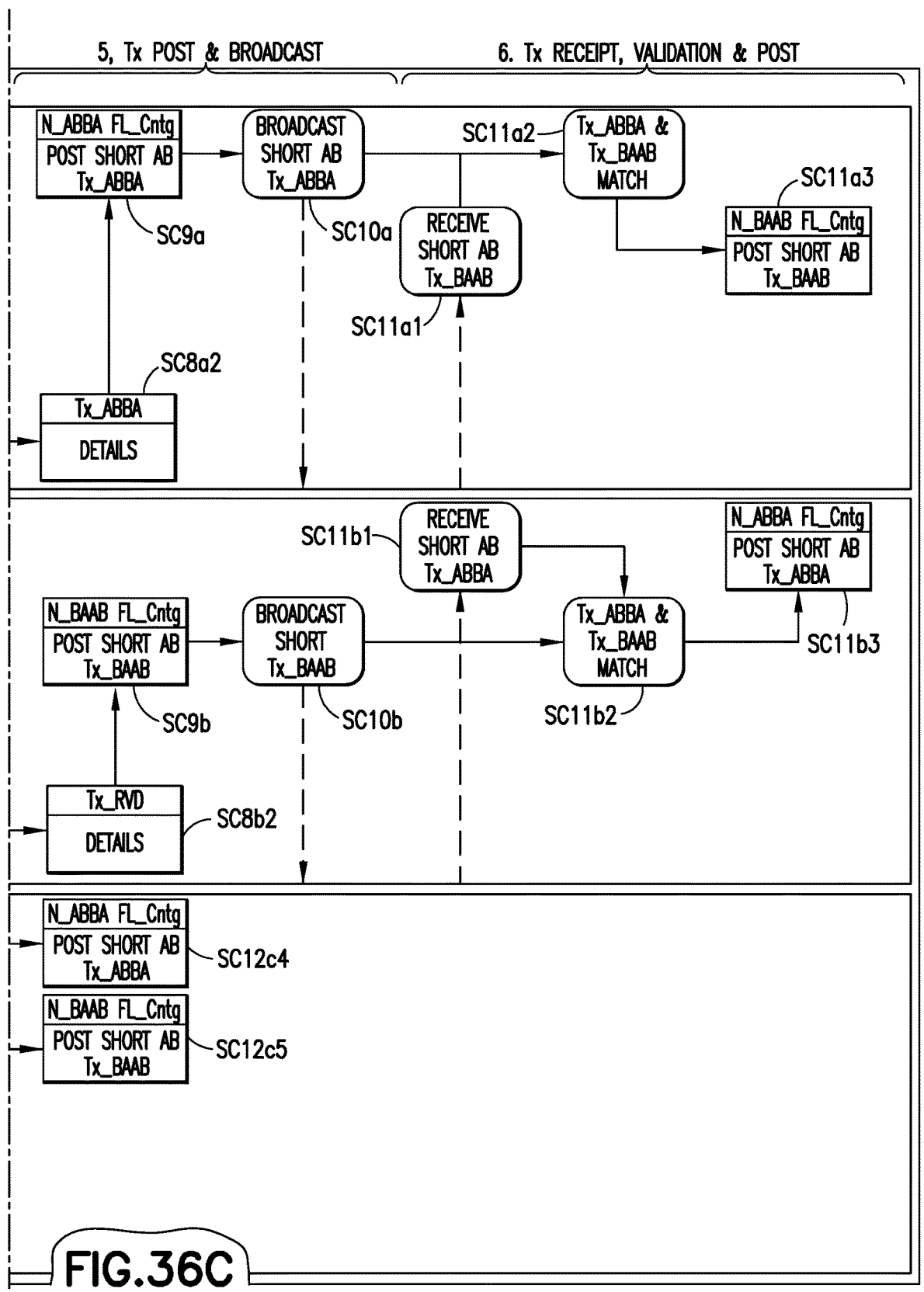

FIG. 36 is a schematic illustrating short contingent transfer workflow in a network comprising one node that creates the delivery contra-transaction, another node that creates the receipt contra-transaction and an independent node that records the transaction and balances in accordance with one embodiment. The respective short contingent transfer process steps shown in FIG. 36 and their associated logic and control factors are listed in Table 17.

TABLE 17

Short Contingent Transfer Workflow

| Ref | Short Contingent Transfer Process Steps | Business and Process Logic | Control Factor |
|---|---|---|---|
| SC1a SC1b | TP_ABBA (391) & TP_BAAB (392) agree to Transact a Contingent Transfer with each other via Blockchain Network. TP_ABBA (391) will deliver AB, "Short" vs receiving BA, "Long" from TP_BAAB (392). | N/A | N/A |

TABLE 17-continued

Short Contingent Transfer Workflow

| Ref | Short Contingent Transfer Process Steps | Business and Process Logic | Control Factor |
|---|---|---|---|
| SC2a | TP_BAAB (392) will reveal its identity to TP_ABBA (391) via TP_BAAB's (392) pk linked to OL ID 1 for BA and TP_ABBA (391) will confirm ownership of OL ID 1 for BA | pk & Unique ID relationship; Published pk | pk |
| SC2b | TP_BAAB (392) will confirm TP_ABBA's (391) identity by its pk | Published pk | pk |
| SC3a SC4a | TP_ABBA (391) will be able to confirm from its N_ABBA's (325) records that TP_BAAB (392) has the value referenced in the SOP OL or IDP OL as OL ID 1_BA | SOP OL & IDP OL Ownership Confirmation Process | Linked, published and validated Tx's on FL & OL |
| SC4b | N/A | SOP OL & IDP OL Ownership Confirmation Process | Linked, published and validated Tx's on FL & OL |
| SC5 | TP_ABBA (391) & TP_BAAB (392) will execute Tx at some location (Probably outside network) | Execution process (O/side Rqmts) | N/A |
| SC6b1 SC6b2 SC6b3 | TP_BAAB (392) will unlock OL ID 1_BA | pk, Unique ID and Encumbrance Relationship | pk and defined encumbrance methodology |
| SC6a3 | TP_ABBA (391) will generate OL ID 3_AB for Net Amount (TBD) to be retained by TP_ABBA (391) and TP_ABBA (391) will generate OL ID 2_BA for amount to be received from TP_BAAB (392) | pk, Unique ID and Encumbrance Relationship | pk and defined OL ID methodology |
| SC6b4 | TP_BAAB (392) will generate OL ID 3_BA for Net Amount to be retained by TP_BAAB (392) and TP_BAAB (392) will generate OL ID 2_AB for Amount to be received from TP_ABBA (391) | pk, Unique ID and Encumbrance Relationship | pk and defined OL ID methodology |
| SC7a1 SC7a2 | N_ABBA (325) will identify next sequential $FL_{Address}$ for N_ABBA's (325) FL_Cntg (D) | Algorithmic FL address assignment | FL Address Sequencing |
| SC7b1 SC7b2 | N_BAAB (330) will identify next sequential $FL_{Address}$ for N_BAAB'a (330) FL_Cntg (I) | Algorithmic FL address assignment | FL Address Sequencing |
| SC8a1 SC8a2 | N_ABBA (325) will create and share transaction Tx_ABBA data elements | Approved, defined Tx Script | Initially by script affirmation of Tx Details. Ultimately by Contra Tx match. |
| SC8b1 SC8b2 | N_BAAB (330) will create and share transaction Tx_BAAB data elements | Approved, defined Tx Script | Initially by script affirmation of Tx Details. Ultimately by Contra Tx match. |
| SC9a | N_ABBA will post the Tx_ABBA to N_ABBA's FL_Ctng (326) (generating the Hash Linked record). | FL Self Defining and Self-Validating Process | $FL_{Address}$ and $\#_{Link}$ |
| SC9b | N_BAAB will post the Tx_BAAB to N_BAAB's FL_Ctng (332) (generating the Hash Linked record). | FL Self Defining and Self-Validating Process | $FL_{Address}$ and $\#_{Link}$ |
| SC10a SC10b | N_ABBA & N_BAAB will broadcast the Short Contra Tx's, FL Addresses and Hash Links to the Network | Network Tx broadcasting protocols | Network Tx Send/Receive Controls |
| SC11a1 SC11a2 SC11a3 | N_ABBA (325) will receive, validate and match N_BAAB's (330) Short Cntg Contra Tx and post the Tx details to N_ABBA's (325) copy of N_BAAB's FL_Ctng (327) at the assigned $FL_{Address}$ and confirm the $\#_{Link}$ provided. | Validation Process and Tx Matching Control Process; Ownership Transfer Logic Summary | Validation and Matching Data fields unchanged, since Tx creation. |

TABLE 17-continued

Short Contingent Transfer Workflow

| Ref | Short Contingent Transfer Process Steps | Business and Process Logic | Control Factor |
|---|---|---|---|
| SC11b1 SC11b2 SC11b3 | N_BAAB (330) will receive, validate and match N_ABBA's (325) Short Cntg Contra Tx and post the Tx details to N_BAAB's (330) copy of N_ABBA's FL_Ctng (331) at the assigned FL$_{Address}$ and confirm the #$_{Link}$ provided. | Validation Process and Tx Matching Control Process; Ownership Transfer Logic Summary | Validation and Matching Data fields unchanged, since Tx creation. |
| SC12c1 SC12c2 SC12c3 SC12c4 SC12c5 | All N_Ind (334) nodes will receive, validate and match N_ABBA's (325) Short Ctng Contra Tx_ABBA and post the Tx_ABBA details to N_Ind's (334) copy of N_ABBA's FL_Cntg (336) at the assigned FL$_{Address}$ and confirm the #$_{Link}$ provided. All N_Ind (334) nodes will receive, validate and match N_BAAB's (330) Short Ctng Contra Tx_BAAB and post the Tx_BAAB details to N_Ind's (334) copy of N_BAAB's FL_Ctng (337) at the assigned FL$_{Address}$ and confirm the #$_{Link}$ provided. | Validation Process and Tx Matching Control Process; Ownership Transfer Logic Summary | Validation and Matching Data fields unchanged, since Tx creation. |
| SC13 | N/A | | |
| SC14 | N/A | | |

Short Contingent Transfer Fill

Figure 37B:
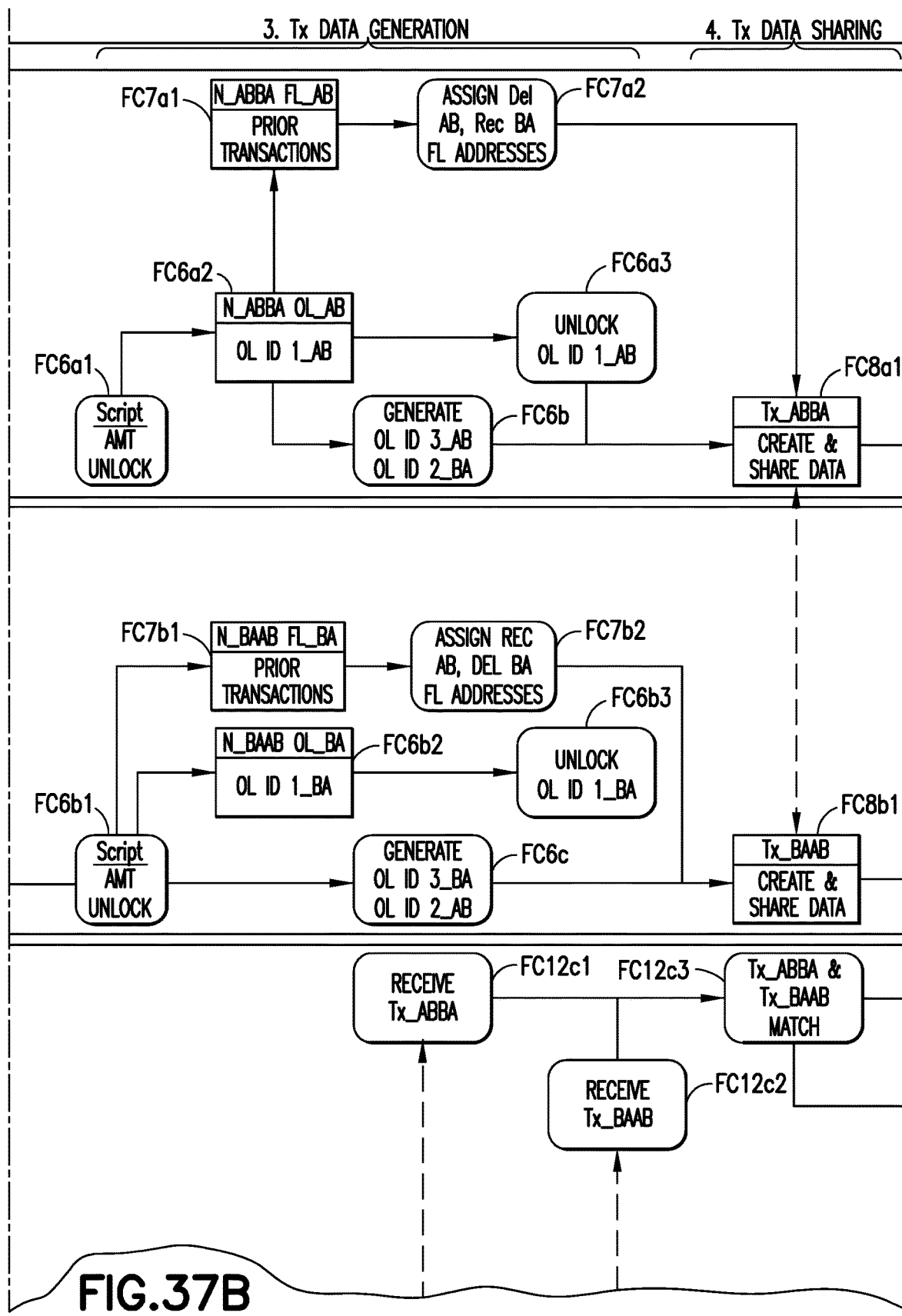
Figure 37C:
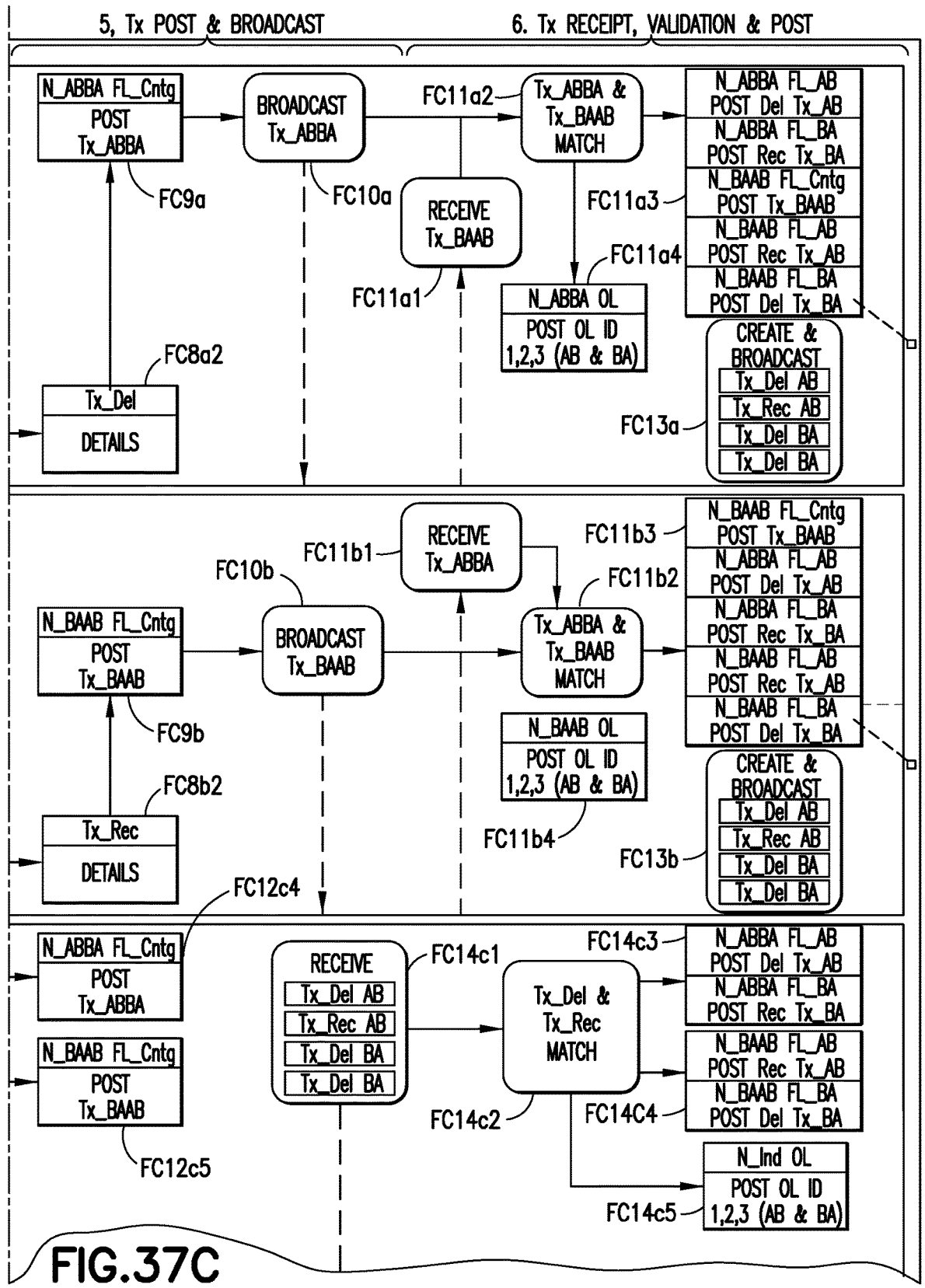

FIG. 37 is a schematic illustrating short contingent transfer fill workflow in a network comprising one node that creates the delivery contra-transaction, another node that creates the receipt contra-transaction and an independent node that records the transaction and balances in accordance with one embodiment. The respective contingent transfer fill process steps shown in FIG. 37 and their associated logic and control factors are listed in Table 18.

TABLE 18

Short Contingent Transfer Fill Workflow

| Ref | Short Contingent Transfer Fill Process Steps | Business and Process Logic | Control Factor |
|---|---|---|---|
| FC1a FC1b | TP_ABBA (393) wil identfy AB OL ID1 to fill TP_AB Short and communicate it to TP_BAAB (394). | N/A | N/A |
| FC2a FC3a | TP_ABBA (393) will confirm its identity to TP_BAAB (394) and TP_BAAB (394) will re-confirm ownership of OL ID AB | pk & Unique ID relationship; Published pk | pk |
| FC2b FC3b | TP_BAAB (393) will reveal its identity to TP_BAAB (394) and TP_ABBA (393) will re-confirm ownership of OL ID BA | pk & Unique ID relationship; Published pk | pk |
| FC4a | TP_ABBA (393) will be able to re-confirm from its N_ABBA's (325) records that TP_BAAB (394) has the value referenced in the SOP OL or IDP OL (F) as OL ID 1_BA | SOP OL & IDP OL Ownership Confirmation Process | Linked, published and validated Tx's on FL & OL |
| FC4b | TP_BAAB (394) will be able to re-confirm from its N_BAAB's (330) records that TP_ABBA (393) has the value referenced in the SOP OL or IDP OL (J) as OL ID 1_AB | SOP OL & IDP OL Ownership Confirmation Process | Linked, published and validated Tx's on FL & OL |
| FC5 | N/A | Execution process (O/side Rqmts) | N/A |

TABLE 18-continued

Short Contingent Transfer Fill Workflow

| Ref | Short Contingent Transfer Fill Process Steps | Business and Process Logic | Control Factor |
|---|---|---|---|
| FC6a1 FC6a2 FC6a3 | TP__ABBA (393) will unlock OL ID 1__AB | pk, Unique ID and Encumbrance Relationship | pk and defined encumbrance methodology |
| FC6b1 FC6b2 FC6b3 | TP__BAAB (394) will unlock OL ID 1__BA | pk, Unique ID and Encumbrance Relationship | pk and defined encumbrance methodology |
| FC6b | TP__ABBA (393) will generate OL ID 3__AB for Net Amount to be retained by TP__ABBA (393) and OL ID 2__BA to be transferred from TP__BAAB (394) | pk, Unique ID and Encumbrance Relationship | pk and defined OL ID methodology |
| FC6c | TP__BAAB (394) will generate OL ID 3__BA for Net Amount to be retained by TP__BAAB (394) and OL ID 2__AB to be transferred from TP__ABBA (393) | pk, Unique ID and Encumbrance Relationship | pk and defined OL ID methodology |
| FC7a1 FC7a2 | N__ABBA (325) will identify next sequential $FL_{Address}$ for N__ABBA's (325) FL__Cntg (D) | Algorithmic FL address assignment | FL Address Sequencing |
| FC7b1 FC7b2 | N__BAAB (330) will identify next sequential $FL_{Address}$ for N__BAAB'a (330) FL__Ctng (I) | | |
| FC8a1 FC8a2 | N__ABBA (325) will create and share Tx__ABBA data elements | Approved, defined Tx Script | Initially by script affirmation of Tx Details. Ultimately by Contra Tx match. |
| FC8b1 FC8b2 | N__BAAB (330) will create and share Tx__BAAB data elements | Approved, defined Tx Script | Initially by script affirmation of Tx Details. Ultimately by Contra Tx match. |
| FC9a | N__ABBA (325) will post the Tx__ABBA to N__ABBA's FL__Ctng (D) (generating the Hash Linked record). | FL Self Defining and Self-Validating Process | $FL_{Address}$ and $\#_{Link}$ |
| FC9b | N__BAAB (330) will post the Tx__BAAB to N__BAAB's FL__Ctng (I) (generating the Hash Linked record). | FL Self Defining and Self-Validating Process | $FL_{Address}$ and $\#_{Link}$ |
| FC10a FC10b | N__ABBA (325) & N__BAAB (330) will broadcast the Contra Tx's, FL Addresses and Hash Links to the Network | Network Tx broadcasting protocols | Network Tx Send/Receive Controls |
| FC11a1 FC11a2 FC11a3 FC11a4 | N__ABBA (325) will receive, validate and match N__BAAB's (330) Contra Tx and post the Tx details to N__ABBA's (325) copy of N__BAAB's FL__Ctng (327) at the assigned $FL_{Address}$ and confirm the $\#_{Link}$ provided. N__ABBA (325) will post Tx__Del details to N__ABBA's FL__AB (326) and Tx__Rec to N__ABBA's copy of N-BAAB's FL__AB (327) and will post Tx__Rec details to N__ABBA's FL__BA (326) and Tx__Del to N__ABBA's copy of N-BAAB's FL__BA (327). N__ABBA will post updates to N__ABBA's OL (328) for the Asset AB OL ID's 1__AB, 2__AB (Referencing the Short Tx FL Details), 3__AB and Asset BA OL ID's 1__BA, 2__BA, #__BA | Validation Process and Tx Matching Control Process; Ownership Transfer Logic Summary | Validation and Matching Data fields unchanged, since Tx creation. |

TABLE 18-continued

Short Contingent Transfer Fill Workflow

| Ref | Short Contingent Transfer Fill Process Steps | Business and Process Logic | Control Factor |
|---|---|---|---|
| FC11b1 FC11b2 FC11b3 FC11b4 | N_BAAB (330) will receive, validate and match N_ABBA's (325) Contra Tx and post the Tx details to N_BAAB's (330) copy of N_ABBA's FL_Ctng (331) at the assigned FL$_{Address}$ and confirm the #$_{Link}$ provided. N_BAAB (330) will post Tx_Rec details to N_BAAB's FL_AB (332) and Tx_Del to N_BAAB's copy of N-ABBA's FL_AB (331) and will post Tx_Del details to N_BAAB's FL_BA (332) and Tx_Rec to N_BAAB's copy of N-ABBA's FL_BA (331). N_BAAB will post updates to N_BAAB's OL (333) for the Asset AB OL ID's 1_AB, 2_AB (Referencing the Short Tx FL Details), 3_AB and Asset BA OL ID's 1_BA, 2_BA, 3BA | Validation Process and Tx Matching Control Process; Ownership Transfer Logic Summary | Validation and Matching Data fields unchanged, since Tx creation. |
| FC12c1 FC12c2 FC12c3 FC12c4 FC12c5 | All N_Ind (334) nodes will receive, validate and match N_BAAB's (330) Contra Tx_BAAB and post the Tx_BAAB details to N_Ind's copy of N_BAAB's FL_Ctng (337) at the assigned FL$_{Address}$ and confirm the #$_{Link}$ provided. All N_Ind (334) nodes will receive, validate and match N_ABBA's (325) Contra Tx_ABBA and post the Tx_ABBA details to N_Ind's copy of N_ABBAI's FL_Cntg (336) at the assigned FL$_{Address}$ and confirm the #$_{Link}$ provided. | Validation Process and Tx Matching Control Process; Ownership Transfer Logic Summary | Validation and Matching Data fields unchanged, since Tx creation. |
| FC13a FC13b | N_ABBA (325) and N_BAAB (330) will independently create and broadcast N_ABBA-Tx_Del_AB, N_BAAB-Tx_Rec_AB, N_BAAB-Tx_Del_BA, N_ABBA-Tx_Rec_BA | Validation Process and Tx Matching Control Process; Ownership Transfer Logic Summary | Validation and Matching Data fields unchanged, since Tx creation. |
| FC14c1 FC14c2 FC14c3 FC14c4 FC14c5 | All N_Ind (334) Nodes will receive, validate and match Tx_Del_AB, N_BAAB-Tx_Rec_AB, N_BAAB-Tx_Del_BA, N_ABBA-Tx_Rec_BA. N_Ind (334) will post Tx_Del details to N_Ind's copy of N_ABBA's FL_AB (FC14c3) and Tx_Rec to N_Ind's copy of N-BAAB's FL_AB (FC14c4) and will post Tx_Del details to N_Ind's copy of N_BAAB's FL_BA (FC14c4) and Tx_Rec to N_Ind's copy of N-ABBA's FL_BA (FC14c3). N_Ind (C) will post updates to N_Ind's OL (338) for the Asset AB OL ID's 1_AB, 2_AB (Referencing the Short Tx FL Details), 3_AB and Asset BA OL ID's 1_BA, 2_BA, 3BA | Validation Process and Tx Matching Control Process; Ownership Transfer Logic Summary | Validation and Matching Data fields unchanged, since Tx creation. |

While distributed ledgers for financial services transactions that utilize blockchain technology have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "node" refers to a computer system comprising at least one computer or processor, a non-transitory tangible computer-readable storage medium connected to the at least one computer or processor, and a network interface that enables the at least computer or processor to communicate with other nodes in a network.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for operating a distributed ledger system comprising a network of multiple nodes configured to record transactions involving assets, wherein each node is configured to respectively serve as any one of a node N_Del used by a delivering transacting party, a node N_Rec used by a receiving transacting party, and a node N_Ind independent of the delivering and receiving transacting parties, the steps performed by any three nodes designated N_Del, N_Rec, and N_Ind for a particular transaction comprising:

(a) node N_Del assigns a fractal lattice address N_Del FLAddress in a delivery fractal lattice transaction log maintained by node N_Del;

(b) node N_Rec assigns a fractal lattice address N_Rec FLAddress in a receipt fractal lattice transaction log maintained by node N_Rec;

(c) node N_Del creates an encrypted hash N_Del E# by hashing a message that includes N_Del ID, N_Del FLAddress, N_Rec ID, Asset ID, and Amount to create a hashed message and then encrypting that hashed message using a private encryption key of node N_Del;

(d) node N_Del shares N_Del E# with node N_Rec;

(e) node N_Rec creates an encrypted hash N_Rec E# by hashing a message that includes N_Rec ID, N_Rec FLAddress, N_Del ID, Asset ID, and Amount to create a hashed message and then encrypting that hashed message using a private encryption key of node N_Rec;

(f) node N_Rec shares N_Rec E# with node N_Del;

(g) node N_Del generates delivery contra-transaction details of a delivery contra-transaction Tx_Del, the delivery contra-transaction details comprising the encrypted hash N_Rec E# and data identifying fields used to generate encrypted hash N_Rec E#;

(h) node N_Del posts the delivery contra-transaction details of the delivery contra-transaction Tx_Del at N_Del FLAddress in the delivery fractal lattice transaction log maintained by node N_Del;

(i) node N_Rec generates receipt contra-transaction details of a receipt contra-transaction Tx_Rec, the receipt contra-transaction details comprising the encrypted hash N_Del E# and data identifying fields used to generate encrypted hash N_Del E#;

(j) node N_Rec posts the receipt contra-transaction details of the receipt contra-transaction Tx_Rec at N_Rec FLAddress in the receipt fractal lattice transaction log maintained by node N_Rec;

(k) node N_Del creates a N_Del digital signature by hashing the delivery contra-transaction Tx_Del using a hashing process and then encrypting the hashed delivery contra-transaction Tx_Del using the private encryption key of node N_Del;

(l) node N_Del sends the N_Del digital signature and a copy of the delivery contra-transaction details to node N_Rec and to node N_Ind via the network;

(m) node N_Rec creates a N_Rec digital signature by hashing the receipt contra-transaction Tx_Rec using a hashing process and then encrypting the hashed receipt contra-transaction Tx_Rec using the private encryption key of node N_Rec;

(n) node N_Rec sends the N_Rec digital signature and a copy of the receipt contra-transaction details to node N_Del and to node N_Ind via the network;

(o) node N_Del validates the receipt contra-transaction Tx_Rec by decrypting the N_Rec digital signature using a public encryption key of node N_Rec, hashing the receipt contra-transaction details using the same hashing process used by node N_Rec, and matching results of the decrypting and hashing;

(p) node N_Del posts the receipt contra-transaction details at N_Rec FLAddress in a receipt fractal lattice transaction log maintained by node N_Del after matching;

(q) node N_Rec validates the delivery contra-transaction Tx_Del by decrypting the N_Del digital signature using a public encryption key of node N_Del, hashing the delivery contra-transaction details using the same hashing process used by node N_Del, and matching results of the decrypting and hashing;

(r) node N_Rec posts the delivery contra-transaction details at N_Del FLAddress in a delivery fractal lattice transaction log maintained by node N_Rec after matching;

(s) node N_Ind validates the receipt contra-transaction Tx_Rec by decrypting the N_Rec digital signature using a public encryption key of node N_Rec, hashing the receipt contra-transaction details using the same hashing process used by node N_Rec, and matching results of the decrypting and hashing;

(t) node N_Ind validates the delivery contra-transaction Tx_Del by decrypting the N_Del digital signature using a public encryption key of node N_Del, hashing the delivery contra-transaction details using the same hashing process used by node N_Del, and matching results of the decrypting and hashing; and (u) node N_Ind posts the delivery and receipt contra-transaction details at N_Del FLAddress and N_Rec FLAddress respectively in delivery and receipt fractal lattice transaction logs maintained by node N_Ind after matching.

2. The method as recited in claim 1, wherein step (o) comprises:

node N_Del recreates the hashed receipt contra-transaction Tx_Rec by decrypting the N_Rec digital signature using a public encryption key of node N_Rec;

node N_Del creates a copy of the hashed receipt contra-transaction Tx_Rec by hashing the receipt contra-transaction details using the same hashing process used by node N_Rec; and node N_Del matches the recreated hashed receipt contra-transaction Tx_Rec with the created hashed receipt contra-transaction Tx_Rec, and wherein step (q) comprises:

node N_Rec recreates the hashed delivery contra-transaction Tx_Del by decrypting the N_Del digital signature using a public encryption key of node N_Del;

node N_Rec creates a copy of the hashed delivery contra-transaction Tx_Del by hashing the delivery contra-transaction details using the same hashing process used by node N_Del; and node N_Rec matches the recreated hashed delivery contra-transaction Tx_Del with the created hashed delivery contra-transaction Tx_Del.

3. The method as recited in claim 2, wherein step (s) comprises:

node N_Ind recreates the hashed receipt contra-transaction Tx_Rec by decrypting the N_Rec digital signature using a public encryption key of node N_Rec;

node N_Ind creates a copy of the hashed receipt contra-transaction Tx_Rec by hashing the receipt contra-transaction details using the same hashing process used by node N_Rec; and node N_Ind matches the recreated hashed receipt contra-transaction Tx_Rec with the created hashed receipt contra-transaction Tx_Rec, and wherein step (t) comprises:

node N_Ind recreates the hashed delivery contra-transaction Tx_Del by decrypting the N_Del digital signature using a public encryption key of node N_Del;

node N_Ind creates a copy of the hashed delivery contra-transaction Tx_Del by hashing the delivery contra-transaction details using the same hashing process used by node N_Del;

node N_Ind matches the recreated hashed delivery contra-transaction Tx_Del with the created hashed delivery contra-transaction Tx_Del.

4. The method as recited in claim 1, wherein:

step (g) further comprises node N_Del generates a hash-link of N_Del FLAddress to a prior layer's fractal address in the delivery fractal lattice transaction log maintained by node N_Del in step (g);

step (i) further comprises node N_Rec generates a hash-link of N_Rec FLAddress to a prior layer's fractal address in the receipt fractal lattice transaction log maintained by node N_Rec in step (g);

step (p) further comprises node N_Del confirms the hash-link generated by node N_Rec; and step (r) further comprises node N_Rec confirms the hash-link generated by node N_Del.

5. The method as recited in claim 4, wherein step (u) further comprises node N_Ind confirms the hash-links generated by nodes N_Del and N_Rec.

6. The method as recited in claim 5, wherein each of the nodes N_Del, N_Rec, and N_Ind confirms the consistency of the delivery and receipt transaction logs by validating all the fractal lattice hash-links generated for the respective transaction log.

7. The method as recited in claim 6, wherein a data set applied to an assigned fractal lattice address is given a classification of "end" to mark the end of a fractal branch or "last" to mark a last transaction posted to a transaction log in a period so that node N_Ind is able to recreate and confirm completeness of a data structure and the fractal lattice address of the delivery and receipt transaction logs without conferring with either of nodes N_Del and N_Rec.

8. The method as recited in claim 1, further comprising the delivering and receiving transacting parties execute the particular transaction outside of the network, wherein steps (a) through (u) are performed after execution by the delivering and receiving transacting parties.

9. The method as recited in claim 8, wherein the particular transaction is only one of the following defined types: a transfer, a pledge, a loan, a contingent transfer, a short transfer, a short transfer fill, a short contingent transfer and a short contingent transfer fill.

10. The method as recited in claim 1, further comprising:

node N_Del records changes in asset ownership resulting from the particular transaction to an ownership log maintained by node N_Del after step (o);

node N_Rec records the changes in asset ownership to an ownership log maintained by node N_Rec after step (q); and node N_Ind records the changes in asset ownership to an ownership log maintained by node N_Ind after step (t).

11. The method as recited in claim 1, wherein nodes N_Del and N_Rec communicate via scripts that are programmed in machine-readable code of four, parameter-driven sequential process components which are generically combined in various combinations to represent any financial services transaction or life-cycle without the need for infinite loops.

12. The method as recited in claim 11, wherein the four components are: (a) a single transfer of one asset; (b) an asset classification change; (c) a time-driven change in value; and (d) a contingent, dual asset, bi-directional transfer, and wherein each sequential process component is defined by the following parameters: (a) number, unit and value; (b) timings: single event, periodic events and multiple non-periodic events; (c) generated events: data, date, state, choice and gain/loss; and (d) primary, secondary and tertiary assets.

13. A distributed ledger system comprising a network of multiple nodes configured to record transactions involving assets, wherein each node is configured to respectively serve as any one of a node N_Del used by a delivering transacting party, a node N_Rec used by a receiving transacting party, and a node N_Ind independent of the delivering and receiving transacting parties the nodes N_Del, N_Rec, and N_Ind being configured to perform operations comprising:

(a) node N_Del assigns a fractal lattice address N_Del FLAddress in a delivery fractal lattice transaction log maintained by node N_Del;

(b) node N_Rec assigns a fractal lattice address N_Rec FLAddress in a receipt fractal lattice transaction log maintained by node N_Rec;

(c) node N_Del creates an encrypted hash N_Del E# by hashing a message that includes N_Del ID, N_Del FLAddress, N_Rec ID, Asset ID, and Amount to create a hashed message and then encrypting that hashed message using a private encryption key of node N_Del;

(d) node N_Del shares encrypted hash N_Del E# with node N_Rec;

(e) node N_Rec creates an encrypted hash N_Rec E# by hashing a message that includes N_Rec ID, N_Rec FLAddress, N_Del ID, Asset ID, and Asset Amount to create a hashed message and then encrypting that hashed message using a private encryption key of node N_Rec;

(f) node N_Rec shares encrypted hash N_Rec E# with node N_Del;

(g) node N_Del generates delivery contra-transaction details of a delivery contra-transaction Tx_Del, the delivery contra-transaction details comprising the encrypted hash N_Rec E# and data identifying fields used to generate encrypted hash N_Rec E#;

(h) node N_Del posts the delivery contra-transaction details of the delivery contra-transaction Tx_Del at N_Del FLAddress in the delivery fractal lattice transaction log maintained by node N_Del;

(i) node N_Rec generates receipt contra-transaction details of a receipt contra-transaction Tx_Rec, the receipt contra-transaction details comprising the encrypted hash N_Del E# and data identifying fields used to generate encrypted hash N_Del E#;

(j) node N_Rec posts the receipt contra-transaction details of the receipt contra-transaction Tx_Rec at N_Rec FLAddress in the receipt fractal lattice transaction log maintained by node N_Rec;

(k) node N_Del creates a N_Del digital signature by hashing the delivery contra-transaction Tx_Del using a hashing process and then encrypting the hashed delivery contra-transaction Tx_Del using the private encryption key of node N_Del;

(l) node N_Del sends the N_Del digital signature and a copy of the delivery contra-transaction details to node N_Rec and to node N_Ind via the network;

(m) node N_Rec creates a N_Rec digital signature by hashing the receipt contra-transaction Tx_Rec using a hashing process and then encrypting the hashed receipt contra-transaction Tx_Rec using the private encryption key of node N_Rec;

(n) node N_Rec sends the N_Rec digital signature and a copy of the receipt contra-transaction details to node N_Del and to node N_Ind via the network;

(o) node N_Del validates the receipt contra-transaction Tx_Rec by decrypting the N_Rec digital signature using a public encryption key of node N_Rec, hashing the receipt contra-transaction details using the same hashing process used by node N_Rec, and matching results of the decrypting and hashing;

(p) node N_Del posts the receipt contra-transaction details at N_Rec FLAddress in a receipt fractal lattice transaction log maintained by node N_Del after matching;

(q) node N_Rec validates the delivery contra-transaction Tx_Del by decrypting the N_Del digital signature using a public encryption key of node N_Del, hashing the delivery contra-transaction details using the same hashing process used by node N_Del, and matching results of the decrypting and hashing;

(r) node N_Rec posts the delivery contra-transaction details at N_Del FLAddress in a delivery fractal lattice transaction log maintained by node N_Rec after matching;

(s) node N_Ind validates the receipt contra-transaction Tx_Rec by decrypting the N_Rec digital signature using a public encryption key of node N_Rec, hashing the receipt contra-transaction details using the same hashing process used by node N_Rec, and matching results of the decrypting and hashing;

(t) node N_Ind validates the delivery contra-transaction Tx_Del by decrypting the N_Del digital signature using a public encryption key of node N_Del, hashing the delivery contra-transaction details using the same hashing process used by node N_Del, and matching results of the decrypting and hashing; and (u) node N_Ind posts the delivery and receipt contra-transaction details at N_Del FLAddress and N_Rec FLAddress respectively in delivery and receipt fractal lattice transaction logs maintained by node N_Ind after matching.

14. The distributed ledger system as recited in claim 13, wherein operation (o) comprises:
node N_Del recreates the hashed receipt contra-transaction Tx_Rec by decrypting the N_Rec digital signature using a public encryption key of node N_Rec;
node N_Del creates a copy of the hashed receipt contra-transaction Tx_Rec by hashing the receipt contra-transaction details using the same hashing process used by node N_Rec; and
node N_Del matches the recreated hashed receipt contra-transaction Tx_Rec with the created hashed receipt contra-transaction Tx_Rec, and
wherein operation (q) comprises:
node N_Rec recreates the hashed delivery contra-transaction Tx_Del by decrypting the N_Del digital signature using a public encryption key of node N_Del;
node N_Rec creates a copy of the hashed delivery contra-transaction Tx_Del by hashing the delivery contra-transaction details using the same hashing process used by node N_Del; and
node N_Rec matches the recreated hashed delivery contra-transaction Tx_Del with the created hashed delivery contra-transaction Tx_Del.

15. The distributed ledger system as recited in claim 14, wherein operation (s) comprises:
node N_Ind recreates the hashed receipt contra-transaction Tx_Rec by decrypting the N_Rec digital signature using a public encryption key of node N_Rec;
node N_Ind creates a copy of the hashed receipt contra-transaction Tx_Rec by hashing the receipt contra-transaction details using the same hashing process used by node N_Rec; and
node N_Ind matches the recreated hashed receipt contra-transaction Tx_Rec with the created hashed receipt contra-transaction Tx_Rec, and
wherein operation (t) comprises:
node N_Ind recreates the hashed delivery contra-transaction Tx_Del by decrypting the N_Del digital signature using a public encryption key of node N_Del;
node N_Ind creates a copy of the hashed delivery contra-transaction Tx_Del by hashing the delivery contra-transaction details using the same hashing process used by node N_Del;
node N_Ind matches the recreated hashed delivery contra-transaction Tx_Del with the created hashed delivery contra-transaction Tx_Del.

16. The distributed ledger system as recited in claim 13, wherein:
operation (g) further comprises node N_Del generates a hash-link of N_Del FLAddress to a prior layer's fractal address in the delivery fractal lattice transaction log maintained by node N_Del in operation (g);
operation (i) further comprises node N_Rec generates a hash-link of N_Rec FLAddress to a prior layer's fractal address in the receipt fractal lattice transaction log maintained by node N_Rec in operation (g);
operation (p) further comprises node N_Del confirms the hash-link generated by node N_Rec; and
operation (r) further comprises node N_Rec confirms the hash-link generated by node N_Del.

17. The distributed ledger system as recited in claim 16, wherein operation (u) further comprises node N_Ind confirms the hash-links generated by nodes N_Del and N_Rec.

18. The distributed ledger system as recited in claim 17, wherein each of the nodes N_Del, N_Rec, and N_Ind confirms the consistency of the delivery and receipt transaction logs by validating all the fractal lattice hash-links generated for the respective transaction log.

19. The distributed ledger system as recited in claim 18, wherein a data set applied to an assigned fractal lattice address is given a classification of "end" to mark the end of a fractal branch or "last" to mark a last transaction posted to a transaction log in a period so that node N_Ind is able to recreate and confirm completeness of a data structure and the fractal lattice address of the delivery and receipt transaction logs without conferring with either of nodes N_Del and N_Rec.

20. The distributed ledger system as recited in claim 13, further comprising the delivering and receiving transacting parties execute the particular transaction outside of the network, wherein operations (a) through (u) are performed after execution by the delivering and receiving transacting parties.

21. The distributed ledger system as recited in claim 20, wherein the particular transaction is only one of the following defined types: a transfer, a pledge, a loan, a contingent transfer, a short transfer, a short transfer fill, a short contingent transfer and a short contingent transfer fill.

22. The distributed ledger system as recited in claim 13, further comprising:
- node N_Del records changes in asset ownership resulting from the particular transaction to an ownership log maintained by node N_Del after operation (o);
- node N_Rec records the changes in asset ownership to an ownership log maintained by node N_Rec after operation (q); and
- node N_Ind records the changes in asset ownership to an ownership log maintained by node N_Ind after operation (t).

23. The distributed ledger system as recited in claim 13, wherein nodes N_Del and N_Rec communicate via scripts that are programmed in machine-readable code of four, parameter-driven sequential process components which are generically combined in various combinations to represent any financial services transaction or life-cycle without the need for infinite loops.

24. The distributed ledger system as recited in claim 23, wherein the four components are: (a) a single transfer of one asset; (b) an asset classification change; (c) a time-driven change in value; and (d) a contingent, dual asset, bi-directional transfer, and wherein each sequential process component is defined by the following parameters: (a) number, unit and value; (b) timings: single event, periodic events and multiple non-periodic events; (c) generated events: data, date, state, choice and gain/loss; and (d) primary, secondary and tertiary assets.

* * * * *